US011397608B2

(12) United States Patent
Srinivasan et al.

(10) Patent No.: US 11,397,608 B2
(45) Date of Patent: Jul. 26, 2022

(54) MULTI-DIMENSIONAL SPREADSHEET SYSTEM ENABLING STACK BASED PROGRAMMING USING A VIRTUAL MACHINE

(71) Applicants: Sudharshan Srinivasan, Fremont, CA (US); Jai Kumar, Cupertino, CA (US); Kothandraman Ramchandran, Fremont, CA (US)

(72) Inventors: Sudharshan Srinivasan, Fremont, CA (US); Jai Kumar, Cupertino, CA (US); Kothandraman Ramchandran, Fremont, CA (US)

( * ) Notice: Subject to any disclaimer, the term of this patent is extended or adjusted under 35 U.S.C. 154(b) by 306 days.

(21) Appl. No.: 16/876,120

(22) Filed: May 18, 2020

(65) Prior Publication Data
US 2021/0357241 A1   Nov. 18, 2021

(51) Int. Cl.
   G06F 9/455    (2018.01)
   G06F 40/205   (2020.01)
   G06F 40/18    (2020.01)
   G06F 9/00     (2006.01)

(52) U.S. Cl.
   CPC ............ *G06F 9/45558* (2013.01); *G06F 9/00* (2013.01); *G06F 40/18* (2020.01); *G06F 40/205* (2020.01); *G06F 2009/45595* (2013.01)

(58) Field of Classification Search
   None
   See application file for complete search history.

(56) References Cited

U.S. PATENT DOCUMENTS

| | | | | |
|---|---|---|---|---|
| 5,603,021 A * | 2/1997 | Spencer | ................... | G06F 40/18 |
| 5,890,174 A * | 3/1999 | Khanna | ................... | G06F 40/18 |
| | | | | 715/209 |
| 6,631,497 B1 * | 10/2003 | Jamshidi | ................ | G06F 40/18 |
| | | | | 715/205 |
| 6,988,241 B1 * | 1/2006 | Guttman | ............. | G06F 16/9566 |
| | | | | 707/E17.115 |
| 7,624,372 B1 * | 11/2009 | Stewart | ..................... | G06F 8/34 |
| | | | | 717/113 |
| 9,037,961 B1 * | 5/2015 | Mansell | .................. | G06F 40/18 |
| | | | | 715/212 |
| 10,311,141 B1 * | 6/2019 | Olkin | ....................... | G06F 40/18 |
| 2002/0188629 A1 * | 12/2002 | Burfoot | ................... | G06F 40/18 |
| | | | | 715/213 |
| 2003/0009649 A1 * | 1/2003 | Martin | .................... | G06F 40/18 |
| | | | | 712/1 |
| 2003/0226105 A1 * | 12/2003 | Waldau | ................... | H04L 67/02 |
| | | | | 707/E17.121 |
| 2004/0103366 A1 * | 5/2004 | Peyton-Jones | ......... | G06F 40/18 |
| | | | | 715/213 |
| 2005/0015714 A1 * | 1/2005 | Cahill | ..................... | G06F 40/18 |
| | | | | 715/212 |

(Continued)

*Primary Examiner* — Qing Chen

(57) ABSTRACT

A combination programming environment using spreadsheets is described that supports stack based sequential program execution using spreadsheet cells supporting recursion, reentrancy, conditional blocks, loops and block based dependency execution using a virtual machine. This is achieved by partitioning cells in any sheet into named blocks and unnamed blocks that are executed using conditions. Named blocks can be arranged in a call sequence with a caller cell setting up a call to a callee named block using the name of callee block in caller cell formula.

20 Claims, 28 Drawing Sheets

(56) References Cited

U.S. PATENT DOCUMENTS

| | | | |
|---|---|---|---|
| 2005/0257132 A1* | 11/2005 | Karby | G06Q 10/06 |
| | | | 715/213 |
| 2006/0036939 A1* | 2/2006 | Hobbs | G06F 40/18 |
| | | | 715/213 |
| 2006/0136534 A1* | 6/2006 | Boon | G06F 40/18 |
| | | | 708/200 |
| 2006/0161844 A1* | 7/2006 | Simkhay | G06F 40/18 |
| | | | 715/267 |
| 2006/0224946 A1* | 10/2006 | Barrett | G06F 40/18 |
| | | | 715/209 |
| 2007/0233811 A1* | 10/2007 | Rochelle | G06Q 10/10 |
| | | | 709/219 |
| 2019/0121847 A1* | 4/2019 | Castaneda-Villagrán | |
| | | | G06F 40/186 |

* cited by examiner

METHOD TO EXECUTE A CELL WITH SHALLOW COPY INDICATOR IN FORMULA

MULTI-DIMENSIONAL SPREADSHEET SYSTEM ENABLING STACK BASED PROGRAMMING USING A VIRTUAL MACHINE

CROSS-REFERENCE TO RELATED APPLICATIONS

Not applicable

FEDERALLY SPONSORED RESEARCH AND DEVELOPMENT

Not applicable

FIELD AND BACKGROUND OF THE INVENTION

The present invention generally relates to spreadsheet software and specifically relates to new execution models of cells in a spreadsheet

DESCRIPTION OF THE PRIOR ART

Implementing full programming logic in a spreadsheet system is usually done using additional programming languages such as visual basic. Visual basic is a scripting language that not everyone using a spreadsheet may be familiar with. It provides a rich set of features and a new syntax that is different from the usual equal to formula based instructions in a spreadsheet cell and thus is suitable only for advanced programmers.

Spreadsheets offer a simpler interface to write instructions to be executed in relation to one another using formulae in cells represented with an equal to prefix. Users can write formulae in any of the cells of a spreadsheet that use values from other cells. This way a user can setup a dependency graph of cells in a spreadsheet which is traversed and executed by the spreadsheet engine and all cells are updated as a single unit tied to the dependency graph. The order in which each cell is executed is nondeterministic as it is based on the dependency graph where a cell may be dependent on multiple parents.

So, if a user wants to implement a conventional stack based program using only spreadsheet cells and without launching an additional scripting environment, it is not possible to do this with any known spreadsheet systems of prior art.

It is the object of present invention to offer a combination programming environment enabling conventional stack based programs to be implemented using only cells of a spreadsheet without needing an additional programming environment. This is accomplished by associating a virtual machine with the spreadsheet system and partitioning cells in a spreadsheet into blocks of cells to be executed by the virtual machine. Execution order is based on a call sequence setup between the blocks of cells and then a sequential order is used inside any block. Dependency based execution is also provided as an optional feature for each block.

A stack based program needs many features from its programming environment. Below is a description of the mandatory features needed to implement a stack based program that is not known to exist in any known spreadsheet systems of prior art.

a) Functions and Procedures Must Run in Independent Memory Context Based on a Stack Memory Functions are a series of instructions that are executed based on a set of inputs or global variables and return one or more values as a result of the function execution. Procedures are a series of instructions that are executed based on a set of inputs or global variables and do not return any value but may set values in an in/out parameter or a global variable.

Below paragraphs may use the keyword function to describe features for both functions and procedures.

In conventional programming environments, both functions and procedures run by allocating space in stack memory for local variables, parameters and return values. This way a function or a procedure offers a programmer a way to auto allocate needed variables and initialize them for each call and then release such memory upon exit of the function or procedure. This saves a programmer a lot of code for such temporary allocations and de-allocations thereby simplifying and reducing overall code. Smaller and cleaner code is more maintainable. Also, executing functions and procedures in context of per call stack memory is mandatory to support recursive calls.

Recursive calls are those where a function or a procedure calls itself directly or indirectly. This can work only if each call is executed in its own memory context provided by the programming environment. Otherwise recursive calls will overwrite variables of a previous call resulting in unpredictable results.

So, in order to implement a stack based program using only spreadsheet cells, we need a way to associate a set of cells with an independent memory context on a per execution basis. Such a system is not known to exist in any known prior art system.

Some prior art spreadsheet systems offer a separate function sheet to setup a set of instructions and call them functions. But these execute instructions in place by using cell memory as the source and target of execution for all calls. So, if we try a recursive call in such functions, it will result in overwriting values from previous call frame.

So, these sets of instructions in prior art spreadsheet systems referred further below as prior art functions are not true functions when compared with stack based functions of conventional programs.

b) Conditional Execution of Sets of Instructions is Needed for Recursive Calls

In order to support recursive calls, we need an ability to conditionally execute instruction sets. Since recursive calls use the same function iteratively, we need a way to conditionally execute the recursive call and stop calling the same function if an end condition or a recursion termination condition becomes true.

This is not possible in any known prior art spreadsheet systems as such systems do not offer a way to execute a subset of instructions conditionally as here is no way to define subset of cells inside prior art functions and specify a way to execute them conditionally.

This is another reason recursive calls are not possible in any known spreadsheet systems of prior art.

c) Conditional Execution of Unnamed Sets of Instructions is Needed for Co-Locating Related Set of Instructions Instead of Creating a New Function for Each Such Set.

In order to support conventional programming, any function or procedure will need to execute a set of instructions conditionally based on local variables, global variables or input variables. This set of instructions cannot be made into another function without loss of readability as such instructions are best understood in place where they belong as part of other related instructions such as in if then else block of a conventional program.

This is not possible in any known spreadsheet systems of prior art as such systems do not offer a way to execute a subset of instructions conditionally inside prior art functions as there is no way to define subset of cells inside such prior art functions and specify a way to execute such a subset conditionally.

d) Ability to Set Values from One Cell to Another Target Cell is Needed

Conventional programs offer an ability to address variables using names and using a name one can set a value into that variable any number of times. But in all known spreadsheet systems of prior art, one can only assign a value into a cell using its formula which is a get operation. There is no way to set a value of another cell from one cell. This makes it very hard for a conventional program to be written just using existing equal to formula semantics. So, we need a way to set any cell value or its formula from another cell and address corresponding dependency graph executions.

Such a system of providing an ability to set a target cell value or its formula and selectively execute the target cell and its dependencies does not exist in any known spreadsheet system of prior art. Without this feature a conventional software programmer will be highly limited in sequencing instruction execution appropriately.

e) Ability to Set Global Variables or Dependent Variables Outside a Set of Instructions is Needed Spreadsheet systems of prior art including those that propose a function sheet to isolate a set of instructions to be executed separately from main sheet. This is not sufficient as in conventional software programs, a function or a procedure can also read and write to global variables outside the scope of a function or procedure.

In order to simulate this behavior using just spreadsheet cells, we need a way to isolate a set of cells inside a spreadsheet into a block and have the ability to execute cells inside this block sequentially and then have the ability to set values outside this block or execute cells outside the block using a dependency graph. Such a system is not known to exist in any known prior art.

Prior art systems that propose function sheets isolate set of instructions into separate sheets where execution of such function sheets is isolated to such sheets only and cannot use a dependency graph to change cells in other sheets. So, if we treat cells outside a prior art function as global variables, then those cells cannot be set if there are changes to cells inside such prior art functions as the dependency manager for such sheets is isolated from other sheets. Also, prior art functions do not offer a way to set values to other cells as seen in previous point d), thus not providing any means to set global variables.

f) Ability to Partition Cells in any Sheet into Named Blocks of Instructions is Needed that Will Execute in Context of Stack Memory Frame and Optionally Execute Corresponding Dependency Lists.

In order to simulate any set of cells in a spreadsheet to be similar to a conventional program function or procedure, we need an ability to isolate these set of cells in any spreadsheet into a protected zone which the dependency manager cannot navigate into unconditionally. These cells will run in context of a stack memory frame further referred to as named blocks in present invention. This stack memory provides isolation of one execution from another in the same call sequence such as in recursive calls or in multiple call sequences. Execution of these blocks must also support optional execution of dependent cells.

Without an ability to partition any spreadsheet into blocks, one cannot setup a function equivalent that has access to global variables referring to cells outside this block. Also, without the ability to auto update dependent cells both inside and outside the block one cannot simulate multiple global variable set operations without using a specific set macro.

Such a system where any sheet can be partitioned into named blocks and execute these blocks in reference to stack memory is not known to exist in any known spreadsheet systems of prior art.

g) Ability to Partition Cells in any Sheet into Unnamed Blocks of Instructions is Needed to Support Writing Groups of Related Instructions in Proximity to Each Other.

Most conventional programming environments have functions or procedures with embedded block of instructions that are conditionally executed. These instructions cannot be moved to a separate function as that would break the flow of readability and also impose function call overheads. So, to simulate a conventional stack based function with embedded conditional blocks in spreadsheet cells it is mandatory to partition sections of a named block of cells into unnamed blocks that can be executed conditionally.

This feature is not known to exist in any known spreadsheet systems of prior art as there is no way to setup an unnamed block that is executed on a condition.

h) Ability to Run Set of Instructions in a Loop.

Most conventional programming environments provide a loop syntax to run a set of instructions with a predefined number of loops or number of loops based on one or more conditions. In order to simulate this in a spreadsheet one needs an ability to specify blocks of instructions inside prior art functions and then execute those blocks based on loop conditions.

This feature is not known to exist in any known spreadsheet systems of prior art.

i) Ability to Partition Dependency List for Each Block of Cells and Execute it for Each Corresponding Call Frame of Said Block.

Most spreadsheet systems have one dependency manager list that is executed across all sheets as a single graph. But some spreadsheet systems of prior art that define function sheets execute parent level dependency only upon execution of functions in such function sheets. But this is insufficient to execute children level dependency and is insufficient when calls are recursive. We need a system where for each call frame a dependency list is executed. This will enable simulation of sequential execution inside a block of cells and then dependency based execution inside and outside the block of cells on a per call frame basis, thus simulating global variable set operations on a per call frame basis.

This feature is not known to exist in any known spreadsheet systems of prior art.

j) Ability to Suspend Execution at any Instruction and Resume is Needed to Support Asynchronous Operations Conventional programming environments provide a way to suspend execution on any instruction and resume after the suspension point. This enables such systems to wait for asynchronous operations that are provided by programming environments. This asynchronous operation can be one of asynchronous image loading, asynchronous network query, asynchronous timer based instruction execution and support for a debugger to execute one instruction at a time.

This is not possible in any known spreadsheet prior art systems including those with function sheets as there is no instruction to intercept a cell evaluation executed by dependency managers.

For writing complex stack based software programs using spreadsheet cells, one needs to be able to debug at an individual instruction level and for this we need an ability to suspend and resume instruction evaluation in spreadsheet cells.

This feature of suspending cell execution is not known to exist in any known spreadsheet system of prior art.

Following paragraphs in current section describe relevant prior arts in this field.

Prior art U.S. Pat. No. 7,266,763 proposes a function sheet where a user can define a set of instructions as a function that can be used as a traditional spreadsheet macro. This system suffers from various issues mentioned in the above points a) through j).

First, a function in this prior art is not associated with a stack frame memory context to execute cells in reference to, hence this is not a true function as compared with a conventional function of a software program. This prior art function cannot support recursive calls as it executes in place. Also, this prior art function cannot support repeat calls if any of the cells retains a value from previous execution and gets used in the next. In conventional program functions, all parameters and local variables are initialized before any execution and all changed values are freed upon pop of that function call frame. So, for each call we will start with initialized values. This is not possible in this prior art function as it executes in place leaving all previous changes in cells.

Second, all functions in a function sheet of this prior art are isolated from main sheet that calls this function. Thus, the main sheet cannot refer to any cells inside this prior art function and get automatically updated using dependency manager as changes in function sheet are isolated to only that sheet. This means a global variable set operation cannot be simulated using a dependency manager run of this prior art function to change values outside the function.

Third, since all functions in this prior art have to be in separate function sheets, there is no way to co-locate related instruction sets in context of a parent sheet. So, if a user has to refer to cells in non-function sheets, he will have to use additional sheet prefixes for each such reference hence making the code less readable. Isolating functions into separate sheets will also mean that a user would have to jump back and forth between main sheet and function sheet to track executions, further slowing down the development process.

Fourth, there is no mention of procedures that are set of instructions that do not return values as the only way a function in this prior art can be used is as an equivalent to built-in macros. But in conventional programs, one can write procedures that manipulate input or global variables or do some other external operations without having to return a value. This is not possible in this prior art.

Fifth, there is no mention of an ability to suspend and resume execution to support features such as debuggers. This is not possible in this prior art as there is no way to intercept cell execution.

Sixth, there is no mention of blocks of instructions inside functions of this prior art. Thus, one cannot execute a subset of set of cells in these prior art functions.

Seventh, there is no mention of conditional execution of a subset of cells inside these prior art functions.

Eighth, there is no mention of ability to execute a set of cells inside these prior art functions in a loop as there is no support for a loop construct.

So, as can be seen from above, having a separate function sheet to isolate a few instructions into a group is not sufficient to enable writing a full stack based program which needs a full virtual machine supporting stack based call sequence and execution.

Prior art U.S. Pat. No. 9,037,961 proposes a function sheet where a user can define a set of instructions as a function that can be used as a traditional spreadsheet macro. This system suffers from all of the issues mentioned in the previous prior art section described above under U.S. Pat. No. 7,266,763.

In addition, there are some key points to note. This prior art mentions an ability to push cells in parent dependency list onto a stack to execute parent cells. But this stack is not the same as a stack frame created for all cells in a block as it only creates stack for parent cells. Parent dependency list based stack frames is not sufficient to enable recursive calls.

Also, there is no mention of children cells to be executed outside the function in this prior art. Thus, they cannot simulate global variable set as well.

As can be seen from above, none of the known prior arts provide a combination programming environment that enables anyone to code a stack based program using spreadsheet cells while leveraging dependency based execution as well.

OBJECT OF THE INVENTION

In description below, execution of a cell, execution of an instruction and execution of a formula all refer to execution of the formula instruction of a cell in virtual machine of present invention and hence may be used interchangeably.

Accordingly, several objects and advantages of the present invention are:
   a) to provide a spreadsheet system that enables partitioning of cells of any spreadsheet into blocks of cells and execute such blocks using a stack based virtual machine with stack based memory context for each block execution. This block based execution with stack memory context enables simulation of functions and procedures of a conventional stack based program including support for recursive calls, reentrant calls and multiple calls without the problems of one frame execution affecting memory context of another as in spreadsheet systems of prior art;
   b) to provide a spreadsheet system that enables setting up conditional execution of a set of cells inside a block of cells to prevent infinite loops in recursive calls by enabling implementation of a recursion termination check;
   c) to provide a spreadsheet system that enables setting up conditional execution of a set of cells inside a block of cells to support equivalent of if then else semantics of a conventional program;
   d) to provide a spreadsheet system that enables any cell to set values in other target cells and optionally execute cells in dependency lists corresponding to the target cells;
   e) to provide a spreadsheet system that enables setting variables outside blocks using dependency list execution to simulate automatic global variable set operations without having to use cell set functionality mentioned above point d) in this section;
   f) to provide a spreadsheet system that enables partitioning cells into named blocks wherein a named block can be called from any other cell in any of the sheets to create a call sequence similar to a conventional software program by associating each call to the named block with a stack memory frame in a virtual machine;

g) to provide a spreadsheet system that enables partitioning cells into unnamed blocks that are executed based on a condition. This will enable implementing related instructions in proximity to each other without having to write functions for each set of cells, thereby eliminating function call overheads;

h) to provide a spreadsheet system that enables executing a set of instructions in a loop. This will enable executing a set of instructions in named or unnamed bocks associated in a loop whose type is one of for loop, while loop, do while loop, and repeat until loop;

i) to provide a spreadsheet system that enables creating dependency lists for each stack frame created in virtual machine corresponding to named or unnamed blocks, so that we can execute such lists after each frame pop. This enables cells inside and outside a block to be executed optionally using dependency lists. Executing cells outside a block using dependency lists simulates setting global variables as in a conventional program and executing cells inside a block using dependency lists enables a block to have forward references as in a conventional spreadsheet, thus providing benefits of both sequential execution and dependency based execution when needed and j) to provide a spreadsheet system that enables suspending and resuming of the virtual machine of present invention to support asynchronous operations. This enables implementing debugger functionality, asynchronous network queries, timer event handling and other event handling such as user interface event handling.

SUMMARY OF THE INVENTION

In accordance with present invention, a spreadsheet system is described that provides a combination programming environment that enables cell execution in sequence and optionally using dependency lists. This is achieved by associating execution of cells in a spreadsheet with a stack based virtual machine thus avoiding the need for a separate programming environment such as visual basic.

Stack based programs in a spreadsheet system need a virtual machine that can track call sequences using a push pop call operations among functions so that each function can execute with reference to its own copy of local variables and parameters supporting different types of call sequences including non-recursive calls, recursive calls and reentrant calls.

The spreadsheet system of present invention enables implementing stack based programs in a spreadsheet by enabling users to partition a range of cells in any spreadsheet as named blocks and then setup a caller callee relation among these blocks to simulate a conventional functional or procedural call sequence that is executed in an associated virtual machine.

Each cell with a formula in the sheet is regarded as an instruction to the virtual machine. A caller callee relation is established when a caller cell initiates a call to a callee block using callee block name in the caller cell formula.

Once a caller callee call sequence is established, the virtual machine executes cells in the needed call sequence and optionally based on a dependency order. This combination execution semantics offers several benefits mentioned in the advantages section above and does not exist in any spreadsheet system of known prior art.

The call sequence is executed by associating stack frame memory in the virtual machine for each block. This stack frame memory stores several block level attributes including the range of instructions to be executed per block, currently executing instruction and optionally all the values in cells associated with the caller block. After callee blocks are done, the saved values are brought back to caller block so that instructions after embedded calls can execute in reference to saved values, thus providing a separate memory context for each set of cells when needed as compared with spreadsheet systems of prior art where a prior art function executes in place without making any copies or restoring copies.

This ability to save block cell values before calling another block provides a key advantage to any stack based program where previous calls to the same block do not impact the values in subsequent calls or vice versa. This enables repeat calls, recursive calls or reentrant calls.

This feature of executing a range of cells in a spreadsheet in context of a stack memory is not known to exist in any known spreadsheet system of prior art. At best, prior art systems prescribe a set of cells as functions and execute corresponding formulae of cells in place using a single copy of cell memory. So, such systems cannot offer a platform to implement a full stack based program that need ability to make repeat calls, recursive calls and reentrant calls without the side effects of overwriting cell values between calls.

The virtual machine of present invention also computes the dependency list associated with each block of cells dynamically and executes this dependency list upon popping the frame associated with any block upon its completion. This dependency list may be a child dependency list or parent dependency list.

This feature of executing dependency list on a per block frame basis enables any cells outside named blocks that refer to cells inside blocks to be auto updated by executing the child dependency list. This is another key advantage of present invention as computations inside a named block may be percolated outside the block without having to collect changes into an out array and passing that to the caller, and then caller having to disassemble this array into independent cells. This feature of using dependency manager to selectively and on a per block basis update cells outside a block simulates a conventional function updating global variables. This is another key advantage of present invention and is not known to exist in any known spreadsheet system of prior art.

In addition, one may define unnamed blocks of cells inside blocks supporting conditional executions to simulate conventional programming constructs such as an if then else, for loop, while loop, do while loop and repeat until loops. The present invention also supports exiting named or unnamed blocks in the middle of execution using a break instruction. This way a loop may be exited in the middle or a block may be exited in the middle. This is very important to support recursive calls or control number of loops a set of instructions has to run. This is another key advantage of present invention and is not known to exist in any known spreadsheet system of prior art.

As can be seen from above, the present invention uses a single virtual machine to execute instructions in cells using a combination of stack based call sequence order and a dependency based order. Call sequence order enables blocks to be executed in sequence, and then each block is executed in sequential order. In addition, this virtual machine also executes dependency lists when needed on a block level basis.

One of the key aspects of a conventional stack based program is predictable sequential execution within a call sequence. The present invention provides that and in addition offers advantages of execution using dependency list as well.

Such a combination of predictable sequential execution and optional dependency based execution is not known to exist in any known spreadsheet system of prior art.

In other words, there is no spreadsheet system in known prior art that can be used to implement a full stack based program using just spreadsheet cells without the use of external programming environments such as visual basic.

At best, spreadsheet systems of prior art partition set of cells into another sheet called function sheet and call these set of cells as functions, but these prior art functions are not truly functions as compared with conventional programming environments. Functions in conventional programming environments execute in context of stack based memory, providing memory isolation between calls and support repeat calls, recursive calls and reentrant calls. Thus, none of the known spreadsheet systems of prior art can replace a full programming environment such as that provided by environments like visual basic.

The spreadsheet system of present invention is unique in providing an execution environment where one can implement a full stack based program just using spreadsheet cells due to its coupling of cell execution with a virtual machine.

Figure 1:
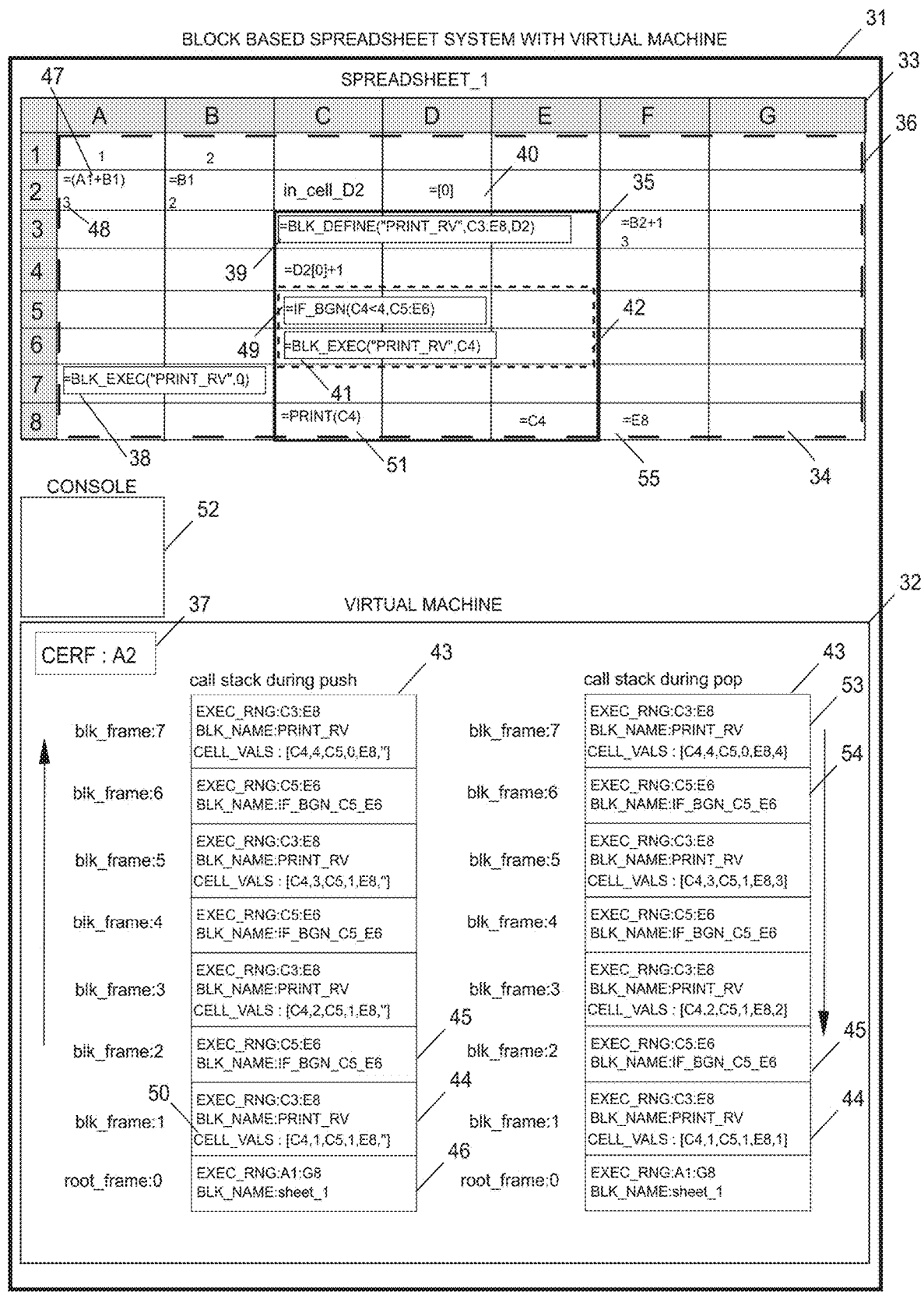
FIG. 1 illustrates block based spreadsheet system of present invention including a first embodiment setup for executing a recursive call.

DRAWINGS—REFERENCE NUMERALS 31 block based spreadsheet system
32 virtual machine
33 spreadsheet
34 cell
35 named block
36 sheet block
37 current execution cell reference
38 caller cell
39 block define cell
40 named block input cell
41 recursive caller cell
42 unnamed block
43 virtual machine stack
44 named block stack frame
45 unnamed block stack frame
46 root stack frame
47 'formula
48 formula result
49 if condition cell
50 cell values in named block
51 print cell
52 console
53 topmost block frame
54 top minus one frame
55 last cell
56 dependency compute engine
57 sheet block dependency list
58 named block dependency list
59 additional stack frame
60 block dependency child list with forward reference
61 cell with np prefix in formula
62 cell with network event dependency
63 cell with timer event dependency 64 dependency optimization engine
65 computing device
66 input output component
67 central processing unit component
68 RAM component
69 persistent storage component
70 general purpose processor
71 graphics processing unit
72 unnamed block using IF_BGN macro
73 IF_BGN instruction cell to setup else part
74 unnamed block using LOOP_FOR macro
75 current loop index array slot
76 cell with a break instruction
77 frame for IF_BGN unnamed block
78 cell with GROUP macro
79 group one stack frame
80 group one related origin information
81 canvas capable of drawing graphics primitives
82 rectangle one
83 GR_1_1 related stack frame
84 rectangle two in canvas
85 rectangle three in canvas
86 last cell in block
87 cell values array in stack
88 cell with LINK macro
89 LINK macro stack frame
90 asynchronous native call suspension point
91 combination stack frame for native stack
92 right triangle
93 timer cell
94 second rectangle
95 user interface button set breakpoint
96 user interface button step over
97 user interface button named continue
98 text box for conditional breakpoint
99 breakpoint cell
100 step over arrow in spreadsheet
101 step over arrow in stack frame
102 second named block
103 recursive stack frame
104 pixel RGBA array
105 copied triangle
106 step
107 step
108 step
109 step
110 step
111 step
112 step
113 step
114 step
115 step
116 step
117 step
118 step
119 step
120 step
121 step
122 step
123 step
124 user interface associated cell
125 step
126 step
127 step
128 step
129 step
130 step
131 step
132 step
133 step
134 step
135 step
136 step
137 step
138 step
139 step
140 step
141 step
142 step
143 cell with CNVS_IMG macro
144 step
145 step
146 cell that is associated with a synchronous native call
147 step
148 step
149 step
150 step
151 step
152 step
153 step
154 step
155 a cell with CELL_SET macro
156 step
157 step

DETAILED DESCRIPTION

In below descriptions, a reference to a cell in spreadsheet may be made using conventional spreadsheet references such as A1, B2 etc. and/or have a reference numeral setup in the associated figure. In places where extra clarity is needed, a reference numeral is also used. So, not all cell references in the description have a reference numeral as sometimes adding a reference numeral with its associated indicator line may make the drawing less readable.

Also, in description below, executing a cell or executing a formula or executing a macro or executing an instruction in virtual machine are one and the same and may be used interchangeably.

FIG. 1 illustrates block based spreadsheet system 31 of present invention including a first embodiment setup for executing a recursive call.

In below description of present embodiment, first parts of the system are described and then an execution scenario using the parts is described later.

Block based spreadsheet system 31 is comprised of one virtual machine 32 and at least one spreadsheet 33. A spreadsheet may also be further referred to as a sheet in further description.

Spreadsheet 33 is made up of a set of cells arranged in two dimensional order. Each cell 34 can be in an empty or non-empty state. In non-empty state, a cell may hold one or more types of values including a scalar value, a one dimension array value, a multidimensional array value and a formula instruction. For example, some cells may have just a scalar value, but others may have a formula value and a scalar or an array value.

Spreadsheet 33 also has one or more named block of cells as in a named block 35. Named block 35 represents a sequential subset of cells in a spreadsheet. Named blocks in present invention are setup using BLK_DEFINE macro. Named blocks such as 35 simulate a protected region of cells that a dependency based execution cannot get into automatically. Cells inside 35 are first executed sequentially and then optionally using dependency list which may span outside named block 35 too. Execution sequence can be controlled using a parameter to BLK_DEFINE macro. So, some blocks may be setup only for sequential execution and some can be setup for both sequential and dependency based execution. Some blocks may be marked for recursive calls or reentrant calls across threads too.

Virtual machine 32 executes cells in named blocks and cells outside named blocks. Execution can start at the first cell with formula in a sheet outside any named block or an external event can be tied to execute a named block as a starting point. Cells outside named blocks belong to a sheet block such as sheet block 36. Virtual machine 32 tracks the current cell being executed in current execution cell reference 37.

When executing cells in sheet block 36, cells in named blocks are skipped. This simulates a global and local space scenario of a conventional stack based software program such as one written in Javascript. In Javascript, one can write functions or procedures and can also setup global variables that can be read or written to by any of the functions or procedures. One can have code in global space as well, that is executed upon loading of a HTML page associated with a Javascript program.

Sheet block 36 simulates the global space where we can have sheet block cells that contain formulae to simulate global instructions and sheet block cells having scalar or array values simulating global variables. So, having an ability to partition any sheet into blocks enables separation of cells into global and local space and this is possible only because virtual machine 32 is programmed to skip embedded blocks while executing cells in sheet block. This ability to partition a sheet into global and local spaces is not known to exist in any known spreadsheet system of prior art.

Named block 35 is executed by executing caller cell 38. Caller cell 38 has in its formula the name of named block 35 along with additional parameters. In present embodiment, caller cell 38 uses BLK_EXEC macro to execute instructions in a named block. A macro in present invention setup in spreadsheet 33 is similar to a conventional spreadsheet macro such as an excel macro, except that in present invention, this macro need not return any value as it can execute like a procedure of conventional software program that does not return values. Ability to run a block of cells as a function or a procedure that is with or without a return value is not known to exist in any known spreadsheet system of prior art.

Named block 35 is defined using macro BLK_DEFINE as in block define cell 39. Here it defines named block 35 with cells C3 to E8 as the range of cells in this block. BLK_DEFINE macro optionally takes in another parameter after the range to represent input value. Here the input value is copied to named block input cell 40 at D2. When a call is made from a caller cell 38 into named block 35, any input value from caller will be copied into cell D2 which is then used by cells inside named block 35. Input value can be either a scalar that is copied or can be an array that is copied using shallow or deep copy methods into cell D2.

Caller cell 38 calls named block 35 with block name PRINT_RV that represents a block that prints a sequence of numbers 1, 2, 3, 4 in reverse as 4, 3, 2, 1. Block 35 calls itself in recursive caller cell 41 at C6 by using BLK_EXEC macro thus establishing a direct recursive call. Recursion can only be supported if each block call is executed in a separated memory context so that subsequent call frames in a call sequence do not impact values of cells in previous call frames.

This memory context separation is achieved by using stack based virtual machine 32 to execute cells in any block. Sheet block 36 is usually a starting block and is associated with one stack frame in virtual machine 32. But a named block may be associated with one or more stack frames in virtual machine 32. A block may be associated with one or more stack frame if it is part of a direct or indirect recursive call sequence.

A call sequence may have direct recursive calls or indirect recursive calls. In direct recursion such as that shown in present embodiment, a block calls itself in the block cells using macro BLK_EXEC. But in indirect recursion, a first block may call second block which in turn can call back into first block again. There can be more than one calls between first block and the indirect recursive call.

In addition, associating a separate stack frame or memory context for each block in virtual machine 32 enables reentrant calls as well. In conventional software programming, a reentrant call is when a function can be called simultaneously in more than one threads. This again is possible only if a function can execute in its own memory context by associating blocks with a separate memory context in virtual machine 32. Thus, associating a block of cells with a memory context in virtual machine 32 enables recursive and reentrant calls. This feature is not known to exist in any known spreadsheet system of prior art.

Named block 35 can also contain one or more unnamed blocks. An unnamed block such as unnamed block 42 can be associated with conditional executions such as an if statement or a loop. In present embodiment, cell C5 has a macro IF_BGN which indicates that it is a beginning of a range of instructions that are executed if a condition in its first parameter evaluates to true. Second parameter to IF_BGN represents the range associated with this if block. All cells after C5 till E6 are evaluated if the condition "C4<4" in first parameter evaluates to true, otherwise this unnamed block is skipped.

Each unnamed block is also associated with a stack frame in virtual machine 32 based on its position in a call sequence.

Virtual machine 32 hosts a stack of memory to hold information about currently executing blocks including copies of values in each of the blocks based on a call sequence. This virtual machine stack 43 grows when one block calls another or the execution descends to an unnamed block inside a block using a push operation. When instructions in an unnamed block or any block are finished executing, stack 43 shrinks using a pop operation.

In the present embodiment, a sequence of calls to named block 35 and unnamed block 42 is shown with both push and pop operations. It can be seen that for each BLK_EXEC instruction there is a corresponding named block stack frame 44 and for each IF_BGN instruction there is a corresponding unnamed block stack frame 45.

This concludes the description of parts needed to understand the below execution scenario for present embodiment.

Given the above information about blocks, caller cells, virtual machine stack frames etc., we will walk through the execution scenario of present embodiment when spreadsheet 33 is loaded and a recursive call sequence is executed that calls named block 35 recursively. The goal of this execution is to print the numbers 1, 2, 3, 4 in reverse order as 4, 3, 2, 1. We use post recursion code that is called in reverse order to print a cell value associated with each block call to get the needed result.

When spreadsheet 33 is loaded in spreadsheet system 31, virtual machine 32 is used to start execution at the first cell with a formula in sheet block 36. In present embodiment, cell A2 is the first cell in spreadsheet 33 with a formula "=(A1+B1)". But this execution is done only after root stack frame 46 is loaded in virtual machine stack 43 corresponding to sheet block 36. Root Stack Frame 46 is setup to enable execution of cells in sheet with range A1:G8. This range can be any range up to the maximum number of cells in spreadsheet 33. In present embodiment, we have chosen to limit this range to cell G8 for exemplary purposes. After loading the stack frame for sheet block 36, virtual machine 32 starts executing all cells with formula in the range associated with sheet block sequentially. This sequential execution will be done even if there are forward references in sheet block to guarantee sequential execution first before optionally executing using dependency list. This sequential execution first model is critical to enable a stack based program to be implemented using just the spreadsheet cells.

So, virtual machine 32 will first execute sheet block 36 cells sequentially and after it has finished execution sequentially it can optionally execute cells using a dependency list to resolve any cells with forward dependencies. Forward dependency occurs when a first cell has in its formula, a reference to a second cell that occurs after the first cell in the two dimensional order of spreadsheet cells. That is the second cell has at least its row or column index greater than the first cell.

This way a programmer using the spreadsheet system 31 of present invention is guaranteed a predictable sequential execution first and then a dependency based execution. This ability to run cells sequentially and using a dependency list selectively is not known to exist in any known spreadsheet system of prior art.

In this sequential execution cell A2 is executed first as that is the first cell in sheet block 36 with a 'formula 47. This formula is shown in this figure as =(A1+B1) at cell A2. But before such an execution can begin, virtual machine 32 pushes root stack frame 46 in its stack memory corresponding to sheet block 36. Root stack frame 46 stores the range of instructions to run as a range A1:G8.

The result of executing cell A2 is a scalar value that is shown as formula result 48. Spreadsheet system 31 may show one or more values in a cell including its formula and its result or just one value. This may be configured by a user. In the present embodiment, cell A2 is showing both the formula and corresponding result after execution for exemplary purposes.

After executing cell A2, virtual machine 32 moves current execution cell reference 37 to B2, then to D2, then to F3 to execute each of the cells respectively. It can be seen that cell C3 is skipped as it is part of named block 35 and all cells within any named blocks are skipped when a sheet block is being executed until virtual machine 32 reaches a caller cell 38 at A7. A caller cell has in its formula a block name of a callee block such as 35 to indicate that the execution must move to the new location of callee block.

So, after executing cell F3, virtual machine 32 executes cell A7 marked as caller cell 38. During execution of caller cell 38 virtual machine 32 pushes named block stack frame 44 onto virtual machine stack 43 and moves current execution cell reference 37 to cell C3. From here on, virtual machine 32 will execute cells in range C3:E8 sequentially for named block 35. Since cell C3 defines the block, the actual execution of block cells will start at cell C4. Defining the block and storing information about it is done during parsing phase of a sheet which comes before execution during load of a sheet.

Next, when virtual machine 32 reaches if condition cell 49 at C5, it sees an IF_BGN instruction in formula. This instruction tests the condition "(C4<4)" given in first parameter to be true, and if it is true then virtual machine 32 will push unnamed block stack frame 45 corresponding to range C5:E6 onto stack 43.

In present embodiment, during the first call to named block 35 this condition "(C4<4)" will evaluate to true as the first value passed in from caller cell 38 in its second parameter of its formula is zero, which is copied into input cell 40 and that is used in cell C4 in formula "D2[0]+1" which evaluates to one which less than four. So, execution moves into unnamed block 42 and corresponding stack frame 45 is pushed onto stack 43 and current execution reference is moved to cell C6.

At this point, virtual machine 32 executes recursive caller cell 41 at C6 containing a BLK_EXEC macro in its formula. This in turn will push another stack frame corresponding to the block being called. In present embodiment, this happens to be same named block 35 that is currently executing, thus establishing a recursive call. Before making this recursive call, virtual machine 32 will copy cell values in named block 50 into corresponding stack frame 44 and then push a new stack frame for 35 corresponding to a call at 41 at cell C6.

This process of executing named block 35 is repeated until the if condition "(C4<4)" at 49 at cell C3 becomes false. This cell will become false as cell C4 keeps increasing in value from one to four. Once this condition becomes false, no more BLK_EXEC calls are made in 35. Cell 49 at C6 with its if condition acts as the recursion terminating condition mentioned in advantages section. After the condition becomes false unnamed block 42 is skipped and execution reaches print cell 51 at C8.

Cell C8 uses the PRINT macro which will prints the value given to it in a console 52 associated with spreadsheet system 31. This console 52 may be hidden or always showing and is configurable by a user. PRINT macro can also print onto other output areas that may be part of the user interface of spreadsheet system 31. Upon the first execution of print cell 51 at cell C8, the last value of cell C4 is printed, and that will be four.

After print cell 51 at cell C8, cell E8 is executed and then the currently executing call frame corresponding to the topmost unnamed block 42 call is popped. Popping a block call frame for named block 35 puts back the current execution cell reference 37 to a cell after recursive caller cell 41. Popping also resets the instruction range to the range from the previous stack frame to resume execution after the end of previous block instruction. In present embodiment, this will be the frame associated with if condition cell 49 and the next instruction to execute will be a cell after recursive caller cell 41. But there are no more instructions in unnamed block 42 and so this block will pop as well. The topmost block frame 53 is shown as blk_frame:7, and top minus one frame 54 associated with if condition cell 49 is shown as blk_frame:6. So, after topmost block frame 53 is popped, the next frame 54 is popped. This once again sets the instruction range to be that of named block 35 and the current execution cell reference 37 to print cell 51 at C8. But before popping of topmost frame 53 corresponding to named block 35, all cell values that were saved for the caller block are copied back into cells of named block 35 thus reviving the memory context for the previous call frame corresponding to named block 35. This enables further instructions after unnamed block 42 to executed in context of the right values. So, after popping of top minus one frame 54 execution will resume at print cell 51 which will access values of cell C4 again, but at this point the value will be three and hence we will get a value of three in the console 52.

This process of popping is repeated until the first call to named block is made at caller cell 38 and during the popping of all block frames we will get print cell 51 executed in reverse order and hence we will see numbers 4, 3, 2, 1 printed on the console which was the goal of running a recursive block call sequence for named block 35.

After all stack frames associated with named block 35 are executed and all corresponding push and pop operations are finished, execution will move to last cell 55 at F8 and then the root frame 46 associated with sheet block is also popped and the execution in virtual machine 32 stops.

So, in summary the present embodiment illustrates how a stack based virtual machine 32 associated with block based spreadsheet system 31 can be used to implement a recursive program as in a conventional software programming language.

This feature is not known to exist in any known spreadsheet system of prior art.

In further embodiments describing system of present invention, it is assumed the same process of loading spreadsheet 33 is done and similar push pop operations are done for corresponding blocks. Hence these steps are not repeated unless executing a different named block, and only differences are highlighted in new embodiments.

Figure 2:
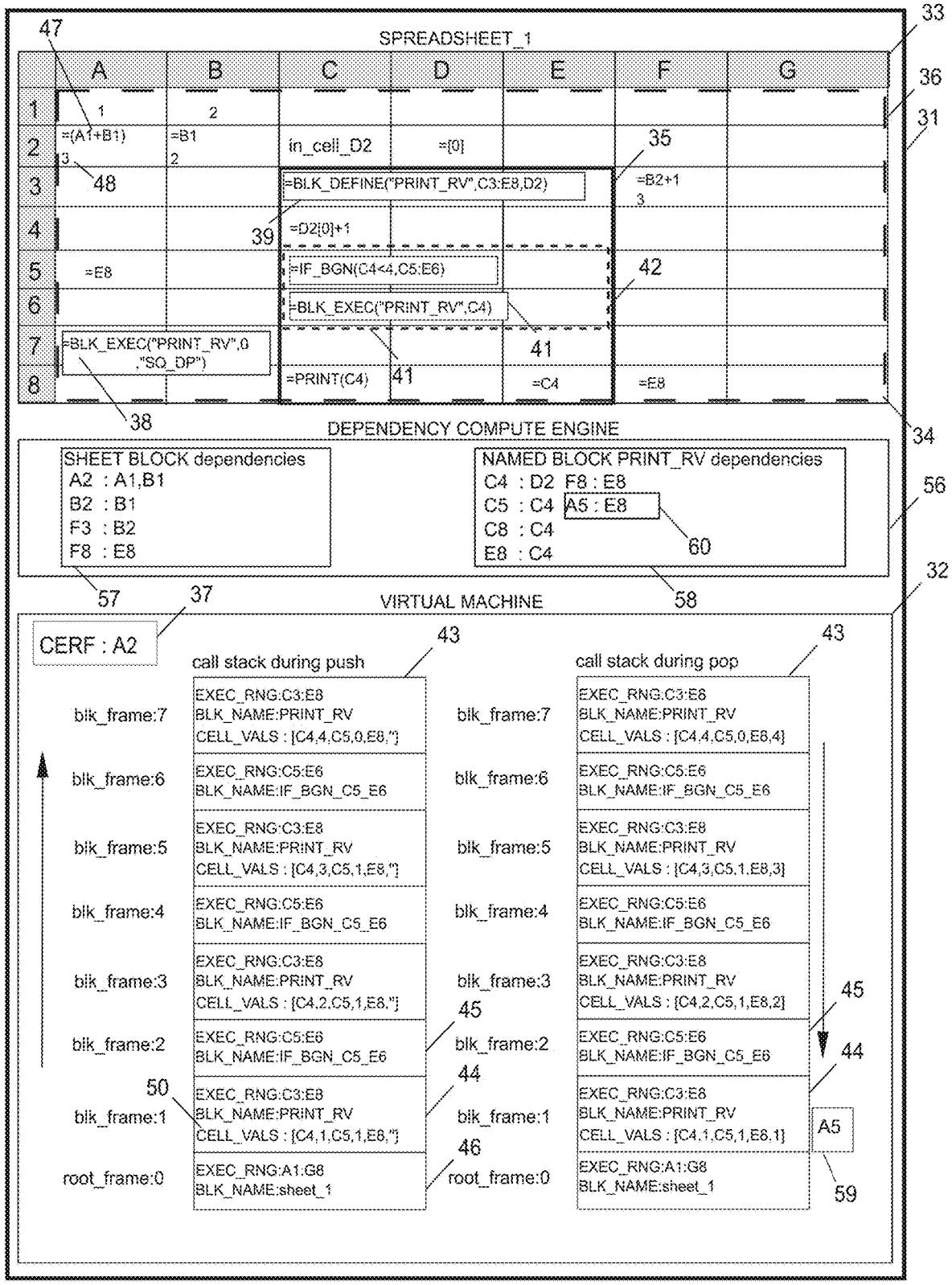
FIG. 2 illustrates the presence of dependency compute engine in block based spreadsheet system with an embodiment setup to execute a block level dependency list during pop frame operation

FIG. 2 illustrates the presence of dependency compute engine 56 in block based spreadsheet system 31 with an embodiment setup to execute a block level dependency list during pop frame operation.

In block based spreadsheet system 31, we can setup a block to execute cells in sequential order or dependency list based order or both. This option can be passed in as additional argument to BLK_DEFINE macro to indicate types of cell executions in a block. We can also pass this as an argument to BLK_EXEC macro that can dynamically control the behavior of cell executions so that the same block can be executed sequentially at one invocation and at another invocation may be executed sequentially with optional dependency list based execution or just dependency based execution.

In present embodiment, BLK_EXEC call at caller cell 38 has a third parameter indicating that both sequential and dependency based executions need to be performed. This is indicated at cell A7 that holds a macro BLK_EXEC ("PRINT_RV",0,"SQ_DP") in its formula. The value of third parameter "SQ_DP" indicates that execution of cells in named block 35 call must be a sequential execution followed by dependency list based execution. Since this flag is setup in BLK_EXEC macro at caller cell 38, only the first invocation has the two execution methods applied. Subsequent call to BLK_EXEC in recursive caller cell 41 does not have this flag and hence subsequent block executions are done sequentially only.

Also, dependency compute engine 56 stores two dependency lists. First list is sheet block dependency list 57 and second list is named block dependency list 58. These lists are different so that we can setup dependency list based execution for each block separately. A block based dependency list may be executed after sequential execution during pop frame operation or we may choose only sequential execution of a block or only dependency list based execution of a block.

Dependency list is formed based on parent child relations formed using cell references in formulae of cells. A first cell has a parent relation with a second cell if first cell has in its formula, a reference to second cell. In addition, second cell child list will have a reference to first cell forming the child relationship. Any cell can have multiple parents indicating that there can be multiple cell references in a formula, and any cell can have multiple children indicating that multiple child cells are referring to the same parent cell. When aggregated together a list of parent child relations, we may end up with a graph of cells but on a per cell basis we treat inter cell relations as parent or child relation.

Sheet block 36 may be executed with just a sequential execution or both sequential and dependency based run. This can be configured by a user like in a named block which can be configured using a parameter in BLK_EXEC macro or BLK_DEFINE macro. But since sheet blocks are executed at load time, a user may have an external option in user interface associated with system of present invention. Option to execute sheet block cells based on dependency list may also be figured out automatically by spreadsheet system 31 based on the layout of cells in sheet blocks. If there are forward references that need to be resolved after sequential execution, a sheet block may execute based on dependency list automatically.

In present embodiment, there is only one forward reference at cell A5 which refers to cell E8. But since cell E8 is inside a named block, dependency compute engine 56 will not add cell E8 as a parent of cell A5 during computation of cells in sheet block 36. So, there will not be any dependency based execution when sheet block is being executed.

But since named block 35 is called using BLK_EXEC macro with third parameter as "SQ_DP" at caller cell 38, the named block 35 is executed sequentially first and then a child dependency list based on forward references is used to execute cells during pop operation shown here as an additional stack frame 59.

In present embodiment, block dependency child list with forward reference 60 has only one child cell to execute based on a relation between cells A5 and E8. Cell A5 has a parent reference to cell E8 and so cell E8 has child relation to cell A5. Since this relation is also a forward reference from cell A5 to E8, dependency compute engine 56 will setup cell A5 for execution after cell E8 and corresponding block has been executed in virtual machine 32. Other dependencies in named block 35 are not forward dependencies and hence they do not contribute to child dependency list for execution.

Also, if a named block has a first cell with forward reference to a second cell in the same block, then first cell inside block may also be scheduled for dependency based execution during pop operation. This way some cells in block may be executed twice, first during sequential execution and then second time during dependency based execution.

But if a named block has a first cell with forward reference to second cell outside the named block, then first cell will not be part of dependency based execution of the block holding the second cell. This is because each block acts like a protected zone where external changes do not impact block internal cells. Changes in cells inside named blocks may affect cells outside in sheet block but not in other named blocks.

Recursive BLK_EXEC call in recursive caller cell 41 is not marked with executing dependency based list as its third parameter is empty. This indicates that only the first BLK_EXEC call in caller cell 38 should execute dependency based list before a block call frame pop.

This way cell A5 will be executed during sheet block sequential execution once and at that time will be marked with an error flag indicating a forward reference to be resolved as it refers to cell E8 which is inside named block 35 and that cell has not been executed yet. But after call at 38 is finished, block pop operation will execute cell A5 again and thus resolving the value of A5 with value in E8.

This shows an example of a block change percolating to outside the block thus simulating a global variable set in a conventional stack based program. This also shows how a dependency compute engine is used to achieve the automatic update of values outside a named block.

This feature is not known to exist in any known spreadsheet system of prior art.

Figure 3:
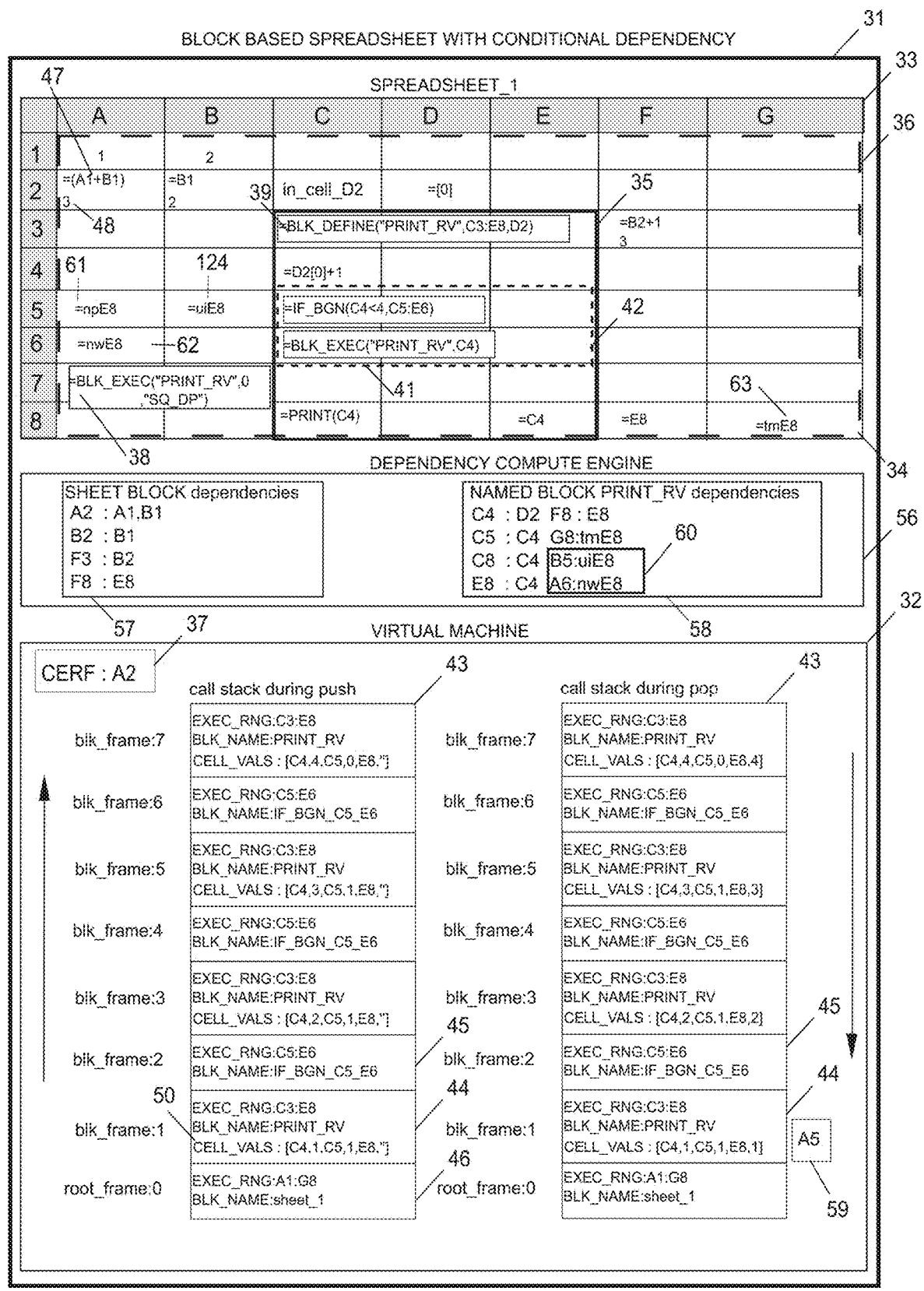
FIG. 3 illustrates a conditional dependency setup between cells.

FIG. 3 illustrates a conditional dependency setup between cells. This shows a cell with np prefix in formula 61 setup as "=npE8". Prefix "np" indicates to dependency compute engine 56 that it should ignore setting up a dependency between cells A5 and E8.

In previous embodiment illustrated in FIG. 2, cell A5 is executed after named block 35 is popped after call to it is finished from caller cell 38. But this behavior can be disabled using np prefix. So, it can be seen that in present embodiment, forward dependency list 60 does not have A5:E8. That means that even if the named block 35 is executed, its pop operation will not execute cell A5. So, we can have per cell level dependency control.

Similarly, cell B5 has a formula as "=uiE8". This indicates to dependency compute engine 56 that cell B5 is executed only when there is a change to cell E8 based on a user interface event.

This event could be from an external canvas associated with spreadsheet system 31 or could be within the spreadsheet system 31. For the present embodiment, we will consider an ENTER key on cell C3 to act as a user interface event. ENTER key on a cell with BLK_DEFINE in its formula will also execute this block in virtual machine 32. This can be used for test purposes to run a block in isolation without the need of a caller cell like 38. So, if a user hits the ENTER key on cell C3, virtual machine 32 will load a corresponding stack frame for named block 35 and then execute all cells in it sequentially as described in embodiment illustrated in FIG. 1. After finishing sequential execution, virtual machine 32 may optionally execute children cells in list 60. In present embodiment, we can see a B5:uiE8 as a relation setup in children dependency list 60. Since this relation is marked with a "ui" prefix and ENTER key is considered as a user interface event, this relation is considered allowable for dependency based execution of cell B5. Hence B5 is executed.

Network event based dependency execution can be setup by using formula such as "=nwE8". Cell A6 which is a cell with network event dependency 62 uses "=nw" prefix in its formula so that cell A6 will only be executed if cell E8 has changed in response to a network event.

Similarly, any cell can use "=tm" prefix to indicate that this cell will only be executed if the parent cell is changed due to a timer event. Cell G8 which is a cell with timer event dependency 63 uses "=tm" prefix in its formula so that cell G8 is executed if cell E8 has changed in response to a timer event All conditional dependency based executions are in addition to sequential sheet block based execution.

This feature of setting up conditional dependency on a per cell basis is not known to exist in any known spreadsheet system of prior art.

Figure 4:
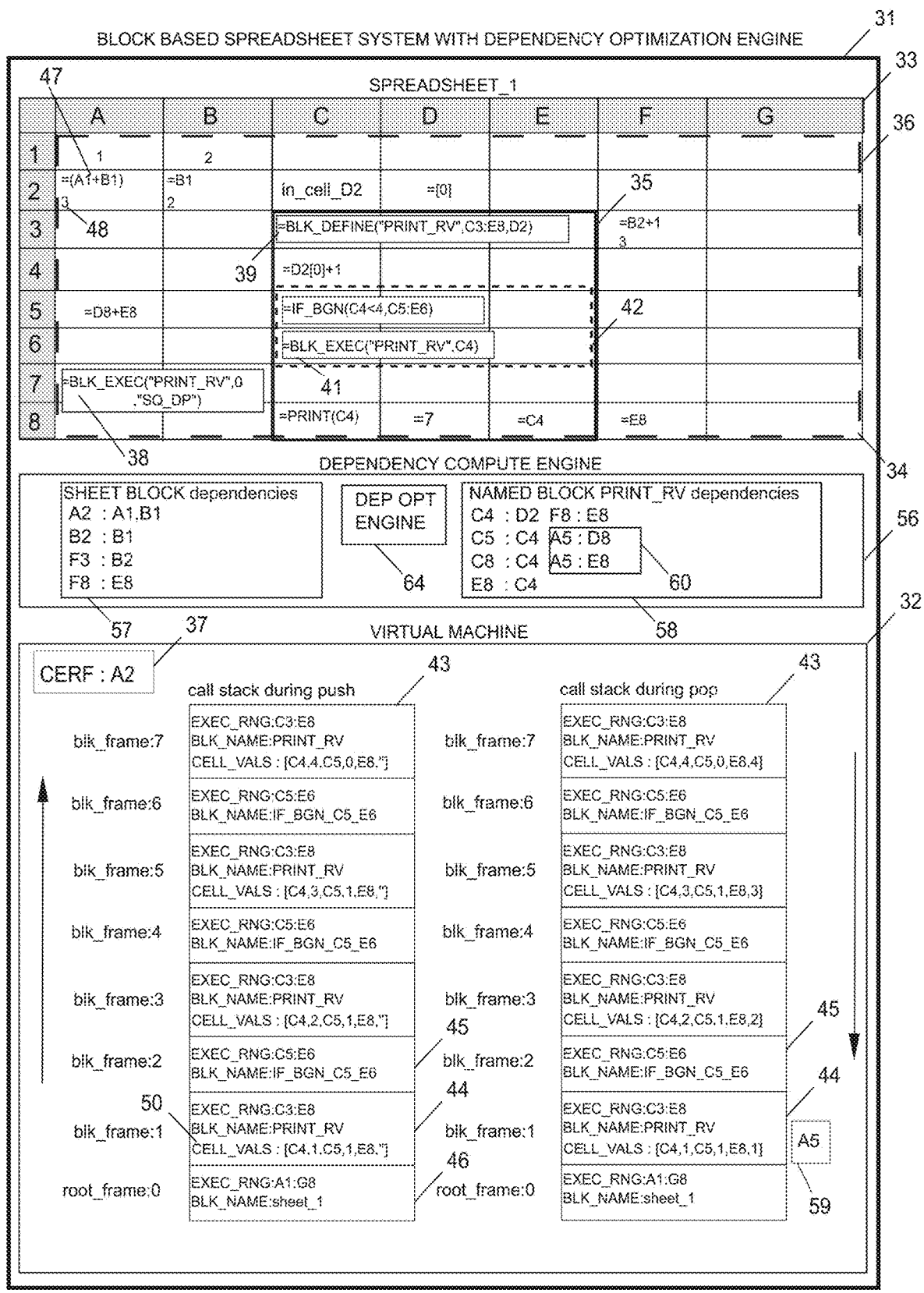
FIG. 4 illustrates the presence of dependency optimization engine as part of dependency compute engine.

FIG. 4 illustrates the presence of dependency optimization engine 64 as part of dependency compute engine 56 with in block based spreadsheet system 31.

This embodiment shows a cell with two parent references. Hence dependency list with forward references 60 has two entries. One shows that cell A5 is dependent on cell D8 and the other shows that cell A5 is also dependent on cell E8. Without dependency optimization engine 64, cell A5 may be executed twice after the block execution is finished. But with dependency optimization engine 64, cell A5 will only be executed once. This is because dependency optimization engine 64 will scan for duplicates and re-order dependency lists so that only the last parent in a list induces a child based dependency execution. So, in this embodiment cell A5 will only be executed once based on A5 to E8 dependency and A5 to D8 dependency will be skipped. This way dependency based executions are also guaranteed to be executed only once per dependency execution even though there are multiple parent references in a cell. But in the case only cell D8 is changed either by a user with manual data entry or via a sheet macro, and dependency based execution is also needed, cell A5 will be executed for a change in cell D8 as at that point there is only a single relation in the dynamic dependency list associated with cell D8. In such cases a single cell unnamed block is pushed into virtual machine and when that block is popped its children cells are executed.

Dependency compute engine 56 may be configured to execute cells of sheet blocks, named blocks and unnamed blocks. Similarly, dependency optimization engine may be configured to execute cells of sheet blocks, named blocks and unnamed blocks too.

This feature of exposing dependency optimization algorithm to a user so that one can plan the sequence of execution in a predictable manner is not known to exist in any known spreadsheet system of prior art.

Figure 5:
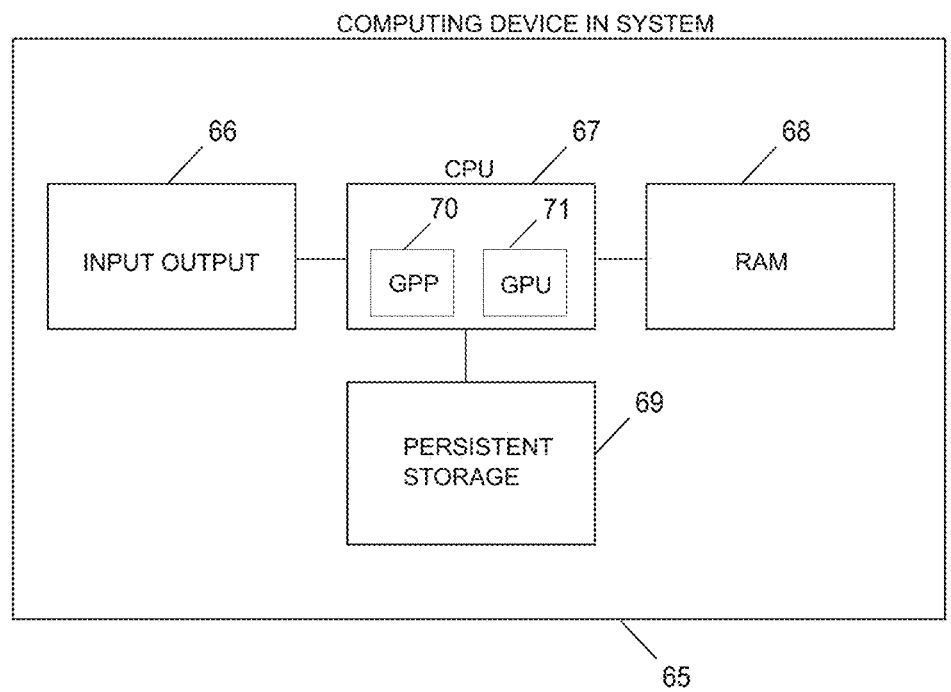
FIG. 5 illustrates a computing device of present invention.

FIG. 5 illustrates a computing device 65 of present invention.

It is comprised of an input output component 66, a central processing unit component 67, a RAM component 68 and a persistent storage component 69.

Central processing unit 67 is comprised of a general purpose processor 70 and optionally a graphics processing unit 71. In other embodiments graphics processing unit 71 may be outside central processing unit 67.

All software modules in spreadsheet system 31 are stored in persistent storage 69 and then loaded onto RAM component 68 for execution by central processing unit 67. Primary software modules are spreadsheet 33 and virtual machine 32.

General purpose processor 70 executes software instructions implementing software for spreadsheet 33 along with software for virtual machine 32. Virtual machine 32 executes instructions in formulae of cells of spreadsheet 33 that are partitioned. Visual output of executing spreadsheet 33 and virtual machine 32 is sent to input output component 66 via graphics processing unit 70 if present.

Graphics processing unit 70 can be as part of the same chip as general purpose processor 70 or can be an external component associated with general purpose processor 70. Graphics processing unit 70 is used to accelerate graphics instructions to draw complex objects using simple graphics primitives such as lines, rectangles, triangles, arcs, polygons, points, paths, texts, Bezier curves and images.

Persistent storage 69 can be based on a flash disk technology or a magnetic media.

Output component of input output component 66 can be one of display, printer or a network interface.

Input component of input output component 66 can be keyboard, mouse, pointer, touch panel, camera, microphone.

RAM component 68 may be made up one or more RAM chips that may be accessed using thirty two bit or sixty four bit or greater memory bus. In some kinds of devices some amount of RAM may be part of central processing unit 67 to implement a cache and some amount of RAM may be external.

Figure 6:
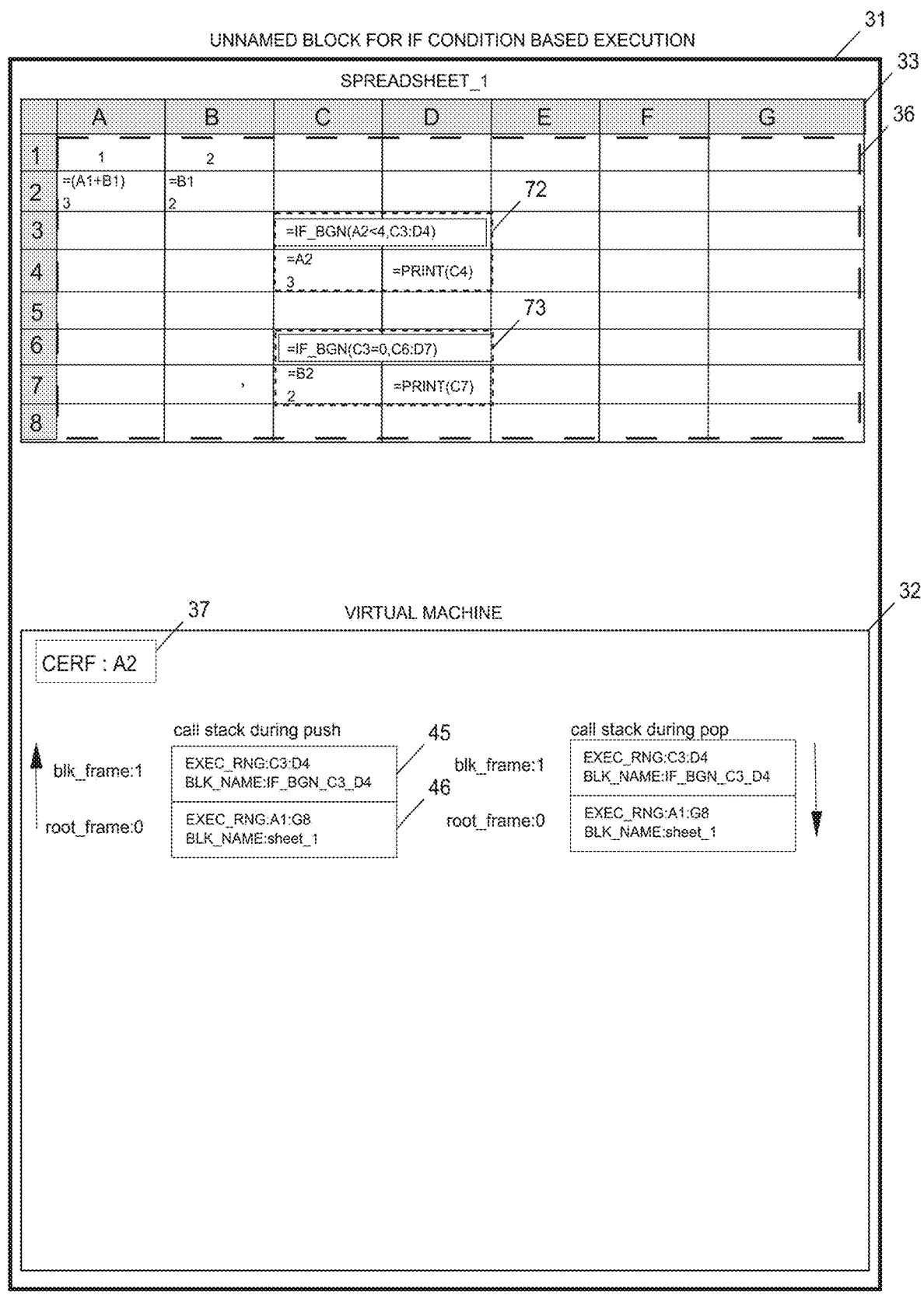
FIG. 6 illustrates unnamed blocks for conditional execution using a predicate test.

FIG. 6 illustrates unnamed blocks for conditional execution using a predicate test. In this embodiment, sheet block cells are partitioned into an unnamed block using IF_BGN macro 72 at cell C3. Cell C3 uses macro "=IF_BGN(A2<4, C3:D4)" in its formula.

In present embodiment, when the sheet 33 is loaded, virtual machine 32 first pushes root frame 46 onto its stack to execute cells in sheet block 36 associated with range A1:G8.

Then virtual machine 32 executes cells in sheet block 36 sequentially. Upon reaching cell C3 virtual machine 32 sees an unnamed block with conditional execution with a condition "(A2<4)". So, virtual machine 32 evaluates the condition and sees that value of A2 is indeed less than four as value of A2 has been evaluated to be three. So, virtual machine 32 saves the value of this evaluation in cell C3 and then pushes unnamed block stack frame 45 corresponding to range C3:D4 for execution.

After finishing execution of range C3:D4 virtual machine 32 continues execution of sheet block cells starting at cell C6. Here virtual machine 32 encounters IF_BGN instruction cell to setup else part 73 simulating if then else of a conventional software program. Else part 73 is implemented by checking if value of cell C3 is zero. This is one way to setup an else block by testing for value of false or zero in the previous condition. Since value of C3 has been evaluated to be true or one, the condition "C3=0" will evaluate to false and hence the entire block of cells from C6:D7 are skipped.

These unnamed blocks with predicate based execution can be part of sheet block or a named block or can be inside other unnamed blocks as well. In other embodiments the else part of cells can be co-located after the if part using an instruction such as "=IF_THEN_ELSE".

This kind of selective evaluation of cells in any sheet is unique to present invention and can be done only if cells are executed sequentially with reference to corresponding stack frames in a virtual machine.

This feature of selective execution of a set of cells in any sheet is not known to exist in any known spreadsheet system of prior art.

Figure 7:
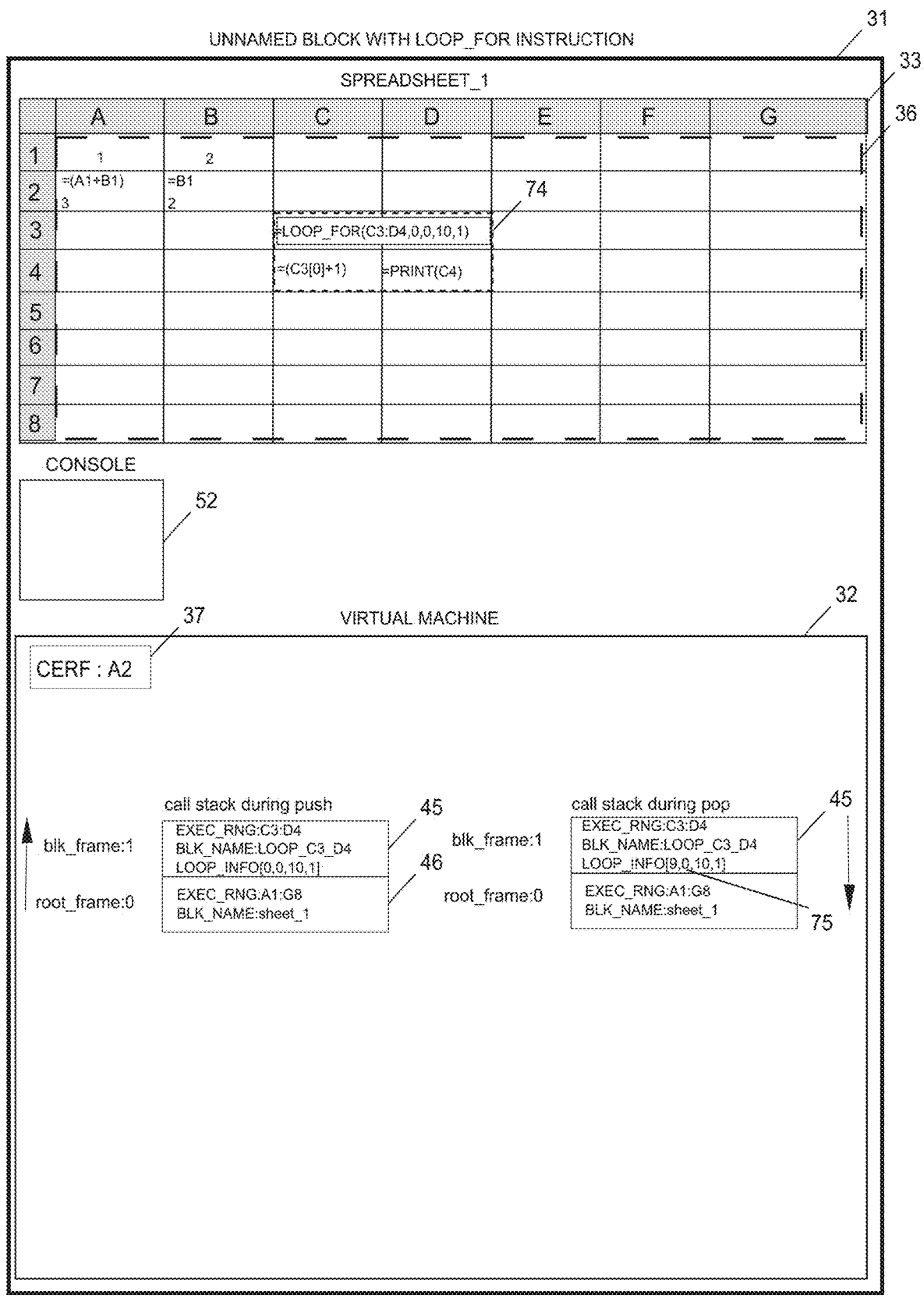
FIG. 7 illustrates unnamed blocks for conditional execution using a loop macro.

FIG. 7 illustrates unnamed blocks for conditional execution using a loop macro.

In this embodiment sheet block cells are partitioned into an unnamed block using LOOP_FOR macro 74 at cell C3. Cell C3 uses macro "=LOOP_FOR(C3:D4,0,0,10,1)".

The signature of this macro is as follows=LOOP_FOR (range to execute, current loop index, begin loop index, end loop index+1, loop increment). So, as we can see the macro at cell C3 is setup to execute from begin loop index of zero to end loop index of nine. Loop increment is set to one and current loop index is set to zero.

So, when this sheet in present embodiment is loaded in spreadsheet system 31, virtual machine 32 will first push a stack frame for sheet block 36 that has the range A1:G8. Then virtual machine 32 will execute sheet block 36 instructions sequentially until it reaches cell C3. Once at cell C3, virtual machine 32 will see this as unnamed block with LOOP_FOR condition 74.

So, virtual machine 32 will then push an unnamed block stack frame 45 and save loop information in stack frame 45. Then virtual machine 32 will execute cells in the range C3:D4 skipping cell C3 as it has been executed already to setup loop instruction bounds.

It can be seen that cell C4 is setup with a macro "=C3 [0]+1" in its formula. This accesses the array value in cell C3 which is setup with loop parameters passed into macro LOOP_FOR. When macro LOOP_FOR is executed, it will return an array as result value and that will hold information about the loop as described above in the loop signature. So, the result array in cell C3 will have the following signature [current loop index, begin loop index, end loop index+1, loop increment]. That is, the zeroth index holds the current loop index being used when executing given range in LOOP_FOR macro. So, C3[0] represents the current loop index and C3[0]+1 will represent a value that is one more than the current loop index. So, it can be seen that when range C3:D4 is executed in a loop from loop begin index zero to loop end index nine, value of cell C4 will vary from one to ten. Cell D4 is setup to print the value in cell C4. Hence executing unnamed block 74 will print one to ten in console 52.

After unnamed block 74 has finished executing, its stack frame is popped but it can be seen that for each loop, cell C3 will be updated with current loop index. So, C3[0] will show values from zero to nine and this can be also seen in stack frame 45 that holds loop information. During pop operation, the value of current loop index will be set to nine as shown in current loop index array slot 75.

It can be seen that other loop variants can be similarly implemented with following macro signatures.

LOOP_WHILE_DO(loop condition, range to execute). In LOOP_WHILE_DO first parameter represents the condition to evaluate and if it evaluates to true then the range of cells in second parameter is executed until the condition becomes false.

LOOP_DO_WHILE(loop condition, range to execute). In LOOP_DO_WHILE first parameter represents the condition to evaluate. But here the condition is only evaluated at the end of the execution range so that the first execution of the range is unconditional and subsequent repeats are conditional based on loop condition.

This feature of looped execution of a set of cells in any sheet is not known to exist in any known spreadsheet system of prior art.

Figure 8:
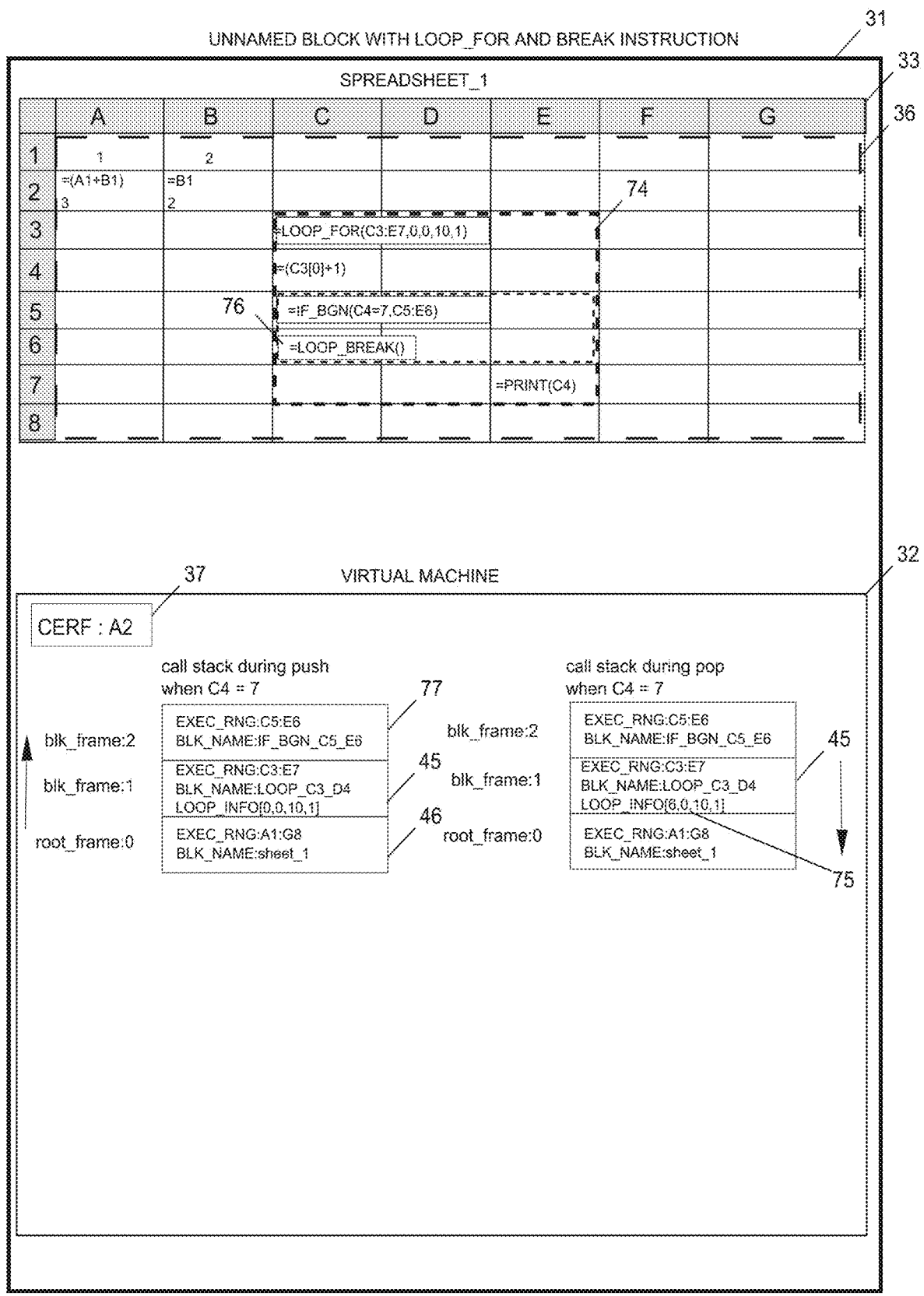
FIG. 8 illustrates unnamed blocks for conditional execution using a loop macro along with a break instruction to exit the loop before the end of all loops.

FIG. 8 illustrates unnamed blocks for conditional execution using a loop macro along with a break instruction as a loop terminating instruction to exit the loop before reaching the end of the last loop.

In this embodiment sheet block cells are partitioned into an unnamed block using LOOP_FOR macro 74 at cell C3. Cell C3 uses formula "=LOOP_FOR(C3:E7,0,0,10,1)" to execute cells in range C3:E7 in a loop and the number of loops is set to 10. Cell C5 is set with formula "=IF_BGN (C4=7, C5:E6)" to execute cells in range C5:E6 only if cell C4 becomes 7. Cell C6 is a cell with a break instruction 76 using formula "=LOOP_BREAK( )". This instruction instructs virtual machine 32 to break out of the loop being executed.

When spreadsheet 33 in present embodiment is loaded in spreadsheet system 31, virtual machine 32 will first push root frame 46 to execute cells in sheet block 36 in range A1:G8. Then during the execution of range A1:G8 it will encounter cell C5. At this cell, condition "C4=7" is evaluated and if that evaluates to true then corresponding frame for IF_BGN unnamed block 77 is pushed. Then virtual machine 32 will execute cell C6 which has a formula "=LOOP_BREAK( )". This instruction will make virtual machine 32 pop out the frame 77 so that execution can resume with reference to loop frame 45 and the next instruction here will be cell E7.

So, the result of executing sheet 33 is that cell E7 will print values from one to seven and then the loop will exit the loop block instead of printing values from one to ten. It can be seen that loop index at point of exiting the loop is six as shown by 75 in the stack frame.

This feature of looped execution of a set of cells in any sheet along with an ability to break out of the loop with a condition is not known to exist in any known spreadsheet system of prior art.

Figure 9:
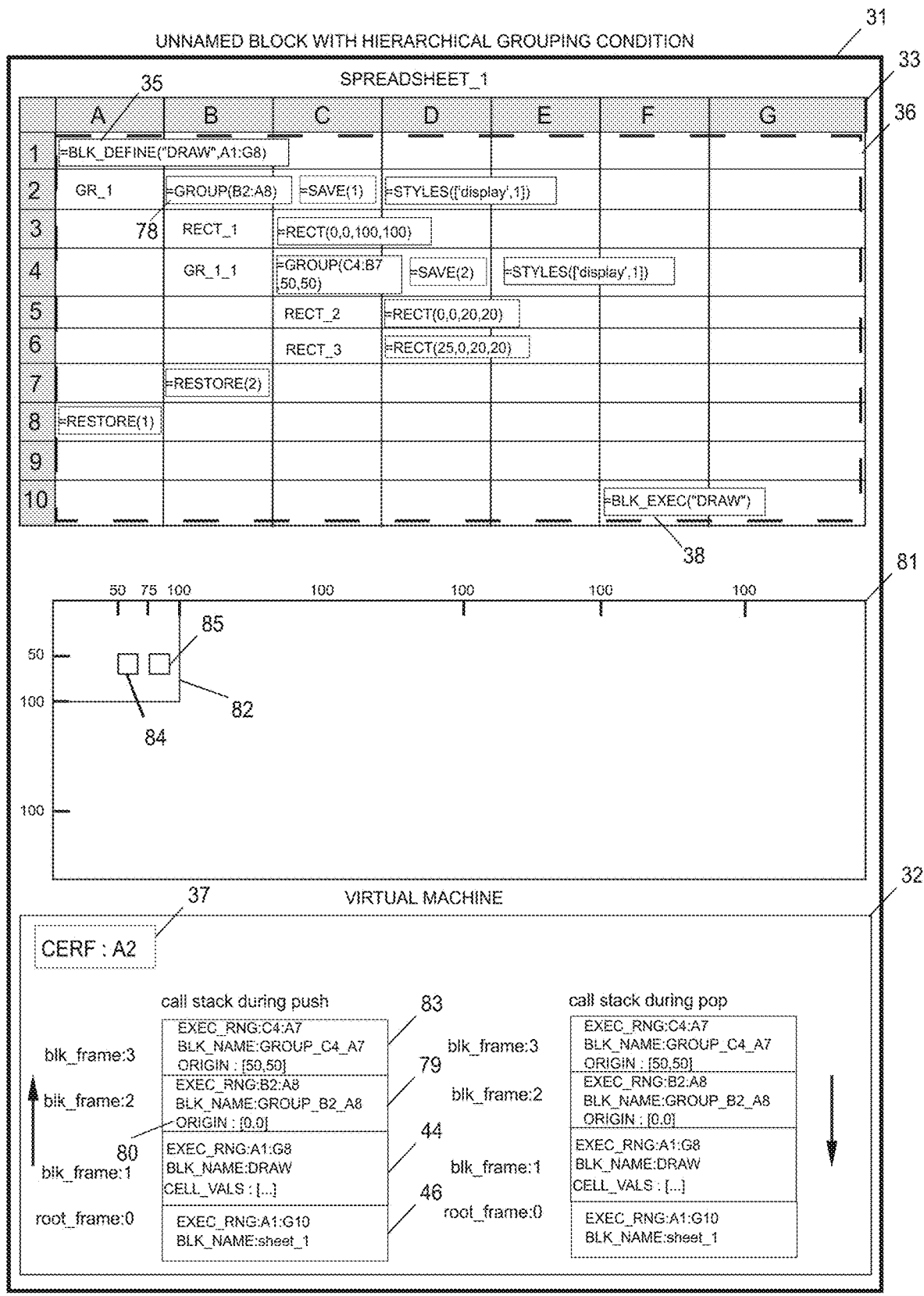
FIG. 9 illustrates unnamed blocks for conditional execution using a hierarchical grouping.

FIG. 9 illustrates unnamed blocks for conditional execution using a hierarchical grouping.

In present embodiment, named block 35 has two embedded unnamed blocks using GROUP macro at cell B2 and cell C4.

First, GROUP macro functionality is described and later GROUP macro use in present embodiment, is described.

GROUP macro enables setting up a block of cells in a hierarchical tree like structure wherein a group of cells can have a parent group and a group can have children as cells or other groups as well. This is usually used with graphics drawing instructions where a drawing group holds a group of graphics primitives or other groups to enable drawing in a canvas. In addition, to being an unnamed block, a group may have other attributes that are loaded into the stack frame too.

In present embodiment, we will use GROUP macro to group graphics instructions. So, we refer to the unnamed block using GROUP macro as a drawing group. This group of instruction is not limited to graphics instructions as the group may also have other instructions from spreadsheet 33 such as IF_BGN or LOOP_FOR etc. But for exemplary purposes, the present embodiment uses only drawing instructions in a group as will be seen below.

So, a group of cells is set of cells associated with an unnamed block with additional attributes loaded onto corresponding stack frame.

A drawing group being an unnamed block is also associated with a corresponding stack frame in virtual machine 32. But it also has additional attributes loaded per stack frame for each drawing group. These attributes are drawing related attributes such as drawing origin, clip rectangle and transforms to be applied to drawing instructions in a drawing group. A drawing group can have an embedded drawing group in its range. This occurs when a first cell with GROUP macro with a given range has a second cell in its range that is also has GROUP macro in its formula. This enables setting up a drawing hierarchy where a parent group can have many children groups and a child group can have only one parent group.

Drawing related attributes are applied in an incremental manner based on the level of a group in the drawing hierarchy. So, if a drawing instruction is inside a group that is inside a parent group, then drawing origin, clip and transforms applied to the drawing instruction are based on cumulative values of two parent groups combined with attributes of the drawing instruction itself. Cumulation for drawing origin is based on addition, cumulation for clip is based on intersection and cumulation for transforms is based on matrix multiplication.

A cell inside a drawing group with drawing instruction in its formula may also be further referred to as a drawing element.

A GROUP macro has a signature GROUP(cellRange, [xOrg,yOrg]) where cellRange is the range of cells to execute inside this group, and "[xOrg,yOrg]" are optional origins of drawing elements inside this group. The Final drawing position of a drawing element is determined by cumulation of drawing origins of all parent groups combined with x,y positions of the drawing element itself. if xOrg, yOrg are not specified then they are defaulted to 0,0.

In present embodiment, cell with GROUP macro 78 at cell B2 has a formula "=GROUP(B2:A8)". First parameter is range of cells in this group wherein cell B2 represents begin cell and cell A8 represents end cell in a group.

It can be seen that the range given may evaluate to an empty set as end column index A is lower than begin column index B. But virtual machine 32 figures out that this GROUP macro is laid out hierarchically based on increased row index and decreased column index of end cell in the range as compared with begin cell. Comparing end cell A8 with begin cell B2, row index eight is greater than row index two and column index A is less than column index B. Since end column index is less than begin column index, this unnamed block is treated as a hierarchical unnamed block. For hierarchical unnamed blocks, virtual machine 32 computes end column index on a per row basis dynamically. So, for row two, maximum column index is D, whereas for row three maximum column index is E. Without this dynamic computation of end column range B2:A8 will be an empty set as per conventional range definitions in a spreadsheet system of prior art.

In present embodiment, GROUP macro pushes only the drawing origin on stack for exemplary purposes, but it can be seen that in other embodiments pushing clip information or transform information may also be done. This origin is cumulatively added for each GROUP parent to the relative x and y positions of each drawing element.

A GROUP macro can be a parent node or a drawing element or both in the drawing hierarchy.

The above was a description of GROUP macro to setup drawing hierarchy. Following is the description of present embodiment executing unnamed blocks using GROUP macros.

When spreadsheet 33 in present embodiment is loaded in spreadsheet system 31, virtual machine 32 will first push root frame 46 to execute cells in sheet block 36 in range A1:G10. Then during the execution of range A1:G10, virtual machine 32 will encounter cell A1 with BLK_DEFINE macro. Cell A1 represents the begin cell for named block 35 and all cells in this block are skipped initially until there is a caller cell that calls this block.

A named block can be executed using a caller cell or other external events such as a timer or user interface event. But in present embodiment, we will assume that there is no such external event and named block 35 is executed using a using a caller cell. Thus, the entire range of cells A1:G8 is skipped initially until virtual machine 32 encounters caller cell 38 at F10 that has a BLK_EXEC macro in its formula.

Executing caller cell 38 at F10 virtual machine 32 will push a new frame 44 for named block 35 and then start execution of cells in range A1:G8.

During this execution of cells in range A1:G8 virtual machine 32 will encounter cell B2 with GROUP macro. Executing cell B2 virtual machine 32 will push a group one stack frame 79 and set the execution range to B2:A8. Virtual machine 32 also loads group related information such as group one related origin information 80 onto stack as well. For frame 79 origin information [xOrg,yOrg] is set to array [0,0].

After loading stack frame 79, virtual machine 32 starts executing cells in range B2:A8. In this range, first cell with formula is cell C3. Cell C3 has a formula "=RECT(0,0,100, 100)". When cell C3 is executed it will draw a rectangle in a canvas capable of drawing graphics primitives 81 that is associated with spreadsheet system 31 of present invention.

Graphics primitives may be two dimensional or three dimensional graphics drawing instructions. Two dimensional graphics primitives are comprised of lines, rectangles, triangles, arcs, polygons, points, paths, texts, Bezier curves, images, gradients, groups and others as described in SVG (scalable vector graphics) standard. Three dimensional graphics primitives may include primitives from WebGL standard or OpenGL standards.

In present embodiment, we use only two dimensional graphics primitives for drawing elements for cells in a group. Labels are setup for each drawing element at the start of that row that can span one or more cells in a row. To clarify, a drawing element is a set of cells in spreadsheet 33 with formula containing graphics instructions and attributes to be executed by virtual machine 32 for a particular drawing. A graphics primitive is a general term used to draw graphics in a canvas such as in HTML canvas.

For example, cell B3 has a label RECT_1 that represents cell C3 with a drawing instruction. Cell A2 has a label GR_1 that represent all cells with instructions in row two including cells B2, C2 and D2 and all further rows till cell A8 as cell A2 has a GROUP instruction.

So, further references to drawing elements using their labels refers to all of the cells with formula instructions associated with that drawing element in corresponding row or a range.

Also, a label associated with a drawing element is not the same as a name of a block in present invention. A block name enables that block to be executed using BLK_EXEC macro, but a label of a drawing element is just a string representing a group of cells for drawing instructions that a user can relate to.

During push of stack frame for group GR_1, origin used is [0,0] as GROUP instruction in cell B2 has only one parameter that is the range to execute and so the origin defaults to [0,0] for [x origin,y origin]. This origin information can be seen in stack frame 79 as group one origin information 80.

As described above, drawing origin for frame 79 is set to [0,0]. So, for rectangle RECT_1 at cell C3, cumulative x and y positions are computed by adding all parent GROUP origins to relative x,y co-ordinates given in RECTANGLE macro in cell C3. So, RECT_1 will be drawn with dimensions of 100,100 at co-ordinates 0,0 with respect to the canvas 81 origin as parent GR_1 origin is [0,0] and relative co-ordinates of RECT_1 is also [0,0]. So, we get a rectangle at 0,0 with width and height of 100,100. This is shown in figure as rectangle one 82 drawn on canvas 81.

After drawing RECT_1, virtual machine 32 will reach cell C4 and see another GROUP instruction that is labeled as GR_1_1. 1_1 suffix indicates that this group instruction is the first child of group labeled as GR_1. Executing instruction at cell C4 virtual machine 32 will push GR_1_1 related stack frame 83 onto stack and move execution to range C4:A7 as cell C4 has macro GROUP(C4:A7,50,50). This also indicates that at cell C4 [xOrg,yOrg] are set to [50,50] for this drawing group.

Then virtual machine 32 will execute cell D4 that has a macro SAVE(2). SAVE macro enables saving graphics context of drawing so that the context can be changed for current drawing element, and after that drawing is finished, we can restore back the graphics context for a parent drawing element being drawn. The parameter in SAVE macro is the SAVE identifier so that we can match the corresponding restore macro for this save. In present embodiment, SAVE(2) at cell D4 is matched with a RESTORE(2) at cell B7.

Then virtual machine 32 will execute cell E4 that has a macro STYLES(['display',1]). STYLES macro enables setting style information for each drawing element. It is passed in an array of name value pairs and in present embodiment, we just have one name value pair that controls whether this element is to be displayed or not. It can be seen that this style array can have other style attributes such as background color, text color, transforms to be applied, line attributes, text attributes, drawing operation attributes etc. In present embodiment, display attribute is set to one indicating that group GR_1_1 must be displayed and not skipped.

Then virtual machine 32 will execute cell D5 labeled as RECT 2 in cell C5. Cell D5 has a macro RECT(0,0,20,20). First two parameters [0,0] represent the relative position to draw into with respect to its parent group. Second two parameters [20,20] represent width and height to be drawn. Final position of any drawing element is computed using cumulative origins of all parent groups combined with relative co-ordinates of current drawing element. So, in this case final drawing position also known as absolute position [xAbs,yAbs] will be [(0+50+0),(0+50+0)] that evaluates to [50,50] with respect to canvas 81 origin. This is shown in figure as rectangle two in canvas 84.

Then virtual machine 32 will execute cell D6 labeled as RECT 3. Cell D6 has a macro RECT(25,0,20,20). This will result in a rectangle at [(0+50+25),(0+50+0)]:[75,50]. So, RECT_3 will be drawn at [xAbs,yAbs] of [75,50]. This is shown in figure as rectangle three in canvas 85.

Then virtual machine 32 will execute cell B7 with macro RESTORE(2). At this stage graphics context that was saved before any changes inside group GR_1_1 is revived in canvas 81 and since B7 is the last instruction of group GR_1_1, frame 83 is popped and virtual machine 32 will be back at range B2:A8 associated with frame 79. Continuing in this frame 79 virtual machine 32 will reach cell A8 which is another RESTORE instruction as in cell B7. After finishing cell A8 virtual machine 32 will pop frame 79 and be back at range A1:G10 associated with frame 44 for named block 35. At this stage, virtual machine 32 will have no more instructions to execute in range A1:G10 as the currently executing instruction in this range was at cell F10 and it has been completed. So, virtual machine 32 will exit execution and all drawing that was needed to be done will be visible in associated canvas 81.

It can be seen that the concept of using unnamed blocks to setup a drawing hierarchy using graphics primitives may also be applied to drawing using native widgets provided by the platform in which the spreadsheet system 31 of present invention may be executed in. Such a platform can be an operating system providing native widgets or a web browser providing widgets such as those in HTML.

The present embodiment uses graphics primitives to setup drawing hierarchy just for exemplary purposes. The main idea behind the present embodiment is to demonstrate that block based programming in a spreadsheet system associated with a virtual machine can also be used to setup hierarchical constructs with support of virtual machine stack storing incremental values on a per frame basis.

This feature of grouping instructions in a hierarchy and associating additional attributes per group and saving in corresponding stack frames is not known to exist in any known spreadsheet system of prior art.

Figure 10:
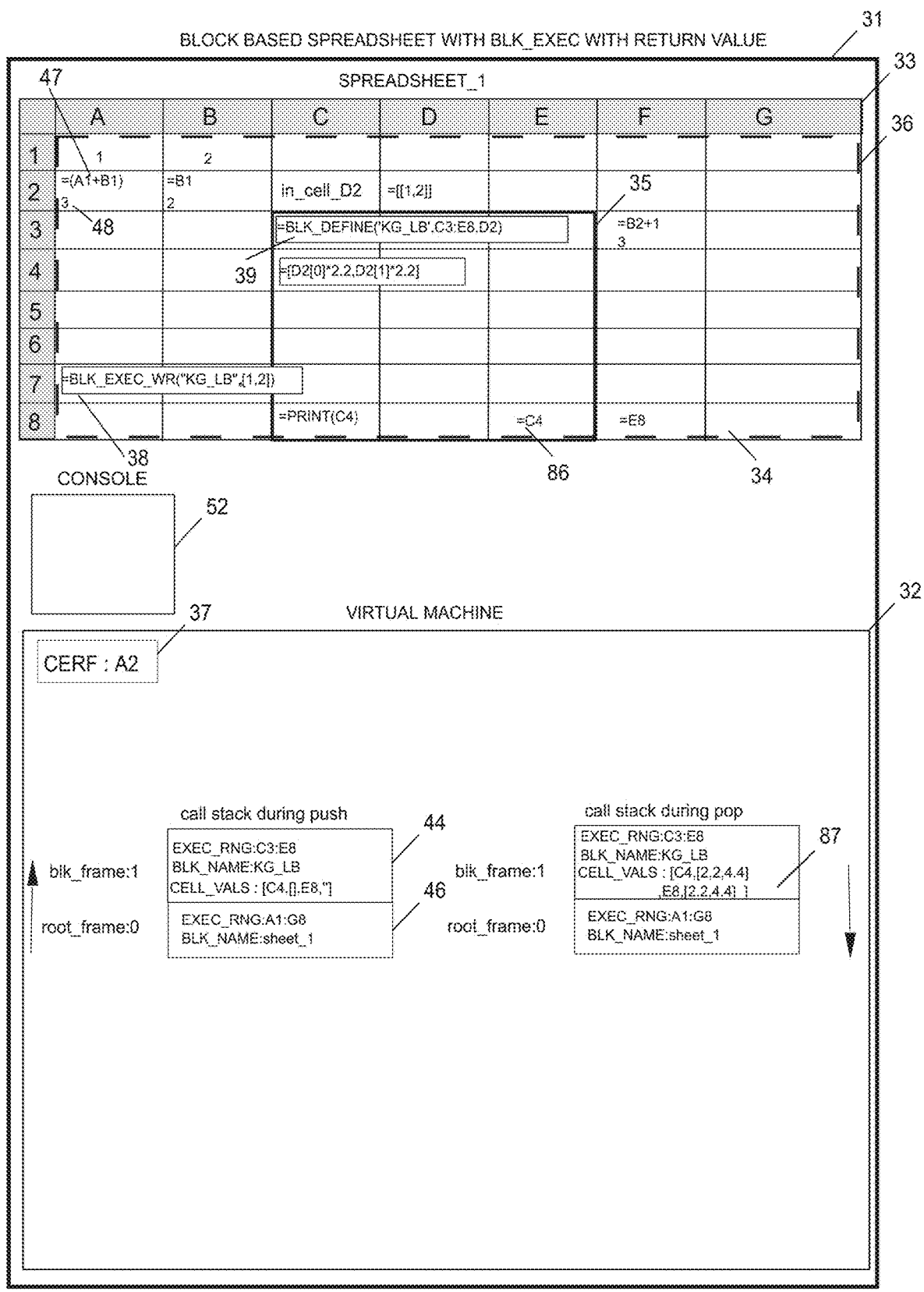
FIG. 10 illustrates named block execution with return value.

FIG. 10 illustrates named block execution with return value.

In this embodiment, sheet block cells are partitioned into a named block 35 to define a block that converts an array of values representing weight in kilograms to values representing weight in pounds.

Cell C3 has a formula "=BLK_DEFINE('KG_LB',C3: E8,D2)". This defines named block 35 in the range of C3:E8. First parameter 'KG_LB' is the block name representing kilogram to pound conversion.

When spreadsheet 33 in present embodiment is loaded in spreadsheet system 31, virtual machine 32 will first push root frame 46 to execute cells in sheet block 36 in range A1:G8.

Then during the execution of range A1:G8, it will encounter caller cell A7 38 with macro BLK_EXEC_WR. The_WR suffix stands for with return, so this macro is used for executing a block with a return value. Executing this cell virtual machine 32 will push corresponding stack frame 44 for named block 35 to execute cells in range C3:E8.

Then virtual machine 32 will execute cell C4 with formula "=[D2[0]*2.2, D2[1]*2.2]". This takes the input values from input array in cell D2 that BLK_EXEC_WR has copied its second parameter to and multiplies each slot value by 2.2 to convert kilogram values into pounds. Result of this execution is placed in cell C4 as another array with value [2.2,4.4]. Then at cell C8 this array value is printed to console 52. Then cell E8 is executed which copies value from cell C4 into cell E8. When a block is called using macro BLK_EXEC_WR the value of last cell is copied into caller cell 38 as the return value. In this case, it will be the value of cell E8 which is the last cell in block 86 that refers to cell C4 with array value [2.2,4.4]. This array is copied into cell A7 as the result of its execution.

It can also be seen that during push of frame for named block 35 cell values are initially empty, but during pop cell values are computed and also optionally stored in stack as in cell values array in stack 87. Cell values may be stored in stack optionally based on whether a block is used for recursive call or a reentrant call or a memory context aware call.

A memory context aware call is one where previous call into a block should not have any effect on next call. For example, if there is block with a cell with formula "=INCREMENT_SELF(0,1)" that increments its value starting at zero in increments of one, then each time we call this block, this cell value should start incrementing from zero instead of previous value. So, if such a behavior is needed, then cell values are copied onto stack just like the case for recursive and reentrant calls. The behavior of copying cells onto stack can be automatically calculated by virtual machine 32 or can be done always or can be setup as a parameter into either BLK_EXEC or BLK_EXEC_WR on a per call basis. In present embodiment, we have chosen to copy cell values into stack for exemplary purposes and so we can see that cell values in stack have computed values during POP operation shown as array 87.

This feature of executing a block of cells with corresponding stack frame context and returning the value of last cell executed to the caller cell is not known to exist in any known spreadsheet system of prior art.

Figure 11:
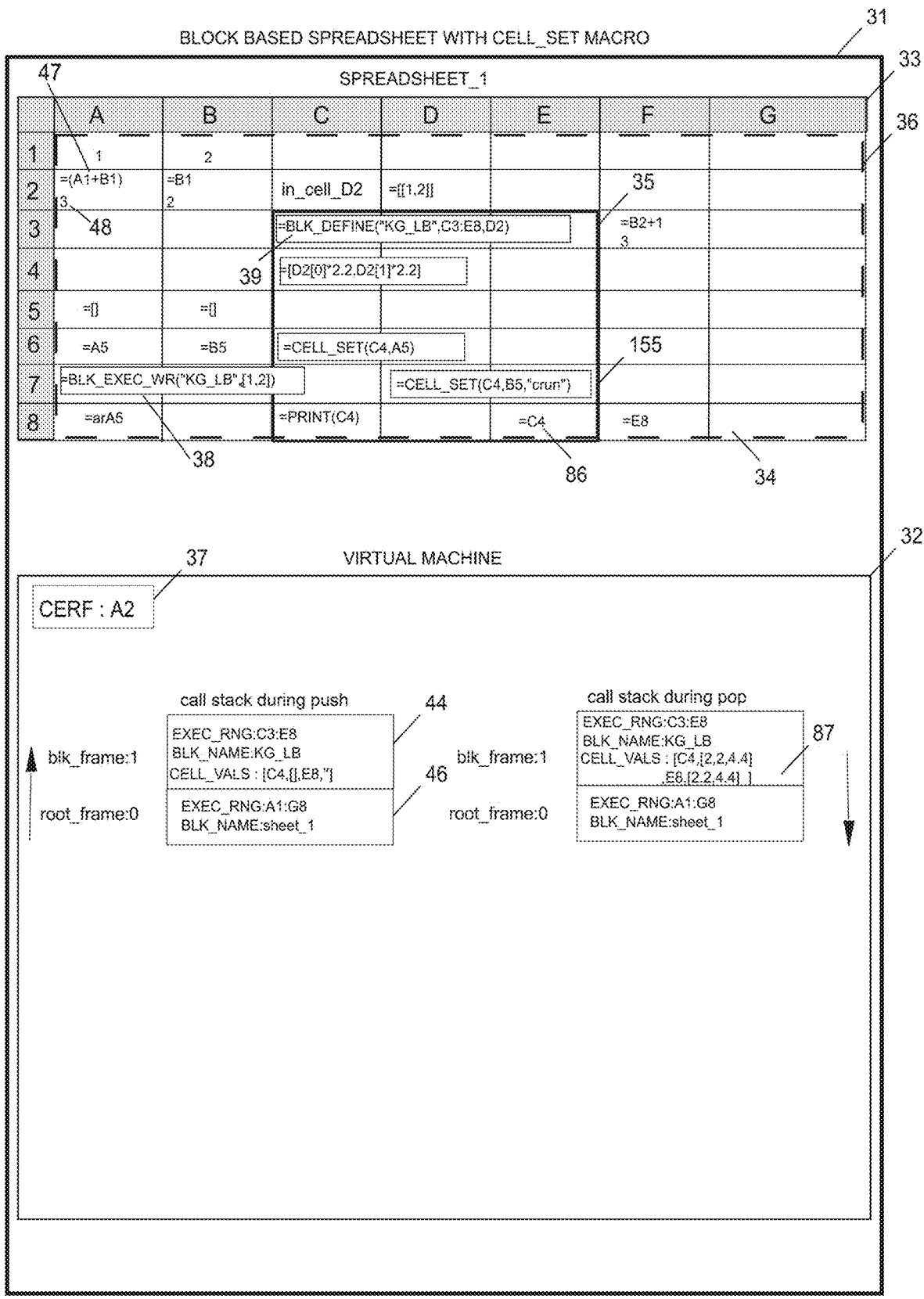
FIG. 11 illustrates CELL_SET macro to set value into another cell.

FIG. 11 illustrates execution of a cell with CELL_SET macro.

This embodiment is similar to embodiment in FIG. 10 with a few new cells including cells A5, B5, A6, B6, C6 and D7.

When spreadsheet 33 in present embodiment is loaded, virtual machine 32 executes sheet block 36 with range A1:G8 by pushing corresponding frame 46 onto the stack.

During this execution, if virtual machine 32 encounters cell A5 which evaluates to an empty array, then cell B5 is evaluated to empty array also. Then cell A6 is evaluated to value in cell A5 which is an empty array, and so cell A6 is evaluated to an empty array as well.

Similarly, cell B6 evaluates to empty array also. Then virtual machine makes a call to named block 35 from caller cell 38 and this pushes named block frame 44 to execute cells in range C3:E8. During this range execution, virtual machine 32 will execute formula in cell C4 and then execute cell C6.

Cell C6 has a formula "=CELL_SET(C4, A5)" in its formula. CELL_SET macro enables setting value or formula of any target cell. Value setting can be a scalar value or array value or value from another cell. Formula setting can be another formula or a scalar or array value converted into a formula and then set into formula of target cell. CELL_SET macro has the signature CELL_SET(vSrc, vTgt, flags) where vSrc represents the source value and vTgt represents the target cell, and flags control the behavior of CELL_SET. vSrc can be a scalar value, an array value or a reference to one or more cells using an expression. In present embodiment, vSrc is set to cell C4 which is a reference to cell C4. vTgt is a reference to a target cell and in present embodiment, it is set to cell A5 and flags controls the behavior of CELL_SET. In present embodiment, flags at cell C6 is empty, but flags at cell D7 is set to "crun".

So, when virtual machine 32 executes cell C6, it will set value of cell A5 to value of cell C4 and hence cell A5 will have the array [2.2,4.4]. But cell A6 will still remain empty even though cell A6 is dependent on cell A5. This is because the change to cell A5 is programmatically done using CELL_SET and unless user has requested for child run using "crun" flag, cell A6 will not be executed.

But when virtual machine 32 executes cell D7 it will set value of cell B5 to same array value containing [2.2,4.4]. But since cell D7 has "crun" in its flags parameter, children of cell B5 are also executed and hence cell B6 is executed and so it will also get array value [2.2,4.4].

By default, all array copies in present invention are deep copy based, but this behavior can be changed by using a formula prefix "ar". Prefix "ar" represents array reference. For example, cell A8 has a formula "=arA5" and so cell A8 will get a shallow copy of array value in cell A5. A shallow copy is just a reference to another array, so if source array in cell A5 changes, target array in cell A8 will also reflect the changes as these two arrays share the same underlying memory for array slots.

This feature of setting another cell value and selectively executing dependent children cells is not known to exist in any known spreadsheet system of prior art.

Figure 12:
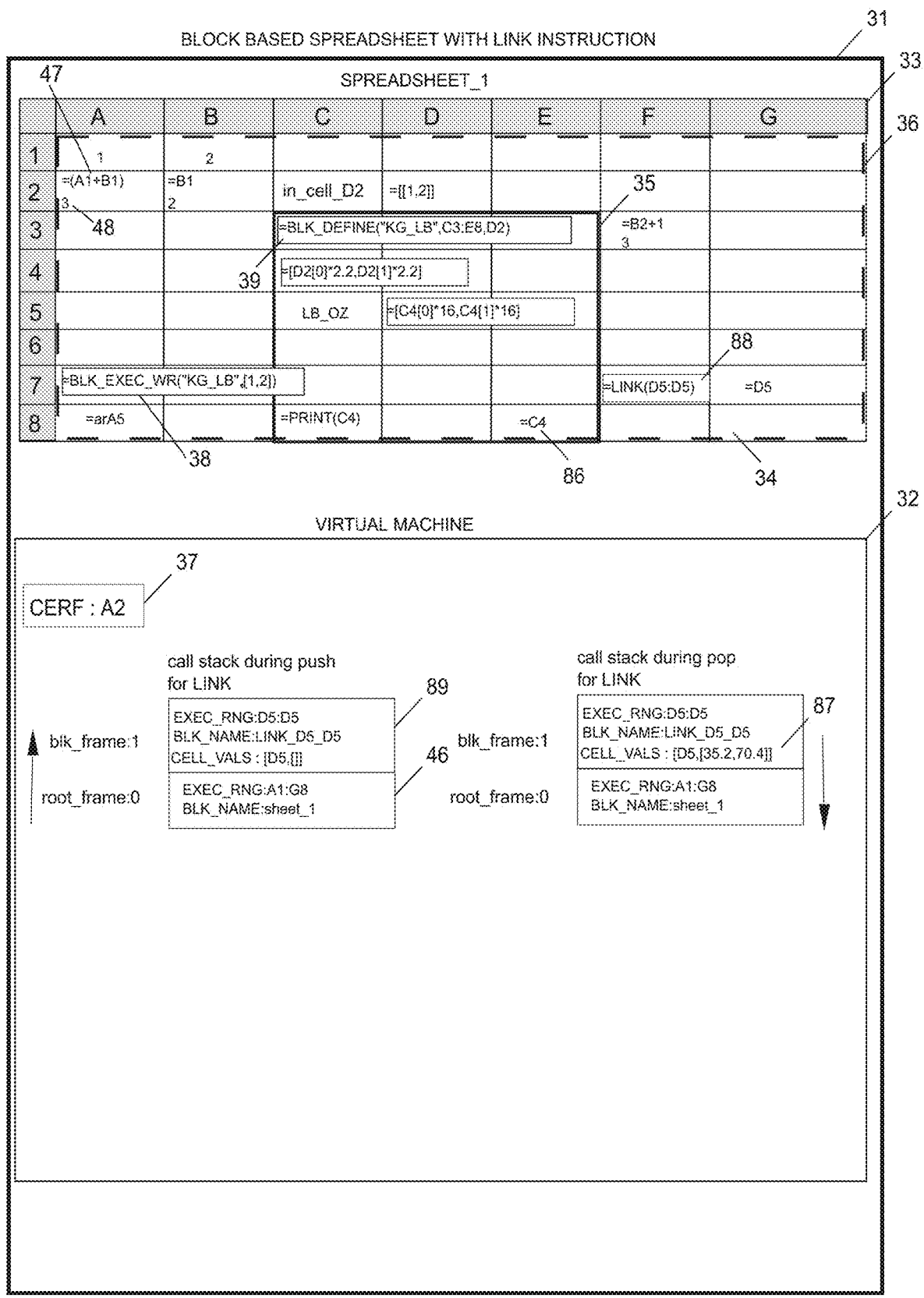
FIG. 12 illustrates setup of unnamed range of instructions to be executed using LINK macro.

FIG. 12 illustrates execution of cells using LINK macro.

Cell F7 is a cell with LINK macro 88 in its formula. This LINK instruction enables any range of instructions to be executed without it being part of a preset named or unnamed block. This is useful when a block of instructions may have a list of instructions to execute and they need to be executed in varying orders. Using multiple LINK macros, we can just refer to the range of instructions to run in the order needed. This way we can avoid creating multiple blocks for each ordered set of instructions to execute. LINK macro can also be used to execute part of a block. In present embodiment, cell 88 at cell F7 is setup to execute range D5:D5. Since begin and end of this range is the same cell D5, it is setup to execute just one cell.

When spreadsheet 33 in present embodiment is loaded, virtual machine 32 executes sheet block 36 with range A1:G8 by pushing corresponding frame 46 onto stack. During this execution virtual machine 32 encounters cell A7 which will evaluate block define cell 39.

After execution of block 39, virtual machine 32 encounters cell F7. At this point virtual machine 32 will push a LINK macro stack frame 89 onto stack so that it can execute instructions in range D5:D5.

Cell D5 has instructions to convert pounds to ounces and this is indicated by label in cell C5 as "LB_OZ" where LB stands for pounds and OZ stands for ounces. Since one pound equates to sixteen ounces, we see that the formula "=[C4[0]*16,C4[1]*16]" will evaluate to [2.2*16,4.4*16] that equals [35.2,70.4]. This result array is then saved in cell D5. After execution of this instruction, frame 89 is popped and execution moves to cell G7 in relation to stack frame 46 where cell G7 copies data from cell D5.

It can be seen that LINK instruction can execute any range of instructions in any block including sheet block or named block or unnamed block. Range of instructions associated with LINK instruction also executes in reference to a stack frame and if the range has embedded unnamed blocks then they too will have corresponding stack frames in virtual machine 32.

LINK instruction gives the flexibility of executing any range of instructions without wrapping them inside a named block thus providing better reuse of code without having to define new blocks that have overheads of allocating space in virtual machine stack for all cells in a block. This is not like a GOTO instruction in conventional software program as in a GOTO instruction, the instruction pointer is moved to a new location and there is no mechanism for the instruction pointer to return back automatically. Also, there is no new stack frame associated with a GOTO instruction. Whereas, a LINK instruction executes in reference to a stack frame and pops back to after the LINK instruction cell to continue execution.

This feature of dynamic range execution of a set of cells in a spreadsheet is not known to exist in any known spreadsheet system of prior art.

Figure 13:
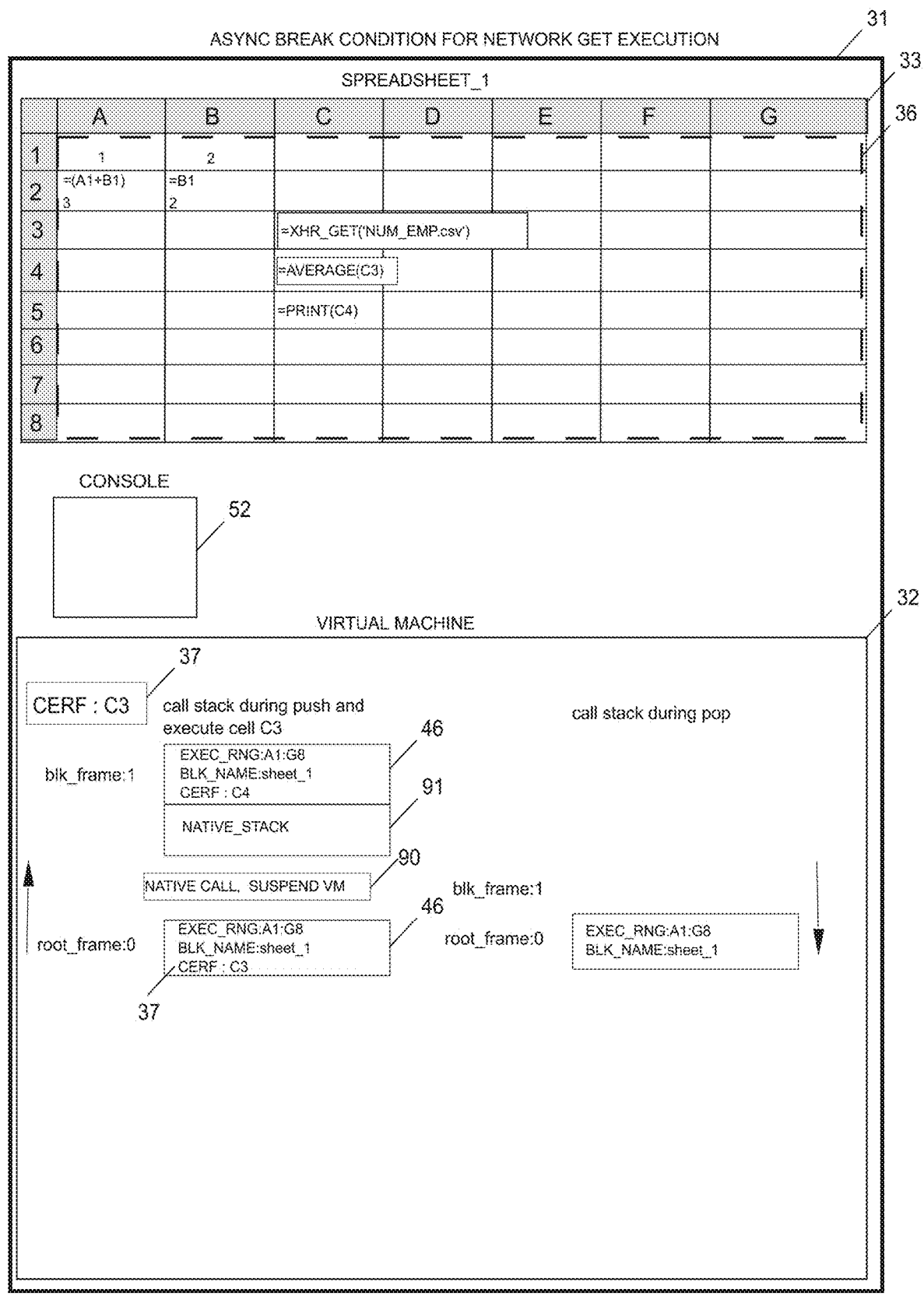
FIG. 13 illustrates asynchronous break instruction for a network query using macro XHR_GET.

FIG. 13 illustrates asynchronous break instruction for a network query macro by name XHR_GET.

XHR stands for XMLHttpRequest. In HTML/Javascript, XMLHttpRequest API enables network queries to be performed. So, in present embodiment, a network request macro is named XHR_GET that enables a network query to be performed that is executed asynchronously. For an asynchronous operation to be performed, virtual machine 32 must be suspended till the needed asynchronous operation is completed and then resumed. If virtual machine 32 is suspended and resumed for any instruction in a cell, then that cell is regarded as introducing an asynchronous break instruction into execution sequence of virtual machine 32.

An operation in virtual machine 32 that is performed asynchronously is one where virtual machine 32 is suspended at the cell that invokes such an operation, followed by completion of the asynchronous operation provided by the underlying platform and then resumption of virtual machine 32.

The signature of XHR_GET macro is XHR_GET(networkURL). The networkURL represents a network resource identified by a universal resource locator (URL). This URL may translate to a file from local operating system in which spreadsheet system 31 is being executed or can translate to a file or stream of data from another computer in local or wide area network.

When spreadsheet 33 in present embodiment is loaded, virtual machine 32 executes sheet block 36 with range A1:G8 by pushing corresponding frame 46 onto stack. Then during the execution of range A1:G8, virtual machine 32 will encounter cell C3 with XHR_GET macro. At this point virtual machine 32 will issue an asynchronous request to fetch needed resource from native code provided by operating system or environment in which spreadsheet system 31 is being executed. Then virtual machine 32 will suspend execution by saving the current execution cell reference 37 at cell C3 on stack frame 46 and exits its main loop while preserving the stack frame 46 for later use.

This suspension of virtual machine 32 is shown by a break in stack frame build up in figure as asynchronous native call suspension point 90, and all stack frames accumulated so far are saved for later use.

Native code is shown as a combination stack frame for native stack 91 in present embodiment. Combination native stack frame 91 is a placeholder for one or more native stack frames in native code that perform the needed asynchronous operation. Native code is provided by the environment in which spreadsheet system 31 is executed in. If spreadsheet system 31 is executed in a browser, then native code is provided by the browser. But if spreadsheet system 31 is executed directly on an operating system, then native code is provided by the operating system.

In present embodiment, cell C3 has a macro to fetch a local file NUM_EMP.csv as requested in macro XHR_GET (NUM_EMP.csv). When cell C3 is executed by virtual machine 32, it will issue an asynchronous request to fetch file NUM_EMP.csv from local file system, save cell C3 as current execution cell reference 37 and then exit its main loop.

In response to file read request, native code will fetch contents of file NUM_EMP.csv and notify spreadsheet system 31. Then spreadsheet system 31 will copy contents of NUM_EMP.csv into cell C3 and then resume suspended virtual machine 32 and restart execution after cell C3 using preserved stack and corresponding instruction range. File NUM_EMP.csv is assumed to have a string representing an array such as [10,20,30,40] to represent number of employees in departments one to four respectively. So, after reading this file cell C3 will now contain an array value [10,20,30,40].

If parameter to XHR_GET had been a network resource, then it could have prefixes such as http://, https://, ftp:/. If the file requested is not in the same directory as spreadsheet system 31, then it may have a prefix file:///.

After execution of cell C3, execution resumes at cell C4 in virtual machine 32. Cell C4 has a formula "=AVERAGE (C3)" and executing this will result in average value of slots in array C3 resulting in evaluation of (10+20+30+40)/4 with a result of twenty five. So, at this point, cell C4 will have a value of twenty five.

Then cell C5 is executed in virtual machine 32 which will print value of cell C4 in console 52 associated with spreadsheet system 31. So, the console at this point will show a number twenty five.

This example shows how combining a virtual machine with associated stack frame based execution for cells in spreadsheet enables executing asynchronous instructions by suspending and resuming execution across asynchronous operations.

For exemplary purposes, the present embodiment shows an asynchronous operation at cell C3 in sheet block 36 that is associated with one stack frame 46 in virtual machine 32. But such asynchronous operations can also be part of a named block that may be deeper in a call sequence of named blocks thus having a call frame index of greater than zero. Suspending and resuming of virtual machine is supported in such cases too.

This feature of using a macro that that is associated with cell suspension and resumption in an associated virtual machine is not known to exist in any known spreadsheet system of prior art.

Figure 14:
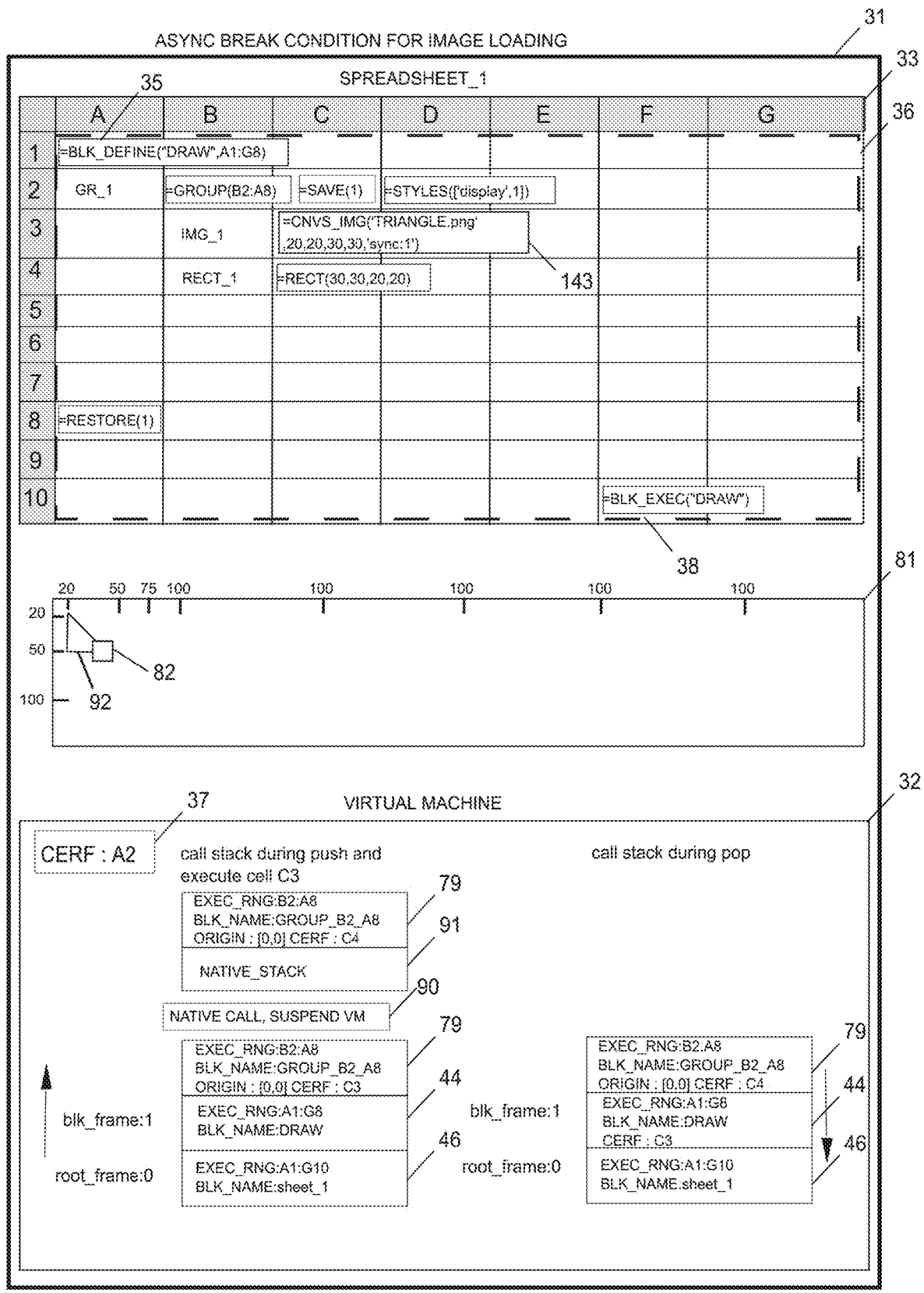
FIG. 14 illustrates asynchronous break instruction for an image load using macro CNVS_IMG.

FIG. 14 illustrates asynchronous break instruction using an image load macro by name CNVS_IMG. CNVS_IMG represents a macro in spreadsheet system 31 that enables loading an image from local file system or a network resource in synchronous or asynchronous manner.

CNVS_IMG macro has a signature CNVS_IMG(imgURL,x,y,wd,ht,syngFlag). The imgURL is the resource locator for an image file that can be with or without a prefix. If it is a local file within the same directory as the spreadsheet system 31, then there need not be any prefixes. But if it is in another location, then it can have prefixes such as file:/// or http:// or https:// or ftp:/. Parameters x,y,wd,ht represent target position of drawing this image on canvas 81. The last parameter syncLoad represents whether execution of CNVS_IMG macro has to be a synchronous execution with respect to instructions of virtual machine 32 wherein virtual machine 32 waits for the corresponding asynchronous native operation to complete before going to next instruction in a given range.

So, syncLoad flag when set to true will mean that virtual machine 32 will be suspended till needed image is loaded and then resumed after the image load is completed. In present embodiment, CNVS_IMG macro with syncLoad value as true will act like an asynchronous break instruction for virtual machine 32 which will suspend it till native asynchronous operation is completed.

When spreadsheet 33 in present embodiment is loaded, virtual machine 32 executes sheet block 36 with range A1:G10 by pushing corresponding frame 46 onto stack. Then during the execution of range A1:G10, virtual machine 32 will encounter cell A1 with BLK_DEFINE macro. Range given in cell A1 is A1:G8 and this range of cells will be skipped till virtual machine 32 reaches caller cell 38 at cell F10.

Executing caller cell 38 at cell F10 virtual machine 32 will push a new frame 44 for named block 35 and then start execution of cells in range A1:G8.

During execution of cells in range A1:G8, virtual machine 32 will encounter cell B2 with GROUP macro. Executing cell B2, virtual machine 32 will push a group one stack frame 79 and set the execution range to B2:A8. Virtual machine 32 also loads group related information such as origin information 80 onto stack as well. For frame 79 origin information [xOrg,yOrg] is set to array [0,0].

After loading stack frame 79, virtual machine 32 starts executing cells in range B2:A8. In this range, first cell with formula is cell C3. Cell C3 has a formula "=CNVS_IMG ('TRIANGLE.png', 20, 20, 30, 30, 'sync:1')". Executing cell C3, virtual machine 32 will issue a load request to load file "TRIANGLE.png" from native code.

File load or network load is an asynchronous operation with respect to native code. The last parameter to CNVS_IMG macro set as "sync:1" indicates that the file to load has to be done synchronously with respect to virtual machine 32. That is, virtual machine 32 cannot execute the next instruction after cell with CNVS_IMG macro until CNVS_IMG macro has loaded the needed file and drawn it. Thus, virtual machine 32 is suspended till a response for load request is received. This suspension of virtual machine 32 is shown by a break in stack frame build up in figure as asynchronous native call suspension point 90, and all stack frames accumulated so far are saved for later use.

File "TRIANGLE.png" has pixels to draw a right triangle 92 as shown in canvas 81. After load request is completed, virtual machine 32 will be notified and corresponding drawing of the image will be done. After this, virtual machine 32 will reenter its main execution loop based on saved stack frame context and execute cell C4 that draws a rectangle 82 at location [xPos:30,yPos:30].

It can be seen that rectangle 82 is drawn over the triangle image and this is possible only because virtual machine 32 was suspended till the image was loaded and drawn. It can also be seen that if last parameter syncLoad to CNVS_IMAGE macro was set to 'sync:0', then virtual machine 32 will not wait for the load to happen and so the rectangle will be drawn first and then load and draw of the image will be done, resulting in triangle drawn over rectangle.

In cases where there is no overlapping drawing, it is preferable to use "sync:0" flag so that all images can be loaded asynchronously which is usually faster for overall system performance. CNVS_IMG macro may also have additional parameters that indicate image source and target co-ordinates and dimensions thus supporting transformed image drawing.

Ability to load an image synchronously or asynchronously with respect to virtual machine 32 is unique to present invention and is not known to exist in any known spreadsheet system of prior art.

This feature of using a macro to load an image with or without waiting for that operation to complete in an associated virtual machine of a spreadsheet system is not known to exist in any known spreadsheet system of prior art.

Figure 15:
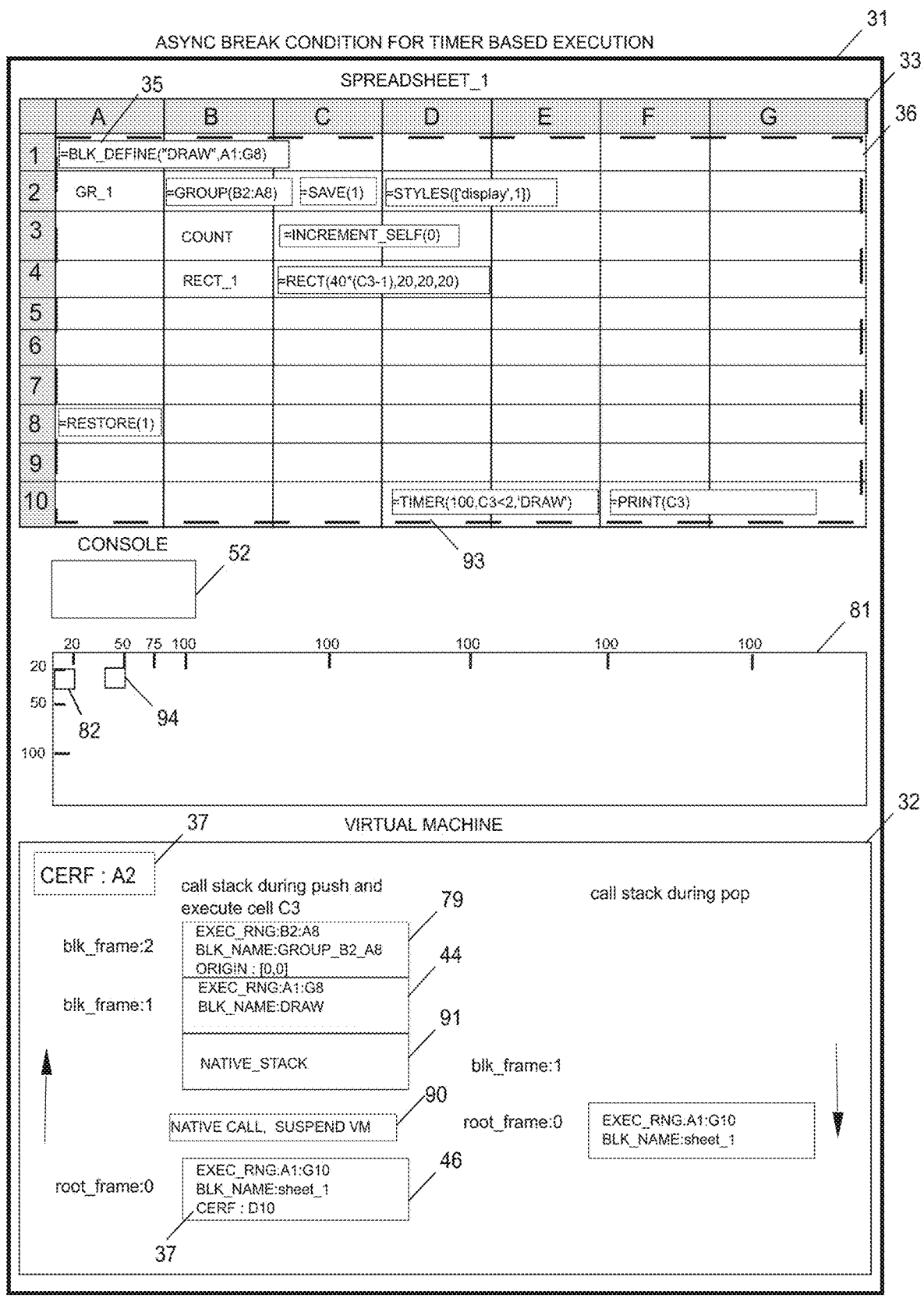
FIG. 15 illustrates asynchronous break instruction to execute a named block in a repeated timer loop using a TIMER macro.

FIG. 15 illustrates asynchronous break instruction using a TIMER macro to execute a named block in a repeated timer loop.

TIMER macro represents a macro in spreadsheet system 31 that enables suspending virtual machine 32 for needed time and then resuming execution of a named block at repeated timer interval till a condition remains true.

TIMER macro has the signature TIMER(numMillisecsToWait, runTillConditionIsTrue, timerCallbackBlockToRun). Here numMillisecsToWait is the number of milliseconds virtual machine 32 will wait before going to next instruction. Parameter runTillConditionIsTrue represents a condition which is used to determine if the timer operation is to be repeated. So, the timer will be repeated till the given condition is true and timer operation will be stopped if given condition becomes false. Parameter timerCallbackBlockToRun is an optional parameter and when given is used for calling a named block in the timer loop.

When spreadsheet 33 in present embodiment is loaded, virtual machine 32 executes sheet block 36 with range A1:G10 by pushing corresponding frame 46 onto stack. Then during the execution of range A1:G10 virtual machine 32 will encounter cell A1 with BLK_DEFINE macro. Range given in cell A1 is A1:G8 and this range of cells will be skipped till virtual machine 32 reaches timer cell 93 at cell D10.

Executing timer cell 93 at cell D10, virtual machine 32 will execute formula "=TIMER(100, C3<2, 'DRAW')". Here, first parameter represents the number of milliseconds to wait and is set to 100, second parameter is the condition to evaluate and check for its value to be true to execute the named block given as 'DRAW' in third parameter.

So, executing timer cell 93 at cell D10, virtual machine 32 will be suspended and after hundred milliseconds, condition "(C3<2)" is evaluated to see if given named block in third parameter must be called. If this condition is true, then virtual machine 32 will call named block 35. Waiting is done in native code represented by stack frame 91 here.

Suspension of virtual machine 32 is shown by a break in stack frame build up in figure as asynchronous native call suspension point 90, and all stack frames accumulated so far are saved for later use.

In present embodiment, cell C3 inside named block 35 has a formula "=INCREMENT_SELF(0)". This macro takes an input parameter from which the cell value is incremented by one each time it is executed. Since given parameter is zero, cell C3 has an initial value of zero. Upon execution of cell C3, its value will be incremented by one from its previous value.

So, in present embodiment, when timer cell 93 is executed, first the condition "(C3<2)" will be true as zero is less than two, so virtual machine 32 will call named block 35 after 100 milliseconds.

Before executing named block 35, virtual machine 32 will push a new frame 44 for named block 35 and then start execution of cells in range A1:G8.

During this execution of cells in range A1:G8, virtual machine 32 will encounter cell B2 with GROUP macro. Executing cell B2 virtual machine 32 will push a group one stack frame 79 and set the execution range to B2:A8. Virtual machine 32 also loads group related information such as origin information 80 onto stack as well. For frame 79, origin information [xOrg,yOrg] is set to array [0,0].

After loading stack frame 79, virtual machine 32 starts executing cells in range B2:A8. In this range first cell with formula is cell C3. Cell C3 has a formula "=INCREMENT_SELF(0)". This will set value of cell C3 to one. Then cell C4 is executed with formula "=RECT(40*(C3−1),20,20,20)". The first time this is executed, it will draw a rectangle at 20,20 as x position and y position corresponding with width and height of twenty.

After executing cell C4, virtual machine 32 will execute cell A8 and then pop frame 79. Since there are no more instructions in frame 44, that frame is popped too and virtual machine 32 will return back to root frame 46. At this point, virtual machine 32 checks for timer condition "(C3<2)" to be true again and it will still be true as cell C3 will be at one and one is less than two. So, virtual machine 32 will wait for another 100 milliseconds and call into named block 35 again and the process of pushing more frames as described above is repeated. Calling named block 35 again will execute cell C3 which will set its value to two and cell C4 is executed again to draw a second rectangle 94 at co-ordinates 40,20 for x and y positions correspondingly.

Then named block related frames are popped and execution returns to root frame 46. At this point condition "(C3<2)" is false as 2 is not less than 2 and so further timer based executions stop and virtual machine 32 will reach cell F10 that prints the value 2 in cell C3 in console 52 associated with spreadsheet system 31.

After this virtual machine 32 will pop out frame 46 and exit

So, it can be seen that associating a virtual machine with block based execution enables timer based execution as well. This feature is not known to exist in any known spreadsheet system of prior art.

Figure 16:
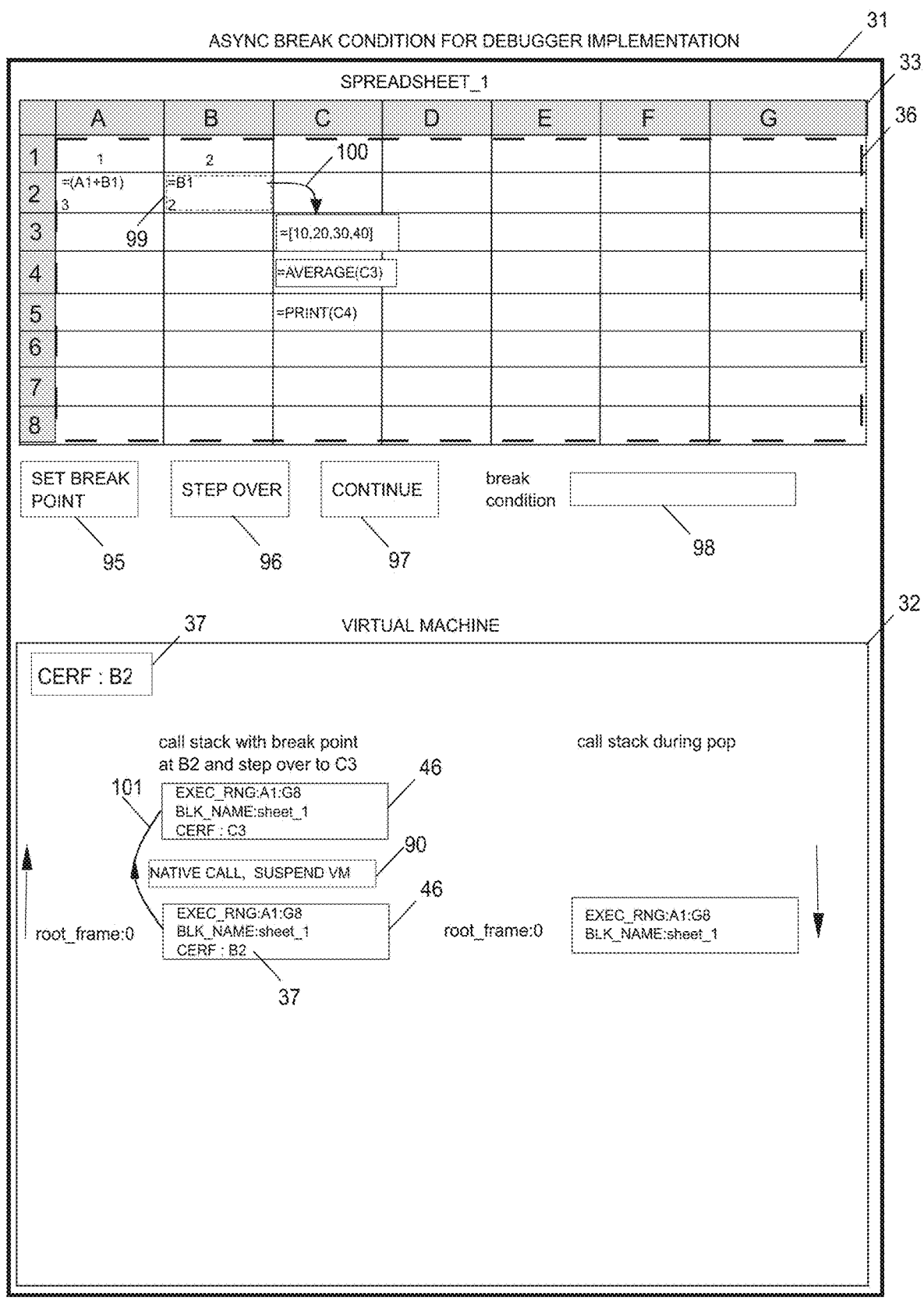
FIG. 16 illustrates asynchronous break instruction for implementing debugger commands.

FIG. 16 illustrates asynchronous break instruction for implementing debugger commands.

In macros XHR_GET, CNVS_IMG and TIMER, break instruction is built in and virtual machine 32 is suspended when these macros are executed. But for implementing debugger, we need a way to set and delete this virtual machine break instruction manually. This is done using user interface buttons associated with spreadsheet system of present invention 31.

In present embodiment, user interface button set breakpoint 95 is used to set a user induced breakpoint on a cell which can be any cell with a formula in spreadsheet 33. A breakpoint on a cell indicates to virtual machine 32 to suspend execution at said cell and exit its main loop without executing formula in said cell.

To continue execution of virtual machine 32 after suspension of execution, there are two methods.

The first method is to execute just a single instruction where virtual machine 32 is suspended. This is achieved by clicking on user interface button step over 96. Clicking on this button will resume virtual machine 32 execution for just one cell where the user induced breakpoint was set. In addition, virtual machine 32 will auto set a system induced breakpoint at the next cell so that virtual machine 32 will suspend execution at the next cell.

The second method is to execute all instructions after user induced breakpoint. This is achieved by clicking on user interface button named continue 97. Clicking on continue button 97 will make virtual machine 32 execute all instructions starting at breakpoint cell till it reaches another cell with a breakpoint or till the end of all instructions.

A breakpoint may also be conditional. This can be set on any cell with a formula in spreadsheet 33 by filling text box for conditional breakpoint 98 that holds a condition to be evaluated to activate a breakpoint.

When spreadsheet 33 in present embodiment is loaded, virtual machine 32 executes sheet block 36 with range A1:G8 by pushing corresponding frame 46 onto stack. In present embodiment, it is assumed that a user has set a breakpoint in breakpoint cell 99 at B2 by first clicking on cell B2 and then clicking on set breakpoint button 95. This is indicated by dotted border in cell B2. So, when 33 is loaded virtual machine 32 will be suspended at cell B2.

Suspension of virtual machine 32 is shown by a break in stack frame build up in figure as asynchronous native call suspension point 90, and all stack frames accumulated so far are saved for later use. During this suspension, frame 46 holds the current execution cell reference 37 as cell B2.

So, virtual machine 32 will not execute cell B2 but just move focus to B2 and exit its main loop. Then when a user clicks on step over button 96, virtual machine 32 will execute cell B2 and setup a temporary breakpoint at next instruction which is at cell C3. This step over is indicated by step over arrow in spreadsheet 100 and a step over arrow in stack frame 101. It can be seen that current execution cell ref 37 becomes cell C3 in the same stack frame 46 while executing a step over user interface command.

After this. if user clicks on continue button 97, then execution continues till end of current block in frame 46 which is cell G8 and then virtual machine 32 will exit.

This step over can also be animated so that a user may start and stop animation using another set of user interface buttons. Animating debugger commands will enable a user to watch the execution of cells in a user configurable periodic interval so that the user can get an idea of sequence of cells being executed without the user having to click the step over button manually.

Also, a user may set a condition such as B2=2 in condition text box 98 so that virtual machine 32 will suspend execution at cell B2 only if this condition is true. This way a user can debug execution of any cell or a sequence of cells on a selective basis.

Once again associating a virtual machine with block based execution enables asynchronous break of execution and resuming of execution that enables debugger functionality in present embodiment.

This feature is not known to exist in any known spreadsheet system of prior art.

Figure 17:
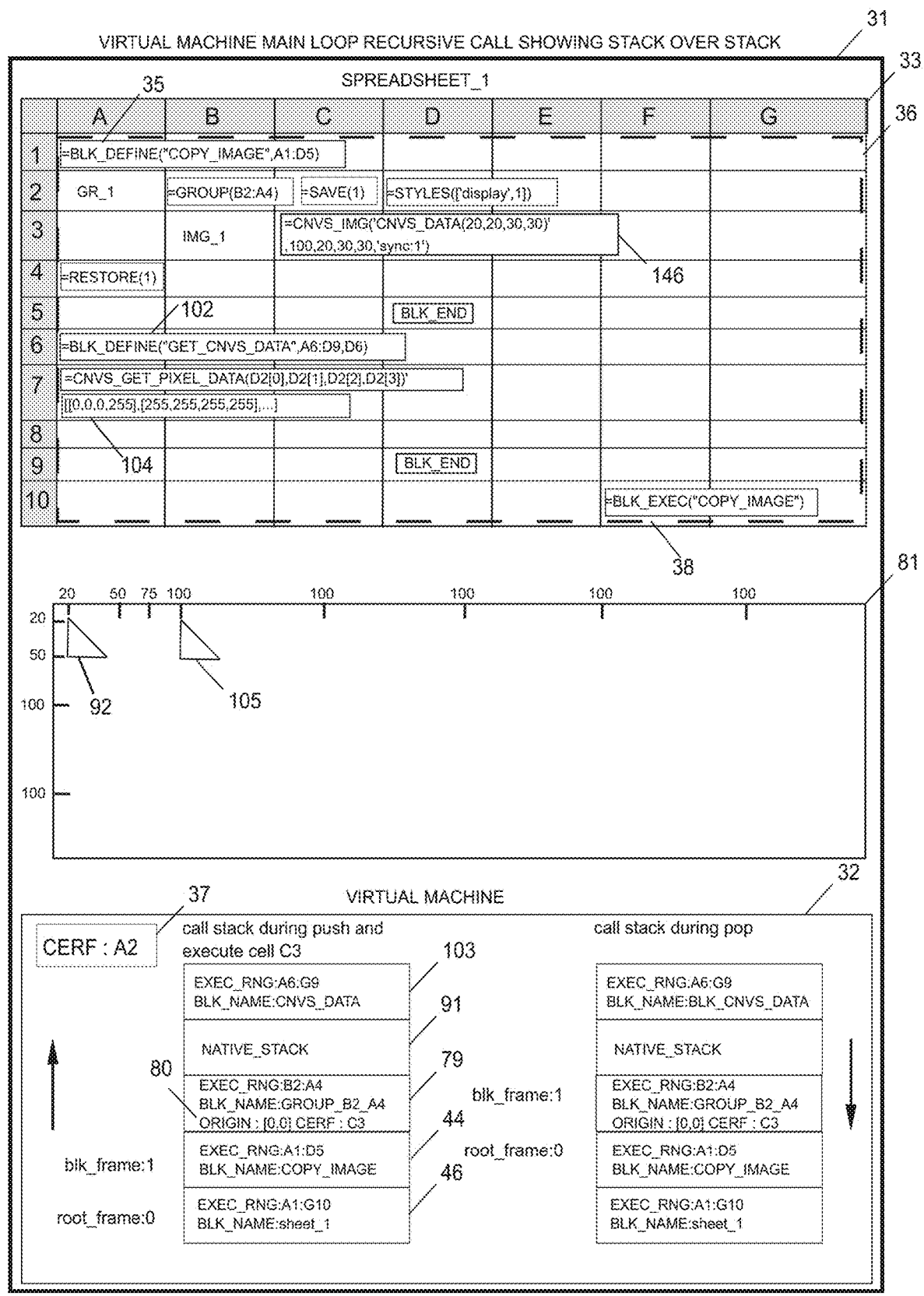
FIG. 17 illustrates recursive call setup showing virtual machine calling its main loop with illustrating stack over stack.

FIG. 17 illustrates recursive call into virtual machine 32 main loop with interspersed native call stack.

There are situations where virtual machine 32 instructions depend on native call functionality but in order to fulfill native call functionality, we need access to code in other named blocks in spreadsheet 33. In order to support this, virtual machine 32 supports stack over stack paradigm where virtual machine 32 sets up a set of call frames for an initial set of named block calls and then transitions synchronously to native call stack, which then calls synchronously into virtual machine 32 again thereby setting up another sequence of named block call frames in virtual machine 32.

The present embodiment shows an example where we copy source image data from canvas one position in canvas 81 to a target position. This is accomplished by using two named blocks and the second named block 102 gets bits of image data from canvas 81. So, the result of executing instructions in this embodiment is to copy source triangle bits to a target position. Following shows the sequence of steps to achieve this in virtual machine 32.

When spreadsheet 33 in present embodiment is loaded, virtual machine 32 executes sheet block 36 with range A1:G10 by pushing corresponding frame 46 onto stack. The main idea of this embodiment is to show how an image copy is done from a source region in canvas 81 to a target region in canvas 81 using a recursive virtual machine stack over stack setup interspersed with native code stack.

Then during the execution of range A1:D5 virtual machine 32 will encounter cell A1 with BLK_DEFINE macro. Range given in cell A1 is A1:D5 and this range of cells will be skipped till virtual machine 32 reaches a caller cell.

Then virtual machine 32 reaches cell A6 which is also a cell with BLK_DEFINE macro. The range associated with this block is set to A6:D9 and so this range is also skipped till a caller cell is seen.

Then virtual machine 32 reaches caller cell 38 at F10. Executing caller cell 38 at cell F10, virtual machine 32 will push a new frame 44 for named block 35 and then start execution of cells in range A1:D5.

During execution of cells in range A1:D5, virtual machine 32 will encounter cell B2 with GROUP macro. Executing cell B2, virtual machine 32 will push group one stack frame 79 and set the execution range to B2:A4. Virtual machine 32 also loads group related information such as origin information 80 onto stack as well. For frame 79 origin information [xOrg, yOrg] is set to array [0,0].

After loading stack frame 79 virtual machine 32 starts executing cells in range B2:A4. In this range execution will reach cell C3. Cell C3 has a formula "=CNVS_IMG (GET_CNVS_DATA(20, 20, 30, 30)', 100, 20, 30, 30, 'sync: 1')".

First parameter to CNVS_IMG macro is the image file to load or an array of bytes that can be passed in as an input array representing pixel information. So, in present embodiment, first parameter contains a block name "GET_CNVS_DATA" that when executed will retrieve image pixel data from canvas 81 at given co-ordinates.

As can be seen, first parameter to CNVS_IMG macro at cell C3 is a string 'GET_CNVS_DATA(20,20,30,30)'. This string contains block name of another named block 102 along with parameters to be passed into that block.

While executing cell C3, virtual machine 32 will first transition into native code shown as a combination native stack frame 91. Then native code for CNVS_IMG macro detects the first parameter as a block name.

So, virtual machine 32 will reenter itself with a new stack frame base to execute block 102. This is shown as recursive stack frame 103. Then virtual machine 32 will execute named block 102 with range A6:D9.

But before executing this range, virtual machine 32 will copy input parameters to cell D6 and so cell D6 will contain an input array [20,20,30,30]. This input array is co-ordinates x,y,wd,ht of source of pixels to be extracted from canvas 81. Then virtual machine 32 will execute cell A7 with formula "=CNVS_GET_PIXEL_DATA(D2[0], D2[1], D2[2], D2[3])". Result of execution of macro CNVS_GET_PIXEL_DATA is an array of pixels quads representing pixels of source right triangle 92. As an example, pixel data array may be of the form [[255,255,255,255],[255,0,0,255]]. This example is an array of arrays where second level array represents the RGBA value of a single pixel. RGBA value stands for red green blue and alpha component values of a single pixel. This sample pixel data array contains just two pixels with first pixel having white color and second pixel having red color. So, in present embodiment, we would retrieve nine hundred (thirty times thirty for width times height) pixel value quads from source triangle 92 and is shown as pixel RGBA array 104.

This quad pixel RGBA array 104 is returned back to caller of named block 102 which is native code here. As described earlier, last cell value in a named block is treated as a return value of a named block when named block is called from a caller cell that uses a macro BLK_EXEC_WR (block execute with return). This is applicable when a call to a named block is made from native code as well.

So, after executing named block 102, native code will have the quad array 104 which is then passed into implementation of CNVS_IMG macro in native code as its first parameter. Then CNVS_IMG code will then draw the contents of RBGA array 104 onto canvas 81 at co-ordinates [100,20] as copied triangle 105 thus completing the copy operation. So, at this stage, we would see two triangles in canvas 81.

After this drawing is completed, one or more native code stack frames 91 are popped and then named block frame 79 is popped. This is then followed by popping named block frame 46.

It can be seen that in this embodiment, virtual machine 32 is not suspended while entering native stack as compared with previous embodiment associated with FIG. 14. This is because here native code does not have to wait for an asynchronous operation to complete such as loading a file from network or a file system which is usually an asynchronous operation. But in the present embodiment, CNVS_IMG macro calls another named block thus setting up a stack over stack scenario for a synchronous call back into virtual machine 32. This is possible only if spreadsheet 33 of present invention is associated with a virtual machine maintaining a stack of calls for each named block and supporting stack over stack scenario wherein virtual machine 32 can call itself again.

Such a feature of a spreadsheet cell execution calling into native code and native code calling back into spreadsheet code is not known to exist in any known spreadsheet system of prior art.

This above concludes description of spreadsheet system 31 of present invention.

Below methods in present system 31 are described.

In below method descriptions reference numerals from figures describing system of present invention 31 above may also be used so that method diagrams are clearer without the need to duplicate system parts.

Figure 18:
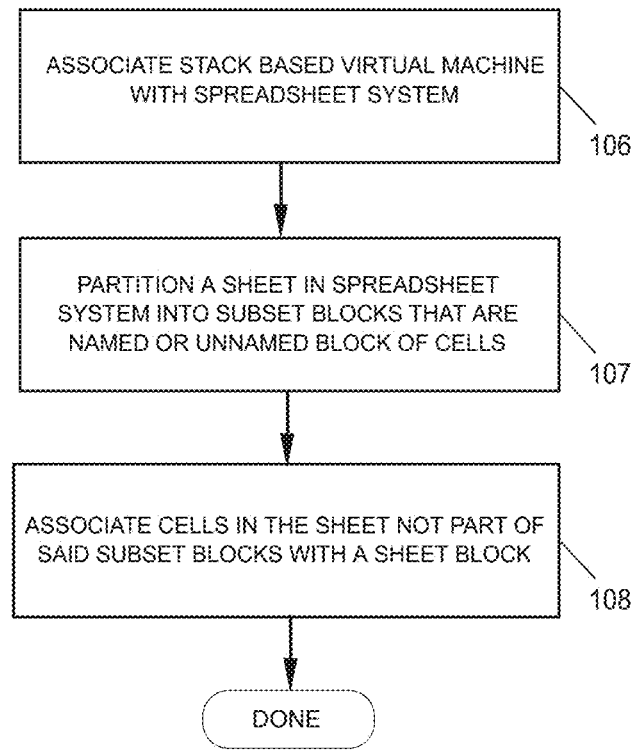
FIG. 18 illustrates method of associating a virtual machine with a spreadsheet system to execute cells that are partitioned into blocks of cells associated with stack memory context in the virtual machine stack.

FIG. 18 illustrates a method of associating a virtual machine with a spreadsheet system to execute cells that are partitioned into blocks of cells using stack memory context.

This embodiment uses reference numerals from FIG. 1 also.

In step 106, virtual machine 32 is associated with spreadsheet system 31 so that formula instructions in cells of any spreadsheet 33 in spreadsheet system 31 may be executed in blocks of cells using a stack context in virtual machine 32.

Spreadsheet system 31 is comprised of one or more sheets and each sheet is comprised of cells organized in two dimensional order.

A cell in spreadsheet 33 may be empty or can hold at least one of a scalar value, a one dimension array value, a multidimensional array value and a formula instruction. A formula instruction in a cell is denoted by a string prefixed with an equal to character. For example, "=[1,2,3,4]" is a formula to create a one dimension array and "=(1+2)" is a formula to add two numbers.

In step 107, cells in a spreadsheet 33 are partitioned into blocks. These blocks can be named or unnamed.

Named blocks have attributes comprising a reference to begin cell, a reference to end cell, an optional callee input value, and at least one stack frame in said virtual machine.

A reference to a begin cell and a reference to and end cell form the range of cells in a block. Cells inside this range are executed in virtual machine 32 in sequence and optionally using a dependency list. A named block is optionally associated with a callee input value that is filled when a caller cell establishes a call to a named block. This callee input value is copied into named block input cell 40 as shown in FIG. 1.

Both named and unnamed blocks are associated with at least one stack frame in virtual machine 32 as shown by named block stack frame 44 in FIG. 1. These stack frames are used to store information about each block being executed including the range of instructions to execute and other information such as copy of values of a caller block or graphics drawing information such as origin, cliprect etc. A named block may have more than one stack frames associated if the named block is called in a recursive manner. This can be direct or indirect recursion.

In direct recursion, a named block has a caller cell which has a BLK_EXEC macro with the name of same named block such as in recursive caller cell 41 of FIG. 1. In indirect recursion a first named block can call second named block and that second named block can call back into first named block. For each call, a stack frame is created in virtual machine 32 so for recursive calls, we may have more than one stack frames corresponding to a named block.

Recursive calls are when the same named block exists more than once in a call sequence. But reentrant calls are those that execute the same block of code in multiple threads. Since each block in present invention supports execution with independent memory context, reentrant calls are also supported in present invention.

An unnamed block is associated with a condition of execution, a reference to begin cell, a reference to end cell, and at least one stack frame in virtual machine 32.

Execution order in virtual machine 32 can be at least one of sequential order, call sequence order and dependency based order. In sequential order, cells in a block are executed in order of row first and column second or column first and row second based on configuration settings in spreadsheet system 31. In present embodiment, we use row first column second order. Sequential execution guarantees order of instructions to be sequential which is necessary for any stack based software program.

Call sequence order is established a caller cell calls into a named block and a cell in that named block has another caller cell with reference to another named block and so on.

Dependency order is established when a formula in a child cell refers to a parent cell. There can be more than one parent cell references per child. A parent cell can have multiple children if more than one child cells have references to the same parent cell. So, cell references from one cell to another will form parent child relations forming a graph. This graph is used to create dependency lists for execution. A child dependency list is one where a cell has a list of dependent child cells and if this cell changes then all children cells in child dependency list are executed to update their values. A parent dependency list is one where a cell has a list of all parents it is dependent on and in order to get latest value all parent cells should be executed first.

Conventional spreadsheet applications execute cells only based on dependency order and cannot guarantee an order of cells execution across all sheets. This is a big limitation for stack based software programs which expect a sequential order execution.

In step 108, cells not part of any blocks are associated with a sheet block and also a root stack frame in virtual machine 32.

Figure 19:
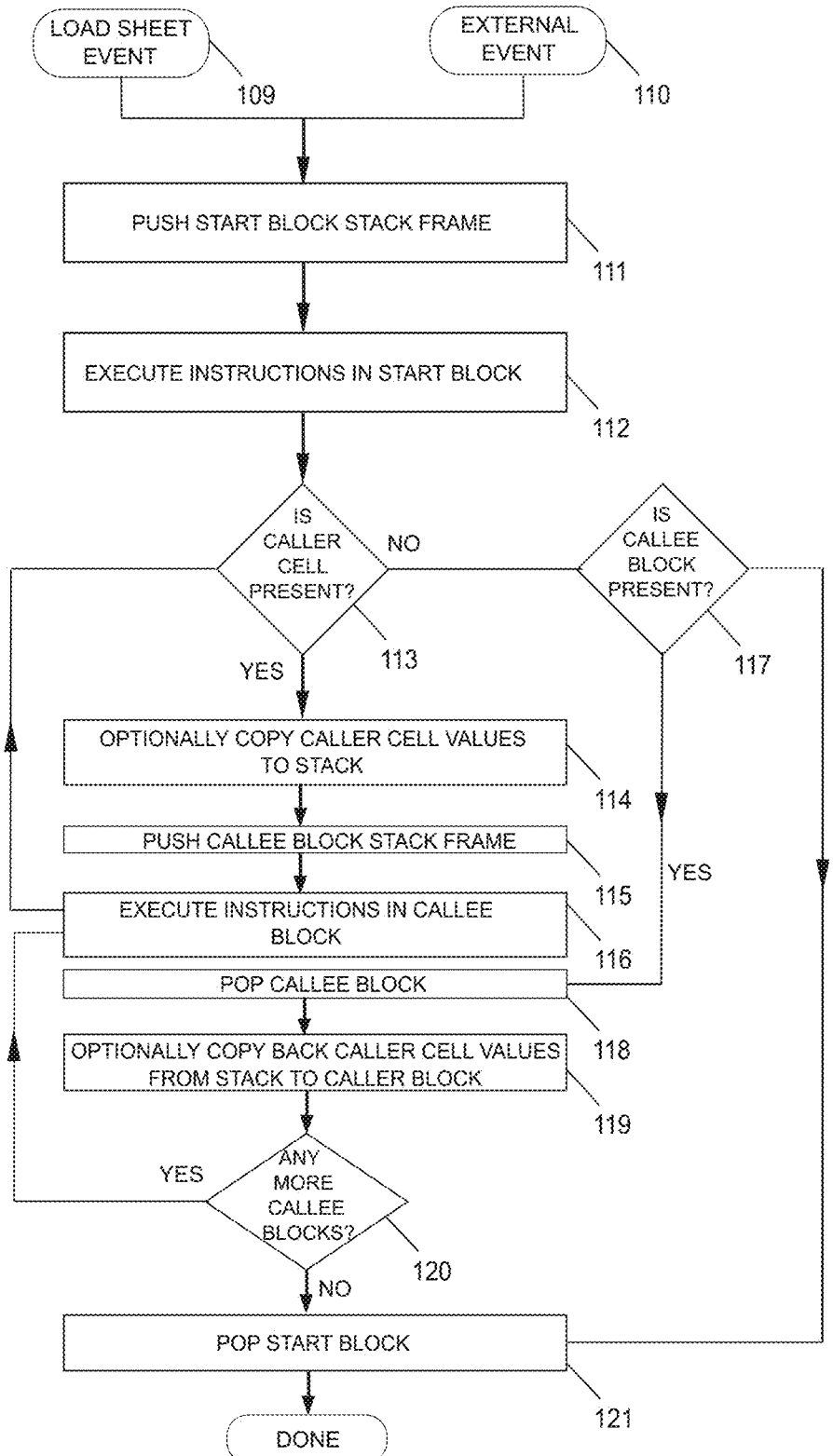
FIG. 19 illustrates method of executing a named block or sheet block with optional embedded caller cells to call a callee named block.

FIG. 19 illustrates method of executing a named block or sheet block with optional embedded caller cells that call a callee named block.

This embodiment uses reference numerals from FIG. 1 also.

In step 109, spreadsheet 33 is loaded in spreadsheet system 31 and that initiates execution of sheet block 36.

Alternatively, an external event such as in step 110 may also trigger execution of a named block such as 35 in FIG. 1. An external event can be one of user interface event, network event and timer event.

In either of these cases, a new stack frame is pushed into stack of virtual machine 32 as in step 111. The stack frame associated with sheet block will have a range of all cells in a sheet starting at cell A1 and ending at the last cell with a formula. During execution of sheet block all embedded named blocks are ignored until a caller cell such as 38 is encountered.

In step 112, instructions in either named block or sheet block are executed with reference to memory context in corresponding stack frame in virtual machine 32.

In step 113, a check is made to see if one of the cells in named or sheet blocks is a caller cell such as 38 in FIG. 1. If true, then execution moves to step 114.

In step 114, caller cell values are optionally copied onto stack. This option may be user configurable parameter where a user marks a named block for recursive or reentrant call or system 31 may auto detect at runtime. For example, if caller block that holds the caller cell is not a sheet block and the caller block is marked for recursive call or a reentrant call, then caller cell values are copied onto stack so that subsequent calls into the caller block do not affect memory context of previous call frames.

If a caller cell is present, then a new stack frame is pushed in step 115 corresponding to callee block.

In step 116, callee block cell instructions are executed in virtual machine 32. During this execution, step 113 is executed again to check if there are further caller cells in callee block. If there are more caller cells present, then for each caller cell, a new stack frame is pushed, and the process repeats by executing step 114 and 115 again.

If there are no more caller cells present in step 113, then step 117 is executed. In step 117 a check is made to see if there is a callee block on stack and if yes then step 118 is used to pop the current callee block.

If at this point if there are saved values for caller block in virtual machine 32 stack, then these values are copied back into caller block at step 119 so that execution can continue in caller block with saved and revived memory context.

Then in step 120, a check is made to see if there any more callee blocks present in stack. If yes, then execution continues in the new callee block at top of stack after the previous callee block caller cell. This is indicated by the YES arrow in step 120.

If in step 117 or in step 120 we do not see any more callee blocks on stack, then execution transfers to step 121 where the starting frame is popped. Start frame is also referred to as root frame in this description and figures.

After this step execution stops.

It can be seen that this method shows execution of a named block or sheet block based on start event such as sheet load event or other external events, and then call other embedded callee blocks by pushing a stack frame associated with callee blocks and executing cells in callee blocks in call order sequence followed by sequential cell order.

This feature to execute sheet block cells in sequence while skipping embedded named block cells and then transferring execution to named blocks when caller cells are present is unique to present invention and is not known to exist in any known spreadsheet system of prior art.

This feature is mandatory to implement full stack based programs using spreadsheet cells where sequential order of execution is guaranteed. In spreadsheet systems of prior art, cells in main sheet are executed based on dependency order which need not be sequential. Some prior art spreadsheet systems have a separate sheet called function sheet wherein some cells are partitioned into functions, but even in such systems the function cells are not guaranteed to execute in sequential order, that is if there are dependencies between cells in function cells, order of execution may be non-sequential.

Figure 20:
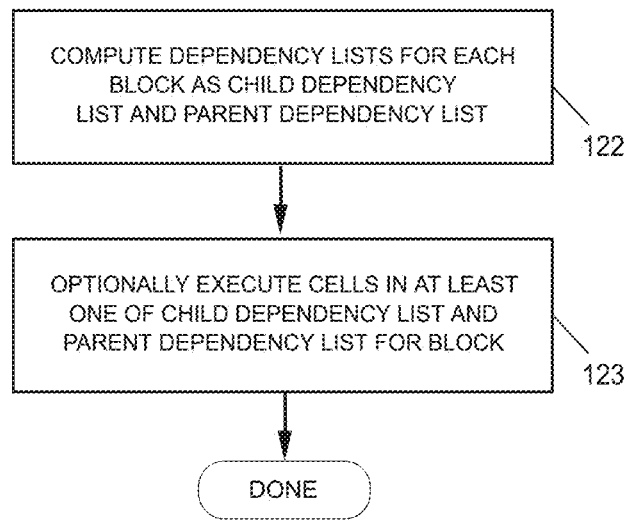
FIG. 20 illustrates method of computing dependencies and executing dependency lists.

FIG. 20 illustrates method of computing dependencies and executing dependency lists optionally.

This embodiment uses reference numerals from FIG. 1 also.

In step 122, dependency lists are computed for each block in spreadsheet 33. These blocks can be named blocks, unnamed blocks and sheet blocks.

Dependency lists can be child dependency lists or parent dependency lists.

A child dependency list is formed with child relations between cells. A child relation is formed between a current cell and a child cell when a child cell formula has a reference to current cell.

A parent dependency list is formed with parent relations between cells. A parent relation is formed between a current cell and a parent cell when a current cell formula has a reference to parent cell.

These dependency lists are comprised of cells inside blocks or outside blocks. For example, for named blocks a child dependency list may span cells inside the named block but if there are cells outside named block referring to cells inside named block, then such outside cells will be part of child dependency list of this named block.

In step 123, cells in dependency lists are optionally executed in dependency order before a frame associated with corresponding block is popped in virtual machine 32.

In present embodiment, we use child dependency list to execute all child cells corresponding to a block. This dependency based execution is optional as each block may be marked for sequential execution and optionally dependency based execution.

Default execution order of any block in present invention is sequential order first so that a conventional stack based program can be implemented with guarantees of cell execution order.

Named blocks such as 35 act as protected zones wherein dependency list of another named block or sheet block cannot reach into cells of named block 35. This means that cells in named block 35 can refer to other cells in any block and when executed will fetch values from other cells, but when cells in other blocks change, the change is not automatically percolated inside 35.

Below paragraph uses reference numerals from FIG. 3.

A dependency between two cells can be marked for conditional execution. For example, FIG. 3 illustrates a conditional dependency setup between cells. Cell 61 at cell A5 has a formula "=npE8" in its formula. Prefix "np" is a disable dependency marker that indicates to dependency compute engine 56 that it should ignore setting up a dependency between cells A5 and E8. That is, if cell E8 in named block 35 changes cell A5 is not automatically changed. Other dependency markers are described in section describing FIG. 3. This fine grained control of dependency execution is mandatory for a stack based program where such a program must be able to control execution by selectively using dependency manager executions when needed and selectively disabling such execution when necessary. For example, if block 35 in FIG. 3 is executed due to a user interface event, then user interface associated cell 124 at cell B5 is also executed, but if 35 is executed due to timer event then cell 124 is not executed due to dependency based execution but cell 63 at cell G8 is executed. This way, dependency lists in present invention is partitioned into multiple types thus enabling finer control of dependency based execution.

This feature is unique to present invention and is not known to exist in any known spreadsheet system of prior art.

Figure 21:
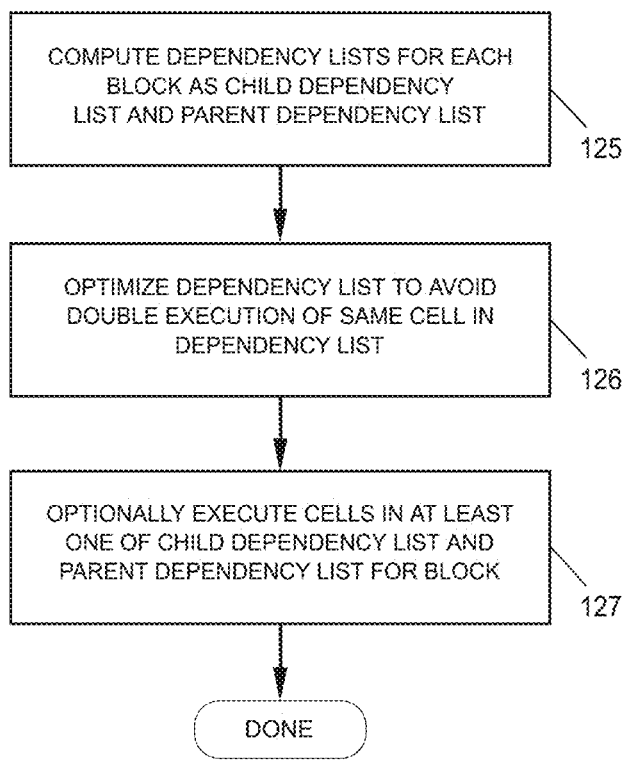
FIG. 21 illustrates method of computing dependency list and optimizing it and execute optionally.

FIG. 21 illustrates method of computing optimized dependency list and executing dependency lists.

This embodiment uses reference numerals from FIG. 1 also.

In step 125, dependency lists are computed for each block in spreadsheet 33. These blocks can be named blocks, unnamed blocks and sheet blocks.

In step 126, dependency lists are optimized such that any cell in child dependency list is executed only once even though it may be part of several child dependency lists as a cell may have multiple parents.

A cell with multiple parents is shown in FIG. 4. This figure shows that cell A5 is dependent on cell D8 and E8. Since E8 comes after D8, A5 is executed only when E8 is executed thus guaranteeing that cell A5 is executed only once and is executed only when the last parent is resolved.

In step 127, at least one dependency list based execution is performed for each block in spreadsheet 33.

Figure 22:
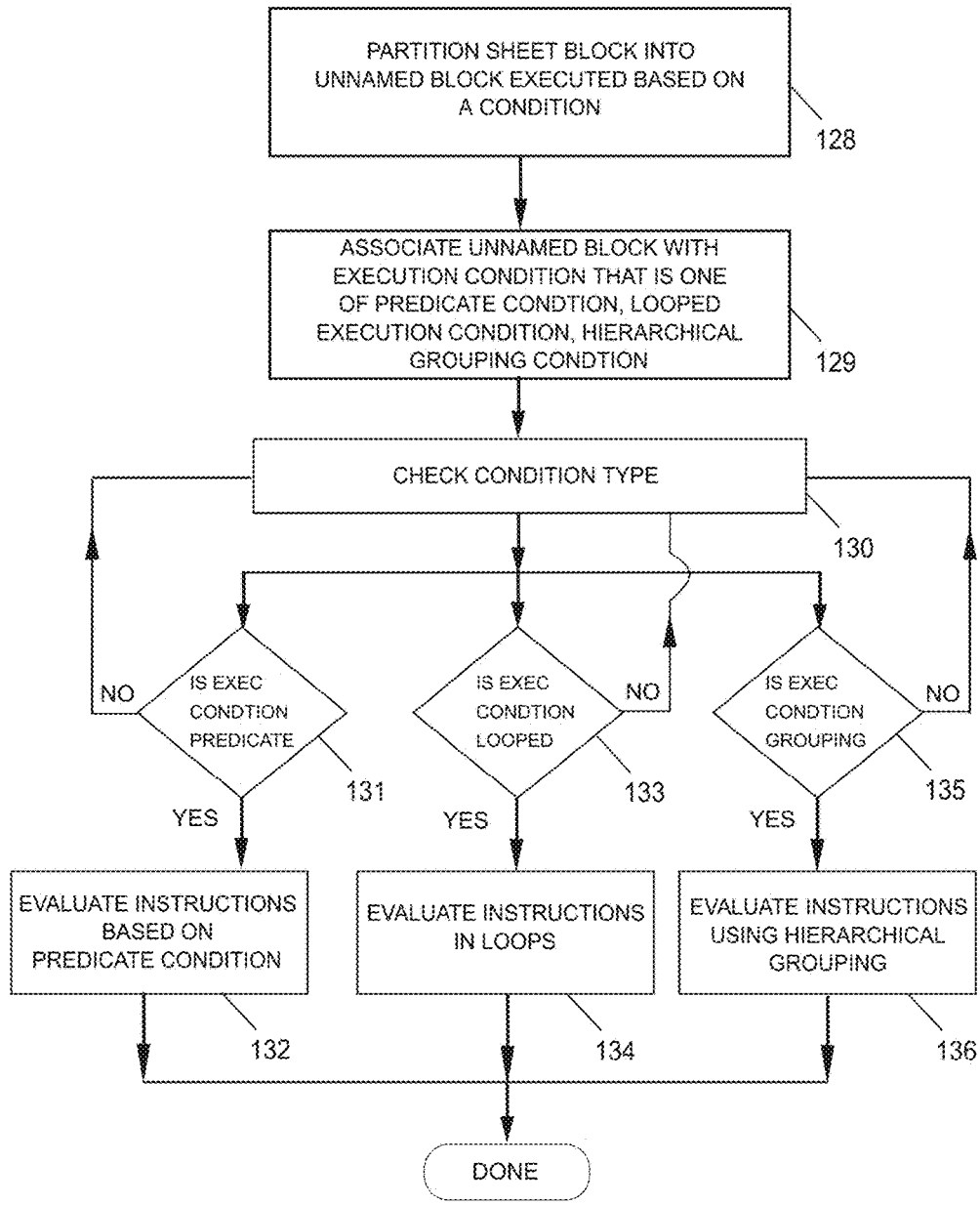
FIG. 22 illustrates method of partitioning blocks into unnamed blocks.

FIG. 22 illustrates method of partitioning blocks into unnamed blocks.

In step 128, a parent block is partitioned into an unnamed block that executes based on a condition. This parent block can be one of sheet block, named block or another unnamed block. The unnamed block is formed with subset of cells of parent block.

In step 129, the unnamed block is associated with a condition of execution wherein the condition is one of predicate based execution condition, looped execution condition and hierarchical grouping condition.

In step 130, execution condition type is checked.

In step 131, if execution condition type evaluates to predicate based condition then in step 132 unnamed block associated with predicate based execution condition is executed if the associated predicate evaluates to true. This is shown in FIG. 6 at cell C6 and is described further in description above that describes FIG. 6.

In step 133, if execution condition type evaluates to looped execution condition, then in step 134 unnamed block associated with looped execution condition is executed repeatedly until the desired number of loops are completed. This is shown in FIG. 7 at cell C3 and is described further in description above that describes FIG. 7.

In this looped execution, one may terminate the execution before reaching the last loop by using a break instruction as shown in FIG. 8. Details of the break instruction are described in the description section of FIG. 8.

In step 135, if execution condition type evaluates to grouping condition then in step 136 unnamed block associated with hierarchical grouping condition is executed by pushing and popping information regarding a group of instructions into virtual machine 32 stack. This is usually used in graphics drawing where a group of graphics primitives are associated with a set of graphics attributes such as drawing origin, cliprect and transforms. These attributes are incrementally applied for each embedded group and decremented when a group has finished execution. This is shown in FIG. 9 at cell B2 and cell C4 and is described further in description above that describes FIG. 9. Graphics primitives may be two dimensional or three dimensional graphics drawing instructions. Two dimensional graphics primitives are comprised of lines, rectangles, triangles, arcs, polygons, points, paths, texts, Bezier curves, images, gradients, groups and others as described in SVG (scalable vector graphics) standard. Three dimensional graphics primitives may include primitives from WebGL standard or OpenGL standards.

Figure 23:
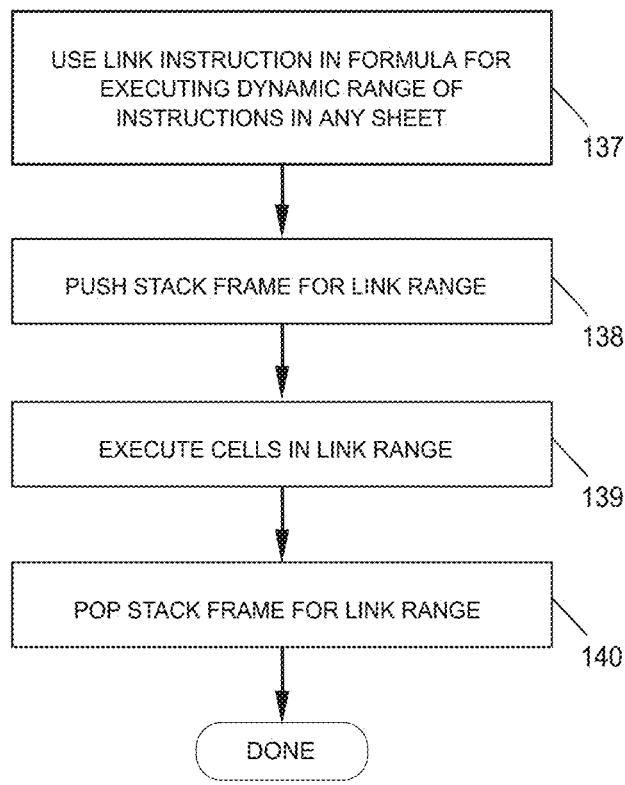
FIG. 23 illustrates method of using LINK instruction in a cell formula to execute a dynamic range of instructions.

FIG. 23 illustrates method of using LINK instruction in a cell formula to execute a dynamic range of instructions.

In step 137, a cell is setup with a formula comprising a LINK instruction. Such a cell is shown in FIG. 12 at cell F7 marked as 88.

In step 138, when spreadsheet 33 is loaded with a LINK instruction cell and execution reaches this cell, virtual machine 32 pushes a new stack frame onto its stack corresponding to the range of cells associated with the LINK instruction. We will further refer to this range as link range. Example of stack frame loaded is shown as 89.

In step 139, cells in link range are executed by virtual machine 32 until the last instruction in this range.

In step 140, stack frame associated with LINK instruction is popped in virtual machine 32. Execution then continues after the cell that has the LINK instruction.

A cell with LINK instruction can be in any sheet and can be in a sheet block or a named block or an unnamed block. LINK instruction enables execution of a dynamic range of cells in virtual machine 32.

This LINK instruction is unique to present invention and is not known to exist in any known spreadsheet system of prior art.

Figure 24:
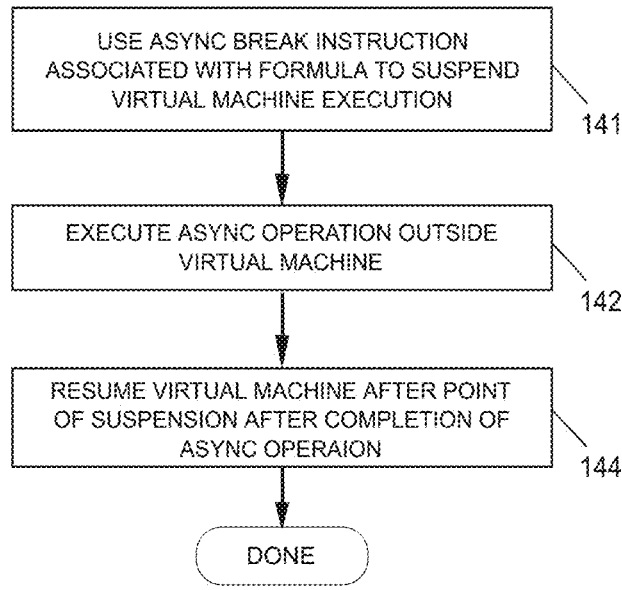
FIG. 24 illustrates method to execute async operations in native code by suspending virtual machine with async break instruction.

FIG. 24 illustrates method of using formula instructions that make use of asynchronous break instruction in virtual machine 32 to suspend and resume virtual machine 32 to complete an asynchronous operation provided by underlying platform.

In present embodiment, we use FIG. 14 as an example to illustrate an asynchronous break instruction in virtual machine 32.

In step 141, virtual machine 32 is suspended while executing a formula that is associated with an asynchronous break instruction inside virtual machine 32. Such an instruction is shown in FIG. 14 at cell C3 of spreadsheet 33. Cell C3 has a CNVS_IMG instruction and this instruction when executed will optionally suspend virtual machine 32 if image loading requested is synchronous as shown last parameter of CNVS_IMG macro. Loading an image synchronously with respect to virtual machine 32 means that cell C4 must be executed only after cell C3 has completed execution. But loading an image is usually a network operation or a file system asynchronous operation provided by native code of underlying system of present invention. So, in order to provide a synchronous load of image with respect to instructions in virtual machine 32, we need to suspend execution of virtual machine 32 till the needed asynchronous operation from native code is completed. So, in this step virtual machine 32 is suspended.

In step 142, asynchronous operation is completed in native code which is outside execution context of virtual machine 32. In present embodiment, this code will load the image requested in cell with CNVS_IMG macro 143 at cell C3. After the requested image is loaded and drawn, virtual machine 32 is notified.

In step 144, virtual machine 32 is resumed after completion of asynchronous operation in native code. Execution of cells resumes after the cell associated with asynchronous break instruction.

Result of execution of instruction in FIG. 14 is shown in canvas 81 and we can see that the triangle image 92 is drawn first and then rectangle 82 is drawn above it.

This is possible only because CNVS_IMG macro is associated with an asynchronous break instruction that enables suspension of virtual machine 32 till image is loaded and drawn and then only subsequent cells are executed. If asynchronous break instruction was not available in virtual machine 32, then one cannot guarantee source execution order will match the rendering order. In this example, the rectangle may be drawn first and then image may be drawn thus inverting the source order. This can happen because image load may be from browser cache or from network, and if it is from network, since virtual machine is not waiting for image load, virtual machine will draw the rectangle first and then image will be drawn.

Ordering cell execution with asynchronous operations in between is a critical feature needed by a conventional software program.

Asynchronous operations can be one of network query, image loading, timer based execution of named blocks and debugger functionality enabling single step execution of cells.

Network query example is described in section for FIG. 13 above. Image loading example is described in further detail in FIG. 14 above. Timer based execution is described in in FIG. 15 above.

This kind of ordering cells in a spreadsheet waiting for a native asynchronous operation to complete is unique to present invention and is not known to exist in any known spreadsheet system of prior art.

Figure 25:
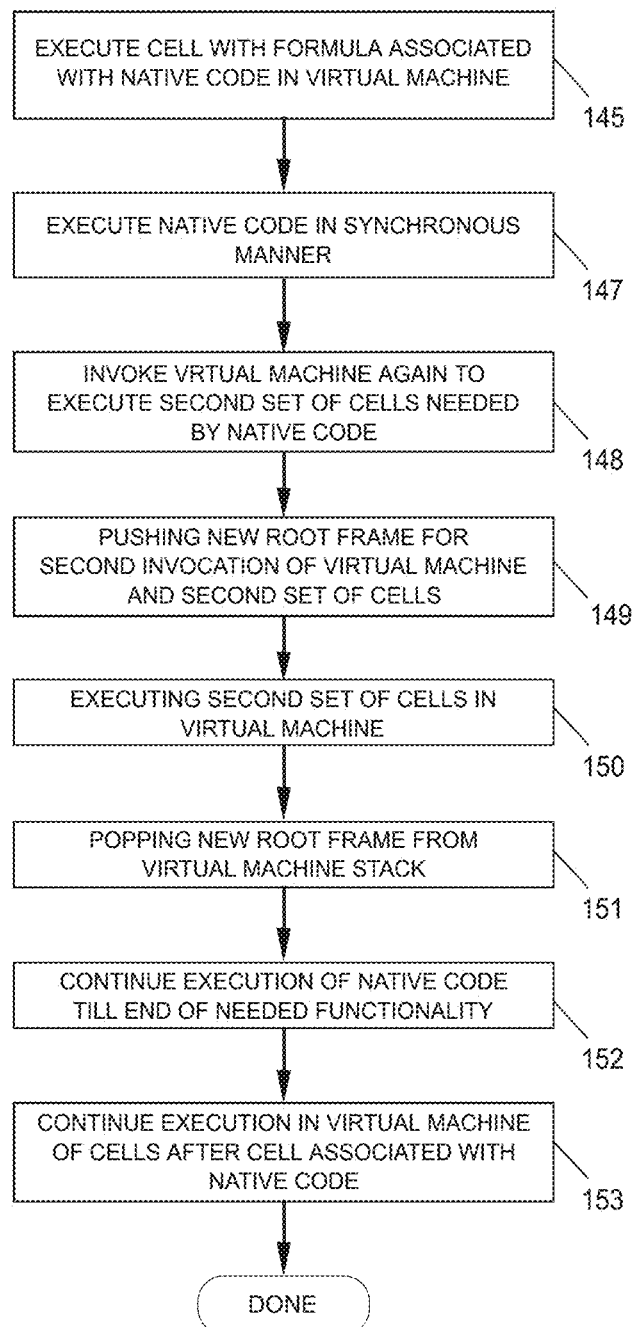
FIG. 25 illustrates method for recursive call into virtual machine via native code to support stack over stack synchronous calling functionality wherein virtual machine calls into native code and native code in turn calls back into virtual machine executing a different set of cells.

FIG. 25 illustrates a method that shows a recursive call into virtual machine via native code to support stack over stack synchronous calling functionality wherein virtual machine calls into native code and that native code in turn calls back into virtual machine executing a different set of cells.

The present embodiment uses reference numerals from FIG. 17 also.

In step 145, virtual machine executes a cell that is associated with a synchronous native call 146 at cell C3 of spreadsheet 33. This cell uses CNVS_IMG macro to draw an image from source bits that is a region in canvas 81. Code to get bits is setup in another block 102 which is called by native code supporting CNVS_IMG macro.

In step 147, virtual machine executes native code associated with CNVS_IMG macro. This native code execution is done without exiting or suspending virtual machine as CNVS_IMG macro here is not associated with an asynchronous native code operation as bits for the needed image are not from a file or network, but are from local canvas 81 that is displaying the needed bits already. Hence bits from 81 can be retrieved synchronously.

In step 148, native code calls back into virtual machine 32 to create a second set of stack frames to represent the recursive call into virtual machine to execute a second set of cells.

In step 149, a new root stack frame is pushed into virtual machine 32 stack for executing the second set of cells.

In step 150, the second set of cells is executed in virtual machine 32. In present embodiment, referring to FIG. 17, second set of cells is mapped to second named block 102 that will read the bits in 81 and return it to native code. This second set of cells may call another named block or have embedded unnamed blocks to create one or more further stack frames.

In step 151, the new root frame is popped. If second set of cells had embedded caller cells or other unnamed blocks, then all corresponding stack frames are also popped. In present embodiment, stack frame associated with 102 is popped and execution control is returned to native code.

In step 152, native code is continued till end of needed functionality. In present embodiment, this will reach the end of native code associated with CNVS_IMG macro that will take source bits returned by 102 and draw it at needed target location. Source bits are marked right triangle 92 and target bits are marked copied triangle 105.

In step 153, cells after cell associated with native code are executed in virtual machine 32. In present embodiment, such cells are after cell C3 and in this case it is cell A4.

This feature of using a virtual machine to call into native code and then native code calling into virtual machine to provide a synchronous operation and stack over stack mode support in a virtual machine associated with a spreadsheet system is not known to exist in any spreadsheet system of prior art.

This feature is highly important to support complex software programs where some code may be in scripting environment and some high performance code may be in native environment.

Figure 26:
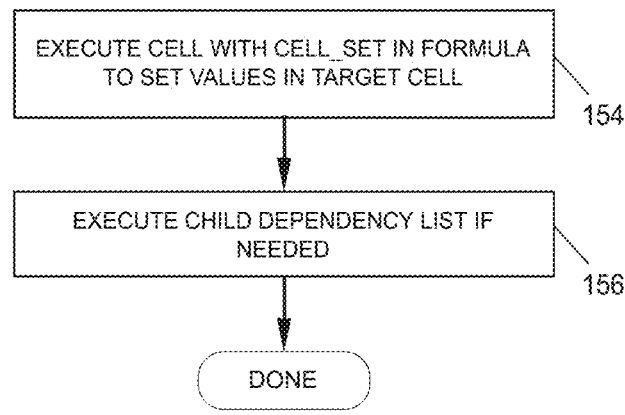
FIG. 26 illustrates method to execute a cell with CELL_SET macro in its formula. This enables a source cell to set values into a target cell.

FIG. 26 illustrates method to execute a cell with CELL_SET macro in its formula. This enables a source cell to set values into a target cell.

In step 154, virtual machine 32 executes a cell with CELL_SET macro in its formula. This macro can be passed in parameters to control setting of either target cell value or target cell formula. It can also be passed in parameters to control if the change in target cell should trigger a child dependency execution. An example of this type of cell is shown in FIG. 11 as a cell with CELL_SET macro 155 at cell D7.

In step 156, virtual machine 32 executes cells that are in child dependency list of target cell.

This execution is controlled by a parameter to CELL_SET macro, hence this execution is optional.

A detailed description of usage of this macro is in description above corresponding to FIG. 11.

This feature is not known to exist in any spreadsheet system of prior art.

Figure 27:
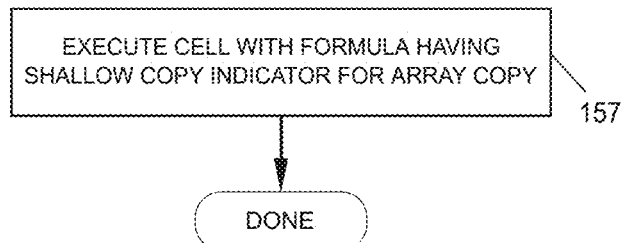
FIG. 27 illustrates method to execute a cell with shallow copy indicator=ar prefix in its formula.

FIG. 27 illustrates method to execute a cell with =ar prefix in its formula. This enables a shallow copy of an array.

In step 157, virtual machine 32 executes a cell with "=ar" prefix macro in its formula. By default, all array copies in present invention are deep copy based, but this behavior can be changed by using a formula prefix "ar". Prefix "ar" represents array reference. For example, cell A8 in FIG. 11 has a formula "=arA5" and so cell A8 will get a shallow copy of array value in A5. A shallow copy is just a reference to another array, so if source array in cell A5 changes, then target array in cell A8 will also reflect the changes as these two arrays share the same underlying memory for array slots.

This way memory can be optimized to share common arrays across cells instead of duplication.

Only when contents of cells need to change independently, we can use regular deep copy of arrays, otherwise reference based copy or shallow copy is better.

This feature is not known to exist in any spreadsheet system of prior art.

The above concludes the description section of methods claimed in present invention.

Figure 28:
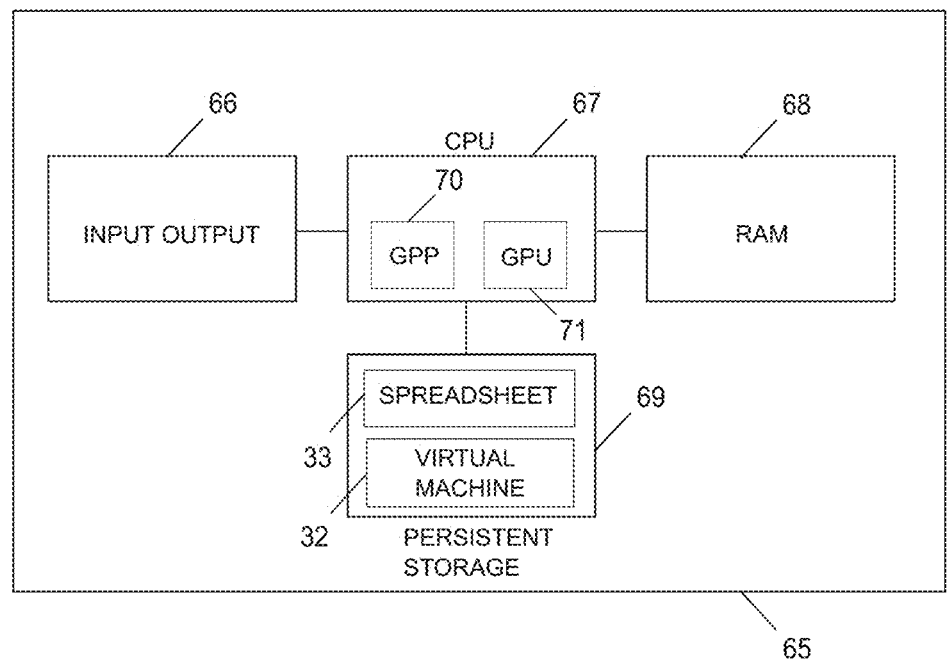
FIG. 28 illustrates an apparatus that is comprised of a computing device, one or more spreadsheets and a virtual machine.

FIG. 28 illustrates an apparatus that is formed with computing device 65 and comprising spreadsheet 33 and virtual machine 32.

Details of computing device 65 are described above in section describing FIG. 5.

Spreadsheet 33 has cells organized in two dimensional order. Each cell can have one of a scalar value, a one dimension array value, a multidimensional array value and a formula instruction.

Spreadsheet 33 is comprised of at least one block that is one of named block of cells and unnamed block. A named block with a name, a reference to begin cell, a reference to end cell, an optional callee input value, and at least one stack frame in virtual machine 32.

Cells that are not part of any named block are part of a sheet block associated with 33. These cells are associated with a root stack frame in virtual machine 32.

Spreadsheet 33 may optionally be comprised of at least one caller cell using a callee block name in its formula to establish a call between the caller cell and a named block with the callee block name.

Virtual machine 32 executes instructions in spreadsheet 33 cells in at least one order from sequential order, call sequence order and dependency based order.

In sheet block, execution starts as sequential order while skipping cells in embedded named blocks. But when a caller cell is encountered in virtual machine 32, execution is transferred to named block cell range thus following a call sequence order. But inside a named block the order is again sequential. At the end of a block, dependency based execution is done optionally. The call sequence order supports recursive and reentrant calls. Recursive calls can be with direct or indirect recursion in named blocks. Reentrant calls support multi-threaded calling into named blocks.

From the description above, a number of advantages of present invention become evident:

a) A spreadsheet system is provided that enables partitioning of cells of any spreadsheet into blocks of cells and execute such blocks using a stack based virtual machine with stack based memory context for each block to be executed. This block based execution with stack memory context enables simulation of functions and procedures of a conventional stack based program including support for support recursive calls;

b) A spreadsheet system is provided that enables setting up conditional execution of a set of cells inside a block of cells to prevent infinite loops in recursive calls by enabling setup of a recursion terminating condition;

c) A spreadsheet system is provided that enables setting up conditional execution of a set of cells inside a block of cells to support equivalent of if then else semantics of a conventional program;

d) A spreadsheet system is provided that enables any cell to set values in other target cells and optionally execute dependency lists corresponding to the target cells;

e) A spreadsheet system is provided that enables setting variables outside blocks using dependency list execution to simulate automatic global variable set operations using dependency manager instead of using manual cell set instructions;

f) A spreadsheet system is provided that enables partitioning cells into named blocks wherein a named block can be called from any other cell in any of the sheets to create a call sequence similar to conventional software programs by associating each call to the named block with a stack memory frame in a virtual machine;

g) A spreadsheet system is provided that enables partitioning cells into unnamed blocks that are executed based on a condition. This will enable implementing related instructions in proximity to each other without having to write blocks for each set of cells thereby eliminating block calling overheads;

h) A spreadsheet system is provided that enables executing a set of instructions in a loop. This will enable executing a set of instructions in named or unnamed bocks associated in a loop whose type is one of for loop, while loop, do while loop, and repeat until loop;

i) A spreadsheet system is provided that enables creating dependency lists for each stack frame created in virtual machine corresponding to named or unnamed blocks, so that we can execute such lists after each frame pop. This enables cells inside and outside a block to be executed optionally using dependency lists. Executing cells outside a block using dependency lists simulates setting global variables as in a conventional program and executing cells inside a block using dependency lists enables a block to have forward references as in a conventional spreadsheet, thus providing benefits of both sequential execution and dependency based execution when needed;

Having the ability to control dependency execution for each frame pop enables partitioning of cells in a spreadsheet to execute only when certain blocks execute. This way the entire spreadsheet need not be tied to a single global dependency list thus providing a highly flexible environment to code in and j) A spreadsheet system is provided that enables suspending and resuming of the virtual machine of present invention to support asynchronous operations. This enables implementing debugger functionality, asynchronous network queries, timer event handling and other event handling such as user interface event handling.

CONCLUSION

Accordingly, the reader will see that using a single virtual machine to execute instructions in cells of a spreadsheet arranged in blocks along with optional dependency list execution provides an environment for writing stack based programs without the need for external scripting language environments.

We claim:

1. A programmable spreadsheet application system stored on a persistent storage component of a computing device and configured to be executed on said computing device, said programmable spreadsheet application system comprising:

a stack based virtual machine;

at least one spreadsheet;

wherein said at least one spreadsheet comprises cells organized in a two dimensional order;

wherein at least one cell of said cells stores at least one of a scalar value, a one dimension array value, a multidimensional array value, and a formula instruction;

wherein said at least one spreadsheet comprises at least one subset block of cells selected from named block of cells and unnamed block of cells in said at least one spreadsheet;

wherein said named block of cells is associated with a name, a reference to a begin cell, a reference to an end cell, an optional callee input value, and at least one stack frame in said stack based virtual machine;

wherein said cells in said at least one spreadsheet and not part of said at least one subset block of cells are associated with a spreadsheet block of cells in said at least one spreadsheet and a root stack frame in said stack based virtual machine;

wherein said at least one spreadsheet comprises at least one caller cell using a callee block name in a caller cell formula to establish a call between said at least one caller cell and a named block with said callee block name;

wherein said stack based virtual machine executes formula instructions using at least one of a sequential order, a call sequence order, and a dependency based order;

wherein said call sequence order is created using at least one caller callee cell relation established as in said at least one caller cell by using said callee block name in said caller cell formula;

wherein said call sequence order supports recursive calls and reentrant calls; and wherein said dependency based order is established using relations between said cells using cell references in caller cell formulae of said cells.

2. The programmable spreadsheet application system of claim 1, further comprising:

a dependency computation engine to produce a dependency list of cells to be executed using parent and child relations encountered during parsing of cells;

wherein said parent and child relations form a graph;

wherein said parent relation is formed between a current cell and a parent cell if said current cell has a reference to said parent cell within a formula of said current cell;

wherein said child relation is formed between a current cell and a child cell if said child cell has a reference to said current cell within a formula of said child cell;

wherein said dependency list of cells is formed for each block of cells;

wherein each dependency between cells is marked to control dependency based execution with dependency control markers selected from a disable parent dependency marker, a disable child dependency marker, and an execute child on an external event marker; and wherein said execute child on an external event marker is selected from a user interface event, a network event, and a timer event.

3. The programmable spreadsheet application system of claim 2, further comprising:

a dependency optimization engine to produce dependency lists of cells that avoid double computing cells while using child cell traversal algorithm in cases where a child cell is dependent on multiple parent cells.

4. The programmable spreadsheet application system of claim 1, wherein said computing device comprises:

a central processing unit component, a random access memory component, a persistent storage component, input output components, and a memory bus connecting said central processing unit component, said random access memory component, said persistent storage component, and said input output components.

5. The programmable spreadsheet application system of claim 1, further comprising:

a condition of execution of said unnamed block of cells in said at least one spreadsheet;

wherein said condition of execution is selected from a predicate based execution condition, a looped execution condition, and a hierarchical grouping condition;

wherein said unnamed block of cells in said at least one spreadsheet is associated with a reference to a begin cell, a reference to an end cell, and a block stack frame in said stack based virtual machine;

wherein cells in said unnamed block of cells in said at least one spreadsheet associated with said predicate based execution condition are executed when said predicate based execution condition evaluates to true;

wherein said looped execution condition is selected from loop programming methods selected from a for loop, a while loop, and a do while loop;

wherein said looped execution condition is associated with a cell holding a terminating instruction to break out of a loop before reaching a final loop of execution;

wherein cells in said unnamed block of cells in said at least one spreadsheet associated with said hierarchical grouping condition are executed with grouping methods commonly used with user interface and graphics primitives; and wherein said graphics primitives comprise two dimensional and three dimensional graphics primitives.

6. The programmable spreadsheet application system of claim 1, wherein said spreadsheet block of cells comprises a cell with a link instruction to transfer execution to any range of cells in said at least one spreadsheet and resume execution after said cell with said link instruction.

7. The programmable spreadsheet application system of claim 1, wherein a cell formula comprises a cell set instruction in said cell formula to enable setting values in a target cell that triggers a dependency based execution of cells dependent on said target cell.

8. The programmable spreadsheet application system of claim 1, wherein said stack based virtual machine comprises an asynchronous break instruction to suspend an execution of said stack based virtual machine for an asynchronous operation to be completed and resume said execution of said stack based virtual machine after said asynchronous operation is completed thereby enabling a functionality selected from a network query, an image loading, a timer execution, and a debugger.

9. The programmable spreadsheet application system of claim 1, wherein said stack based virtual machine provides a recursive entry into a main loop, and wherein said recursive entry is interspersed with a native call stack.

10. The programmable spreadsheet application system of claim 1, wherein a cell formula comprises a prefix indicating a shallow copy of an array value.

11. A method of implementing stack based programs using cells in a spreadsheet application system executing on a computing device comprising:

associating a stack based virtual machine with said spreadsheet application system;

wherein said spreadsheet application system is comprised of at least one spreadsheet with said cells organized in two dimensional order;

wherein at least one cell of said cells stores at least one of a scalar value, a one dimension array value, a multidimensional array value, and a formula instruction;

partitioning said at least one spreadsheet into at least one subset block of cells selected from named block of cells and unnamed block of cells;

wherein said named block of cells is associated with a name, a reference to a begin cell, a reference to an end cell, an optional callee input value, and at least one stack frame in said stack based virtual machine;

wherein said unnamed block of cells is associated with a condition of execution, a reference to a begin cell, a reference to an end cell, and at least one stack frame in said stack based virtual machine;

associating said cells in said at least one spreadsheet and not part of said at least one subset block of cells with a spreadsheet block of cells in said at least one spreadsheet and a root stack frame in said stack based virtual machine;

wherein said at least one spreadsheet comprises at least one caller cell using a callee block name in a caller cell formula to establish a call between said at least one caller cell and a named block with said callee block name;

wherein said stack based virtual machine executes formula instructions in order based on at least one of a sequential order, a call sequence order, and a dependency based order;

wherein said call sequence order is created using at least one caller callee cell relation established as in said at least one caller cell by using said callee block name in said caller cell formula;

wherein said call sequence order supports recursive calls and reentrant calls; and wherein said dependency based order is established using relations between said cells using cell references in caller cell formulae of said cells.

12. The method of implementing stack based programs using cells in a spreadsheet application system of claim 11, further comprising:
  pushing a stack frame associated with a start block of cells into a stack of said stack based virtual machine;
  wherein said start block of cells is selected from said named block of cells and said spreadsheet block of cells;
  executing said formula instructions associated with said start block of cells;
  wherein said execution of said formula instructions associated with said start block of cells is in two dimensional sequential order;
  wherein said execution of said formula instructions associated with said start block of cells skips cells in embedded named blocks of cells;
  encountering, in a caller block of cells, a caller cell with said callee block name in a caller cell formula;
  pushing a callee stack frame corresponding to a callee block of cells and executing said formula instructions associated with said callee block of cells;
  copying all cell values of said caller block of cells as caller saved values into said stack of said stack based virtual machine before executing any instructions in said callee block of cells;
  wherein said callee stack frame comprising at least one of said reference to said begin cell, said reference to said end cell, a reference to a currently executing cell in said callee block of cells, a reference to a result cell, and a reference to a return cell to be executed after said end cell;
  transferring a result of execution of said callee block of cells into said caller cell;
  copying back caller saved values into said caller block of cells upon completion of execution of said formula instructions associated with said callee block of cells thereby enabling said caller block of cells to execute in an execution context after execution of said callee block of cells to support recursive and reentrant calls;
  popping said callee stack frame upon completion of execution of all instructions in said callee block of cells; and
  popping said stack frame associated with said start block of cells upon completion of execution of all instructions in said start block of cells.

13. The method of implementing stack based programs using cells in a spreadsheet application system of claim 11, further comprising:
  computing a block level child dependency list of cells to be executed using child relations encountered during parsing of said cells in blocks of cells;
  wherein a child relation is formed between a current cell and a child cell if said child cell has a reference to said current cell in a formula of said child cell;
  computing a block level parent dependency list of cells to be executed using parent relations encountered during parsing of said cells in blocks of cells;
  wherein a parent relation is formed between a current cell and a parent cell if said current cell has a reference to said parent cell within a formula of said current cell;
  wherein said block level child and block level parent dependency lists of cells are comprised of cells selected from cells inside a block of cells and cells outside a block of cells;
  executing cells in said block level child and block level parent dependency lists of cells before a pop operation is completed;
  wherein said execution of cells is based on at least one of said block level child and block level parent dependency lists of cells;
  wherein said blocks of cells excluding said spreadsheet block of cells are configured to be protected zones such that a child dependency list of a first block of cells does not traverse into a second block of cells even if a cell in said second block of cells refers to cells in said first block of cells;
  wherein each dependency between cells is marked to control dependency based execution with dependency control markers selected from a disable parent dependency marker, a disable child dependency marker, and an execute child on an external event marker; and
  wherein said execute child on an external event marker is selected from a user interface event, a network event, and a timer event.

14. The method of implementing stack based programs using cells in a spreadsheet application system of claim 13, further comprising:
  optimizing dependency lists of cells to produce dependency lists of cells that avoid double computing cells while using child cell traversal algorithm in cases where a child cell is dependent on multiple parent cells.

15. The method of implementing stack based programs using cells in a spreadsheet application system of claim 11, further comprising:
  partitioning a block of cells into at least one unnamed block of cells formed with a subset of cells of said block of cells and associating said at least one unnamed block of cells with a condition for execution selected from a predicate based execution condition, a looped execution condition, and a hierarchical grouping condition;
  wherein said subset of cells of said block of cells is associated with a range of cells marked by a reference to a begin cell and a reference to an end cell;
  wherein said looped execution condition is selected from loop programming methods selected from a for loop, a while loop, and a do while loop;
  executing, in said stack based virtual machine, formula instructions associated with cells in said unnamed block of cells with said predicate based execution condition when said predicate based execution condition evaluates to true;
  executing, in said stack based virtual machine, formula instructions associated with cells in said unnamed block of cells with said looped execution condition in an iterative manner;
  wherein a number of iterations is controlled by parameters set in said looped execution condition;
  wherein said looped execution condition is associated with a cell holding terminating instruction to break out of a loop before reaching a final loop of execution;
  executing, in said stack based virtual machine, formula instructions associated with cells in said unnamed block of cells with said hierarchical grouping condition with grouping methods commonly used with user interface and graphics primitives; and
  wherein said graphics primitives comprises two dimensional and three dimensional graphics primitives.

16. The method of implementing stack based programs using cells in a spreadsheet application system of claim 11, further comprising:
  using a link instruction in a formula to execute instructions in a given range of cells of said spreadsheet;

wherein said given range of cells of said spreadsheet is referred to as a link range;
pushing a stack frame associated with said link range into a stack of said stack based virtual machine;
executing, in said stack based virtual machine, formula instructions associated with said cells of said spreadsheet of said link range;
popping said stack frame associated with said link range upon completion of execution of all instructions in said start block of cells; and
resuming execution at a cell next to cell with said link instruction after all instructions associated with said link instruction are completed.

17. The method of implementing stack based programs using cells in a spreadsheet application system of claim 11, further comprising:
using an asynchronous break instruction in said stack based virtual machine to suspend execution of cells to enable execution of an asynchronous operation provided by native code;
executing an asynchronous operation in native code;
resuming execution of said cells in said stack based virtual machine after said asynchronous operation is completed; and
wherein said asynchronous operation provides a functionality selected from a network query, an image loading, a timer execution, and a debugger.

18. The method of implementing stack based programs using cells in a spreadsheet application system of claim 11, further comprising:
executing a formula instruction of a native code associated cell in said stack based virtual machine;
executing said native code in a synchronous manner;
invoking said stack based virtual machine from said native code to execute a set of cells other than said native code associated cell as an entry into said stack based virtual machine;
pushing a stack frame representing a root stack frame for said set of cells and marking said stack frame as an invocation root stack frame;
executing, in said stack based virtual machine, said set of cells;
popping said root stack frame;
continuing execution in said native code after said invocation of said stack based virtual machine till end of a needed functionality from said native code; and
continuing execution in said stack based virtual machine after said native code associated cell.

19. The method of implementing stack based programs using cells in a spreadsheet application system of claim 11, further comprising:
executing a formula comprising a cell set instruction to enable setting values in a target cell;
triggering a dependency based execution of cells dependent on said target cell; and
executing a formula comprising a prefix indicating a shallow copy of an array value.

20. A computing device executing a programmable spreadsheet application system comprising:
a central processing unit component, a random access memory component, a persistent storage component, input output components, and a memory bus connecting said central processing unit component, said random access memory component, said persistent storage component, and said input output components;
a stack based virtual machine;
at least one spreadsheet;
wherein said at least one spreadsheet comprises cells organized in a two dimensional order;
wherein at least one cell of said cells stores at least one of a scalar value, a one dimension array value, a multidimensional array value, and a formula instruction;
wherein said at least one spreadsheet comprises at least one subset block of cells selected from named block of cells and unnamed block of cells in said at least one spreadsheet;
wherein said named block of cells is associated with a name, a reference to a begin cell, a reference to an end cell, an optional callee input value, and at least one stack frame in said stack based virtual machine;
wherein said cells in said at least one spreadsheet and not part of said at least one subset block of cells are associated with a spreadsheet block of cells in said at least one spreadsheet and a root stack frame in said stack based virtual machine;
wherein said at least one spreadsheet comprises at least one caller cell using a callee block name in a caller cell formula to establish a call between said at least one caller cell and a named block with said callee block name;
wherein said stack based virtual machine executes formula instructions using at least one of a sequential order, a call sequence order, and a dependency based order;
wherein said call sequence order is created using at least one caller callee cell relation established as in said at least one caller cell by using said callee block name in said caller cell formula;
wherein said call sequence order supports recursive calls and reentrant calls; and
wherein said dependency based order is established using relations between said cells using cell references in caller cell formulae of said cells.

* * * * *